United States Patent
Sugano et al.

[11] Patent Number: 5,864,522
[45] Date of Patent: Jan. 26, 1999

[54] AUTO DISC CHANGER

[75] Inventors: Shigeki Sugano; Takashi Ando; Shoji Komatsuzaki; Ayumu Konno; Takumi Usui; Morio Kurihara, all of Tochigi, Japan

[73] Assignee: AIWA Co., Ltd., Tokyo, Japan

[21] Appl. No.: 529,665

[22] Filed: Sep. 18, 1995

[30] Foreign Application Priority Data

Sep. 22, 1994 [JP] Japan .................................. 6-228269

[51] Int. Cl.⁶ .................................................. G11B 17/22
[52] U.S. Cl. ................................................................ 369/34
[58] Field of Search .............................. 369/34, 36–38, 369/178, 192; 360/92, 98.05

[56] References Cited

U.S. PATENT DOCUMENTS

| | | | |
|---|---|---|---|
| 4,539,663 | 9/1985 | Ishibashi et al. | 369/34 |
| 4,912,581 | 3/1990 | Watanabe | 360/98.06 |

FOREIGN PATENT DOCUMENTS

| | | |
|---|---|---|
| 0 501 338 | 9/1992 | European Pat. Off. |
| 0 541 208 | 5/1993 | European Pat. Off. |
| 0 550 282 | 7/1993 | European Pat. Off. |
| 41 25 514 | 2/1993 | Germany |
| 43 34 455 | 9/1994 | Germany |
| 2241819 | 9/1991 | United Kingdom |
| 91/07731 | 5/1991 | WIPO |

*Primary Examiner*—George J. Letscher
*Attorney, Agent, or Firm*—Smith-Hill and Bedell

[57] ABSTRACT

In a check mode, a determination is made as to whether or not a disc is stored in each of disc storage positions, and mapping data representing the presence of the discs are recorded into a memory. Disc storage and removal operations are performed based on such mapping data. Further, in a disc storage mode, when a disc is already stored in a specific storage position, the word "FULL" is displayed. When no disc is stored in a specific storage position, the word "EMPTY" is displayed. Further, in a skip button disc storage mode, one of empty disc storage position number is displayed, and when the skip button is pushed, the next empty disc position number is displayed. When the enter button is pushed while an empty disc storage number is displayed, a disc is stored into the empty disc storage position represented by the displayed number. Moreover, in the check mode, when power is turned off, the check mode is continued in order to complete the mapping process.

24 Claims, 43 Drawing Sheets

| RANGE | POSITION OF COMPARTMENT | REMARKS |
|---|---|---|
| (A) | THE N-TH DISC 12 ⋮ THE FIRST DISC 12 | |
| (B) | DISC TRAY 15 | REFERENCE POSITION FOR CARRIAGE 14 |
| (C) | PLAYER 16 | STANDBY POSITION FOR CARRIAGE 14 |

F I G. 30A

| MODE | ORDER IN WHICH CARRIAGE 14 MOVES |
|---|---|
| DISC STOPING | C → B → A → B → A → B → C |
| DISC REMOVING | C → B → A → B → A → B → C |
| DISC IN-STOCKER PLAYBACK | C → B → A → B → C → B → A → B → C |
| EXTERNAL DISC PLAYBACK | C → B → A → B → C → B → A → B → C |

F I G. 30B

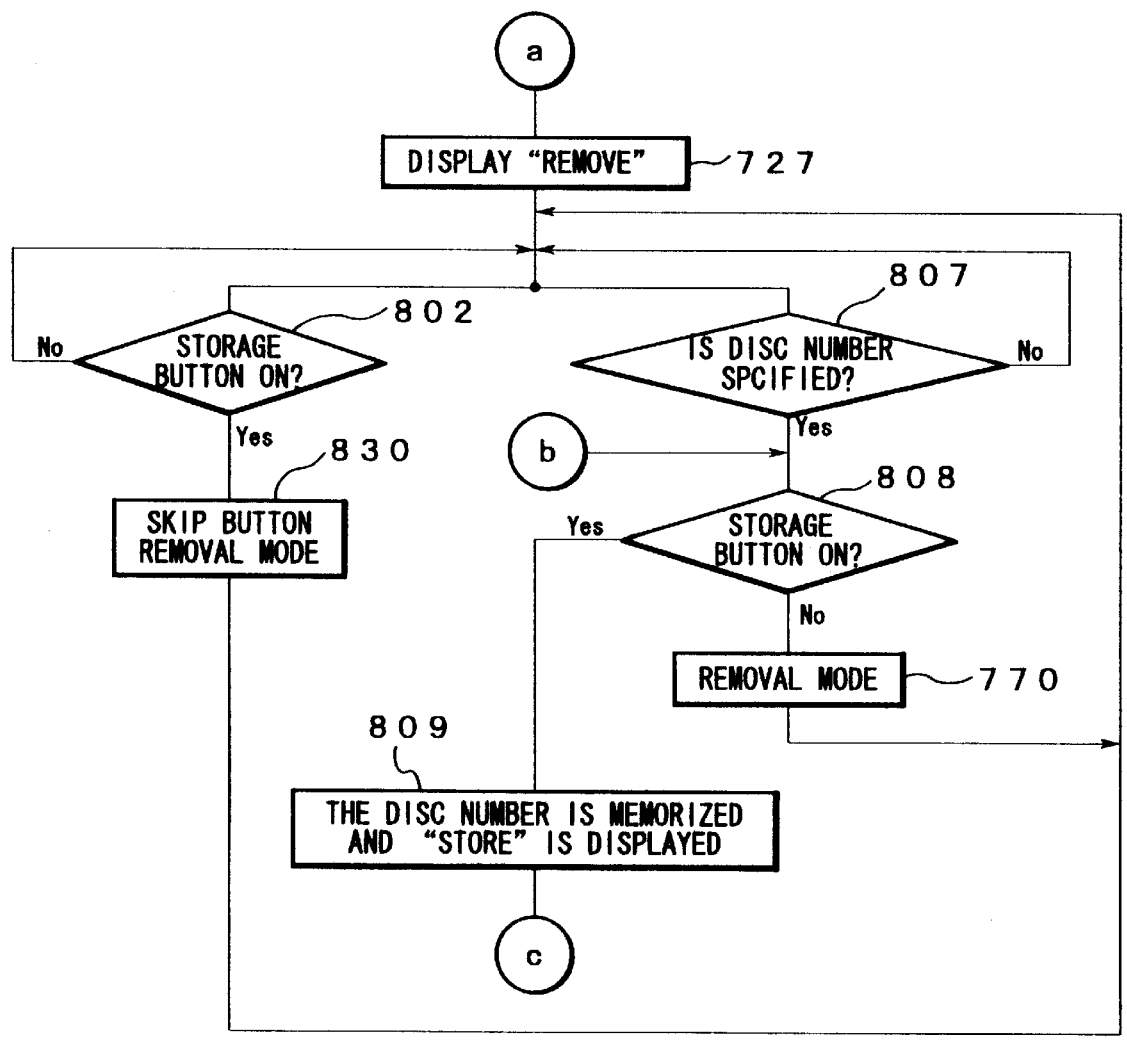
F I G. 4 2

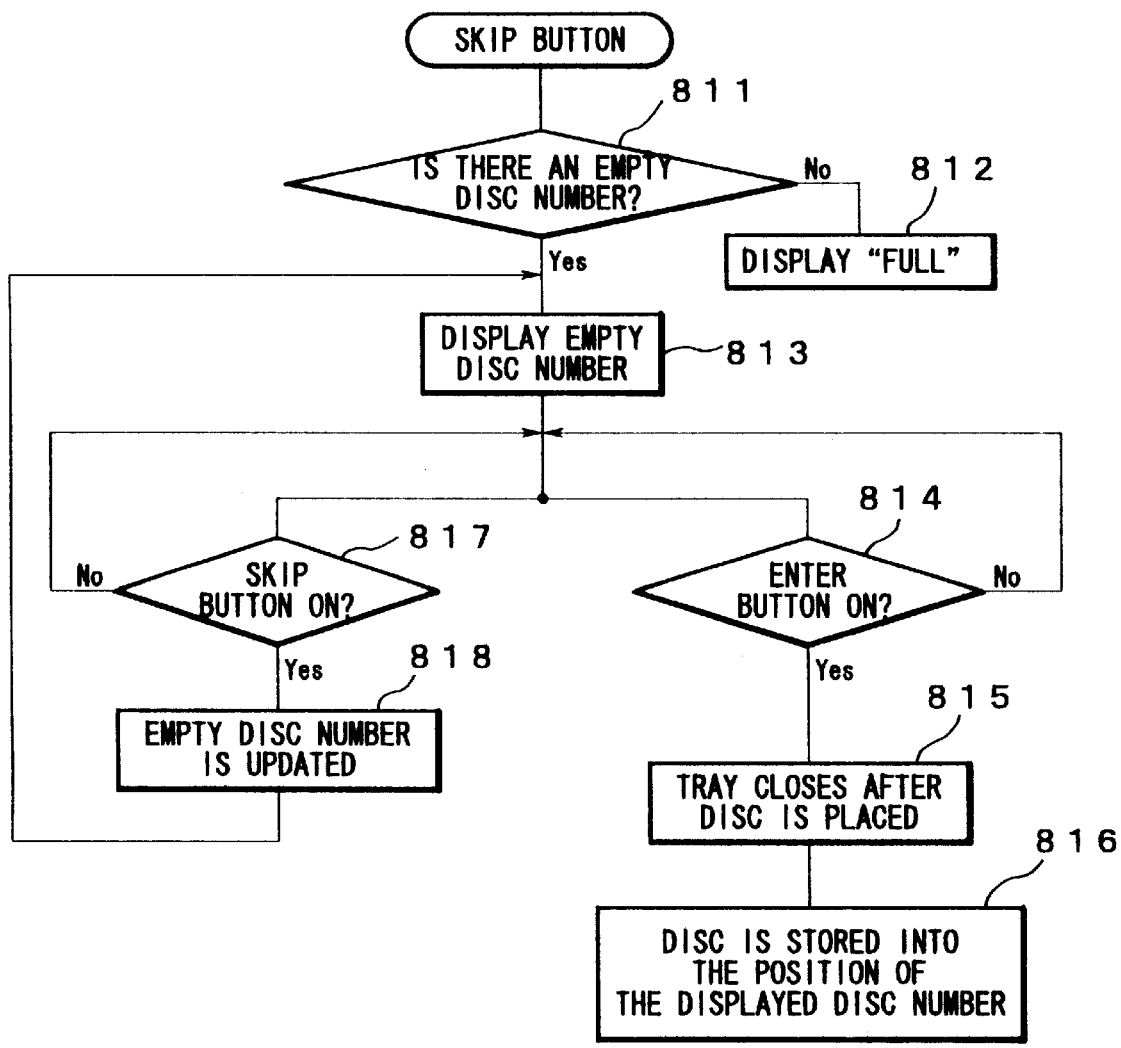
F I G. 43

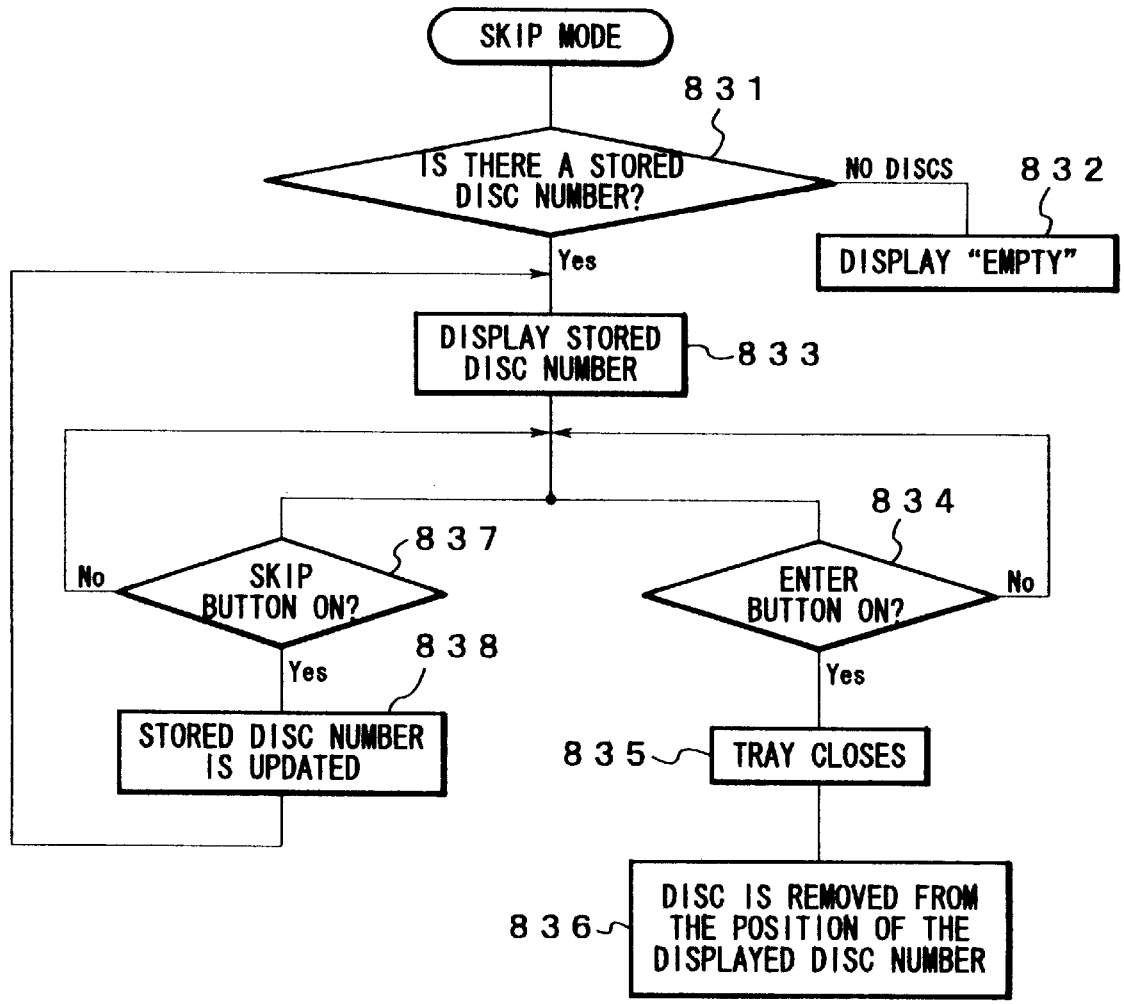
F I G. 4 4

AUTO DISC CHANGER

BACKGROUND OF THE INVENTION

1. Field of the Invention

The present invention relates to an auto disc changer which can store a large number of audio discs and play back the discs one at a time, and in particular, to an auto disc changer in which a disc storage position is mapped, which mapping data can be recorded.

Further, the present invention relates in particular to an auto disc changer which can continue a check mode recording the presence of the discs when the power is turned off.

Moreover, the present invention relates in particular to an auto disc changer which can display information about whether or not a specified disc is already stored in a specified disc storage position.

Moreover, the present invention relates in particular to an auto disc changer which can display the presence of the discs in order to allow the user to easily and quickly store and remove the discs.

2. Description of the Related Art

In general, auto disc changers currently in use with a disc playback operation comprise a disc tray which removes discs from and loads discs into the unit (disc removal and loading means), a stocker which stores a number of discs inside the unit (disc storage means), a carriage which transfers the discs to and from a predetermined storage position in the stocker (disc carriage means), and a control means which controls the loading, and removal operations and the transfer of the discs.

When a unit has a storage capacity of only two or three discs, a user is able to see the stored discs in the unit.

With the auto disc changers which store no more than ten discs, the stored discs are easily checked without an information display indicating at which disc storage position a specified disc is stored, because only a small number of discs are stored, and accordingly, a user does not ordinarily make a mistake with regard to the disc storage position.

However, when storing a much greater number of discs than are currently storable in a conventional changer, the user cannot easily confirm disc storage positions by merely looking. This is due to the construction of such large capacity changers in which the gaps between the disc storage positions are made narrow so that a large number of discs can be stored in a limited space.

In this case, if the status (presence or absence) of the discs in the disc storage positions are checked and such data can be provided for the user, the user can correctly determine whether or not a disc has already been stored in a specified disc storage position, with reference to the data, and can know in advance, for example, whether or not a disc storage position is empty.

Such check mode is normally performed at the same time the power is turned on, and the time required for such check depends on the disc storage capacity of the changer. If the unit can store up to 100 discs, the check may take several minutes. During such time, the power switch may be (accidentally) turned off.

If the power is turned off during the check mode, the check mode is terminated because power is not supplied to the control block with the microcomputer which drives the check mode, and the recorded data is lost.

When the power is again turned on, the check mode must be re-started. The user cannot operate other changer functions such as disc play or storage, until the check mode is completed. This delay may irritate the user.

Further, when the user tries to store a disc, he must specify the disc storage position. However, a disc may already be stored in the specified disc storage position, therefore it would be helpful to be able to determine the status of the disc storage position ahead of time. Otherwise, the user can not know that the disc storage is unavailable until he begins to operate the unit. A storage operation for the occupied disc storage position is useless, unnecessary burdening the mechanical parts.

When a disc is removed, the empty disc storage position may also be specified. Otherwise, the user may try to play back from an empty disc storage position and not recognize his mistake in specification until the disc tray is opened. It would be convenient for the user to be informed in advance that a specific disc storage position is empty.

The above would be particularly useful for an auto disc changer which can store a large number of discs, for example up to 100, because operations in which a disc is stored or removed are repeated many times.

Moreover, if the status (full or empty) of the discs storage is displayed during the operation mode, the operations in which the disc is stored and removed can be smoothly and quickly performed.

For example, if only the empty disc storage positions are displayed successively, the user can specify the disc storage easily, and the disc can be smoothly and quickly stored into the storage position.

Currently, because the number of the discs which a typical changer can store is small, such means described above have not been provided.

OBJECT AND SUMMARY OF THE INVENTION

One of the objects of the present invention is to provide an improved auto disc changer which generates data representing the presence of discs in such disc storage and which performs operations using such data.

Another object of the present invention is to provide an improved auto disc changer which can continue a check mode even when the power is turned off in the middle of such check mode.

A further object of the present invention is to provide an improved auto disc changer which can inform the user of whether or not a disc can be stored in a specific disc storage position and whether or not a disc to be removed is being stored in a specific disc storage position, before a storage or removal operation for the disc has begun.

Still another object of the present invention is to provide an improved auto disc changer which can perform the disc storage and removal operations smoothly, quickly, and accurately.

In one aspect of this invention, when the mapping data is not normally recorded at the time when a first-stage power is turned on and thereafter the unit power is turned on, the check mode shown in FIG. 31 is performed, the status of disc storage in the disc storage positions is determined by level by level, and data representing such status is stored (steps 653 to 661).

When a disc is stored in the unit (disc storage operation) and is removed (disc removal operation), the mapping data is referenced in accordance with a specific disc storage position, and an instruction is given based on such mapping data.

For example, when a disc is already stored in a specific disc storage position at the time of a disc storage operation, the word "FULL" is displayed as shown in step 757 in FIG. 35, in order to inform the user that another disc cannot be stored there. When a disc is not yet stored in a specific disc storage position at the time of a disc removal operation, the word "EMPTY" is displayed in order to inform the user that no disc can be removed from the position.

Using the mapping data in such way, even if the number of discs which can be stored into the unit is increased, discs can be accurately stored into and removed from specific positions of the unit.

Another aspect of this invention is shown in FIG. 34, which details the steps performed in the control box necessary to maintain power during the check mode. When the power to the unit is turned on, a power observation flag, which represents the ON/OFF status of the power supply, is set to "1", and when the power is turned off, the flag is changed to "0". After the check mode time has passed and the check mode is completed, the status of the flag is checked. If the flag is at "1", the power is kept on, and the unit is set to a standby mode, waiting for the next operation.

After the check mode is completed and the status of the flag is determined to be "0", the power to the unit is turned off. Since the operation is so programmed, even when the power is turned off by the user while the check mode is being performed, the check mode is continued so that all the mapping data is generated. Accordingly, when the power is next turned on, it is not necessary to start the check mode again, and the normal operation mode can be quickly started.

In still another aspect of this invention, when the number for a disc storage position (disc storage position number) is specified in connection with the storage button so as to store a disc and the enter button is pressed, it is checked with reference to the mapping data to determine whether or not a disc has already been stored in that specified position.

After the check is completed and it is determined that a disc has already been stored in the specified position, the display indicates, for example, "FULL" in order to inform the user that the new disc cannot be stored in that position. When a disc has not yet been stored in the specified position, the new disc is stored there.

Further, when a disc storage position number is specified in connection with the removal button so as to remove a disc and the enter button is pressed, the disc storage position number is checked with reference to the mapping data to determine whether or not a disc has already been stored in the specified position.

After the check is completed and it is determined that a disc has not yet been stored in the specified position, the display indicates, for example, "EMPTY" in order to inform the user that no disc can be removed from that position. When a disc is already stored in the specified position, the disc is removed from that position.

When either the storage or removal button is pressed, the disc tray is automatically opened. Such operation is useful for the removal process mode as well, for the following reason. When a disc has already been placed on the disc tray before the removal button is operated, and if the disc storage position specified by the user is empty, the user may remove the disc already placed on the disc tray, mistaking it for the disc intended to be removed. This is on the assumption that the display does not indicate "EMPTY".

In yet another aspect of this invention, as shown in FIG. 41 and FIG. 42, when the skip button is pressed, a skip button disc storage mode is performed (in steps 801 and 810). Similarly, when the skip button is pressed a second time, a skip button disc removal mode by the skip button is performed.

As shown in FIG. 43, when the skip button is pressed while the disc storage mode is being performed, the empty disc storage position numbers are displayed in succession, one such number displayed each time the skip button is pressed. When the enter button is pressed while a number for an empty disc storage position is being displayed, the disc to be stored is stored in the empty disc storage position represented by the displayed number.

The numbers representing stored disc storage positions are skipped, and numbers representing only the empty disc storage positions are displayed.

By referring to the displayed empty disc storage position numbers, the user can easily confirm the positions into which a disc can be stored, and when the user selects a disc storage position number, the disc is securely stored in the corresponding disc storage position. Accordingly, the disc storage operation can be smoothly and quickly performed.

When the skip button is pressed during the disc removal mode, the stored disc storage position numbers are displayed in succession, one number at a time, with a new stored disc storage position number being substituted each time the skip button is pressed. When the enter button is pressed and a displayed disc storage position number is memorized, the disc is removed from the disc storage position represented by such displayed disc number. The empty disc storage position numbers are skipped, and only the numbers representing stored disc storage positions are displayed.

By referring to the displayed stored disc storage position number, the user can easily confirm the positions from which discs can be removed, and when the user selects a disc storage position number, the disc is securely removed from the corresponding disc storage position. Accordingly, the disc removal operation can be smoothly and quickly performed.

When all of the disc storage positions are filled or empty, such condition is indicated using the display and the user can easily understand.

Additional objects and advantages of the present invention will be apparent from the following detailed description of a preferred embodiment thereof, which is best understood with reference to the accompanying drawings.

BRIEF DESCRIPTION OF THE DRAWINGS

FIG. 30A and FIG. 30B are tables showing a range of movement and the order of movement of the carriage 14 according to the present invention;

FIG. 42 is a flow chart showing a portion of the skip mode according to the present invention;

FIG. 43 is a flow chart showing an example of the skip button storage mode according to the present invention; and FIG. 44 is a flow chart showing an example of the skip button removal mode according to the present invention.

DESCRIPTION OF THE PREFERRED EMBODIMENT

An auto disc changer in a preferred embodiment according to the present invention is described below with reference to the drawings.

Figure 1:
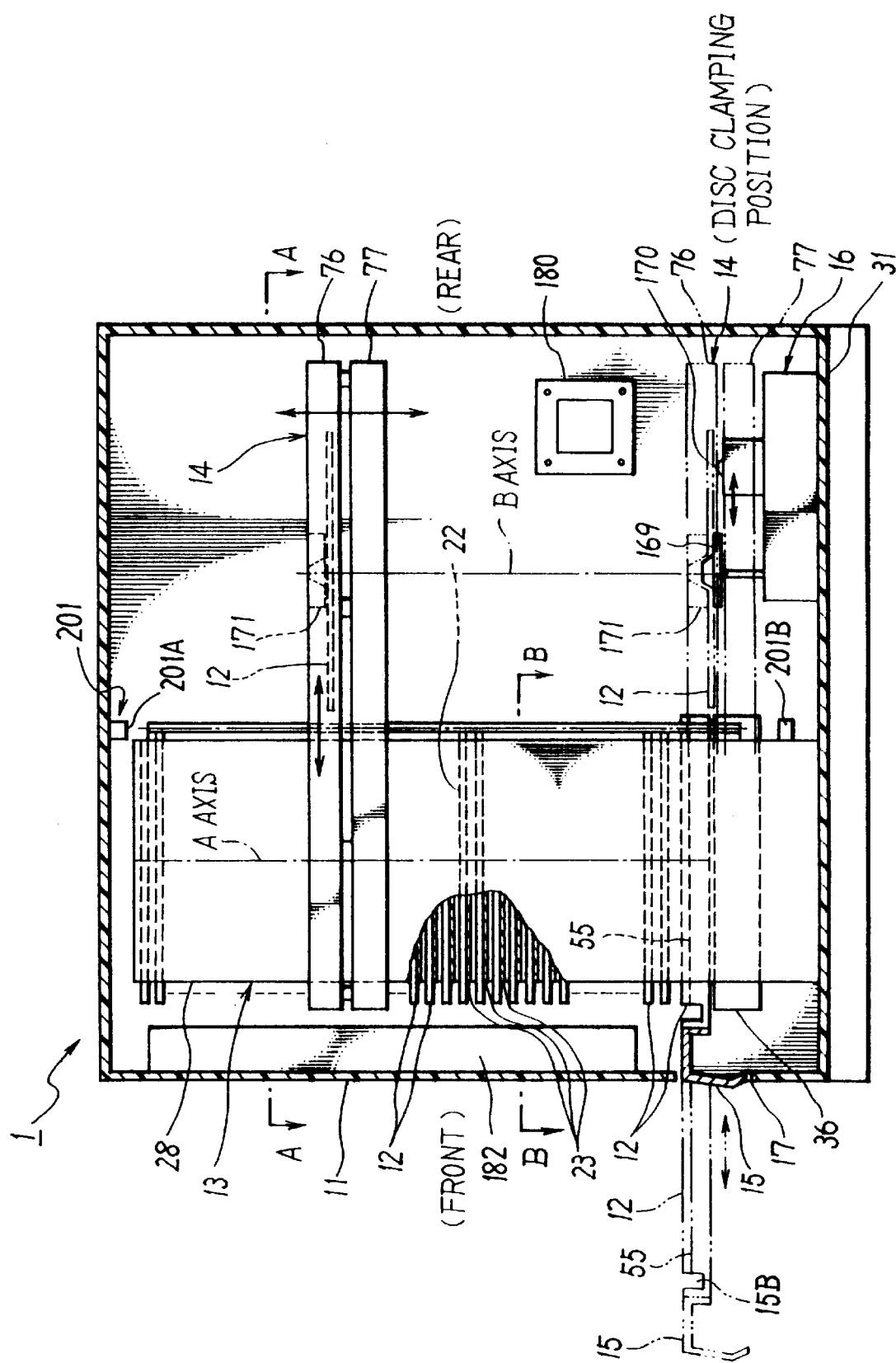
FIG. 1 is a cut-away view illustrating a construction of an auto disc changer 1 according to the present invention.

FIG. 1 illustrates an auto disc changer 1 according to the present invention. With the auto disc changer 1, a stocker 13 which is a means for storing a number of discs vertically, is mounted in an approximately rectangular solid cabinet 11, and a carriage 14, which is a means for transferring discs 12 to the stocker 13, is positioned behind the stocker 13 and moves vertically. A disc tray 15, which is a means for removing and loading a disc out of and into the cabinet 11, is positioned below the stocker 13. A player 16, which is a means for playing a disc 12 is positioned behind the disc tray 15.

The discs 12 stored in the stocker 13 are arranged in a column with their centers on an A axis and when the disc tray 15 closes the disc 12 held in the disc tray 15 is also positioned with its center on such A axis. The carriage 14 moves parallel to the A axis as described below, and both the disc 12 in the carriage 14 and on the turntable 169 of the player 16 are positioned with their centers on a B axis which is parallel to the A axis. With the changers currently in use, a power supply switch turns on and off a secondary power supply for controlling a direct current and maintains a connection with a first power supply for an alternating current in order to perform operations using, for example, a timer.

Figure 2:
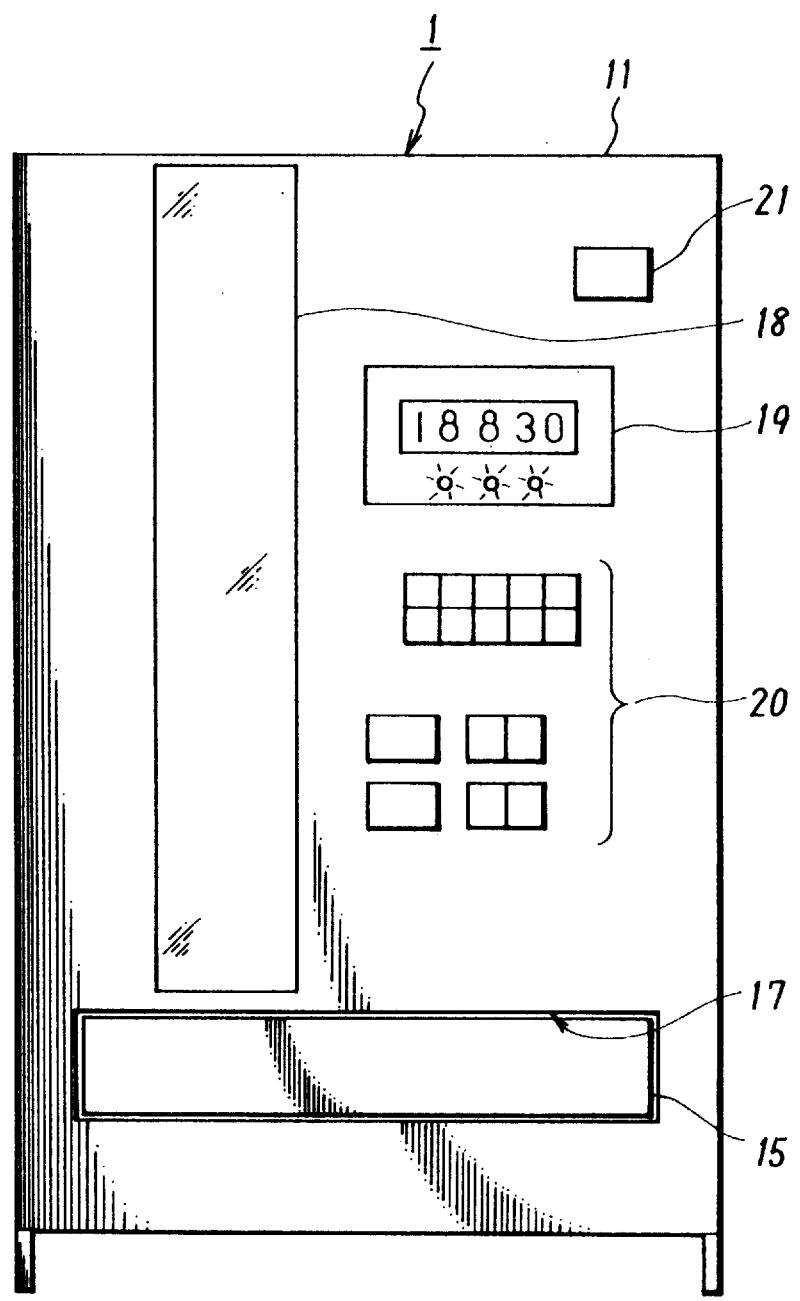
FIG. 2 is a frontal view of an embodiment according to the present invention.

Referring to FIG. 2, an tray portal 17 is built into the lower portion of the front of the cabinet 11, and the disc tray 15 slides in and out of such portal. In addition, a transparent window 18 through which the user can observe the discs 12 stored inside the unit, a display 19 for displaying disc storage position numbers for the discs 12 stored and the disc 12 being played, various controls 20, and a power supply button 21 which turns on and off the secondary power supply are all built on the front of the cabinet 11. Unless further specific comment is required with the first power supply, the secondary power supply is referred to hereinafter, together as the unit power supply. Inside the cabinet 11, a transformer 180 and a control unit 182 are mounted as shown in FIG. 1.

Figure 3:
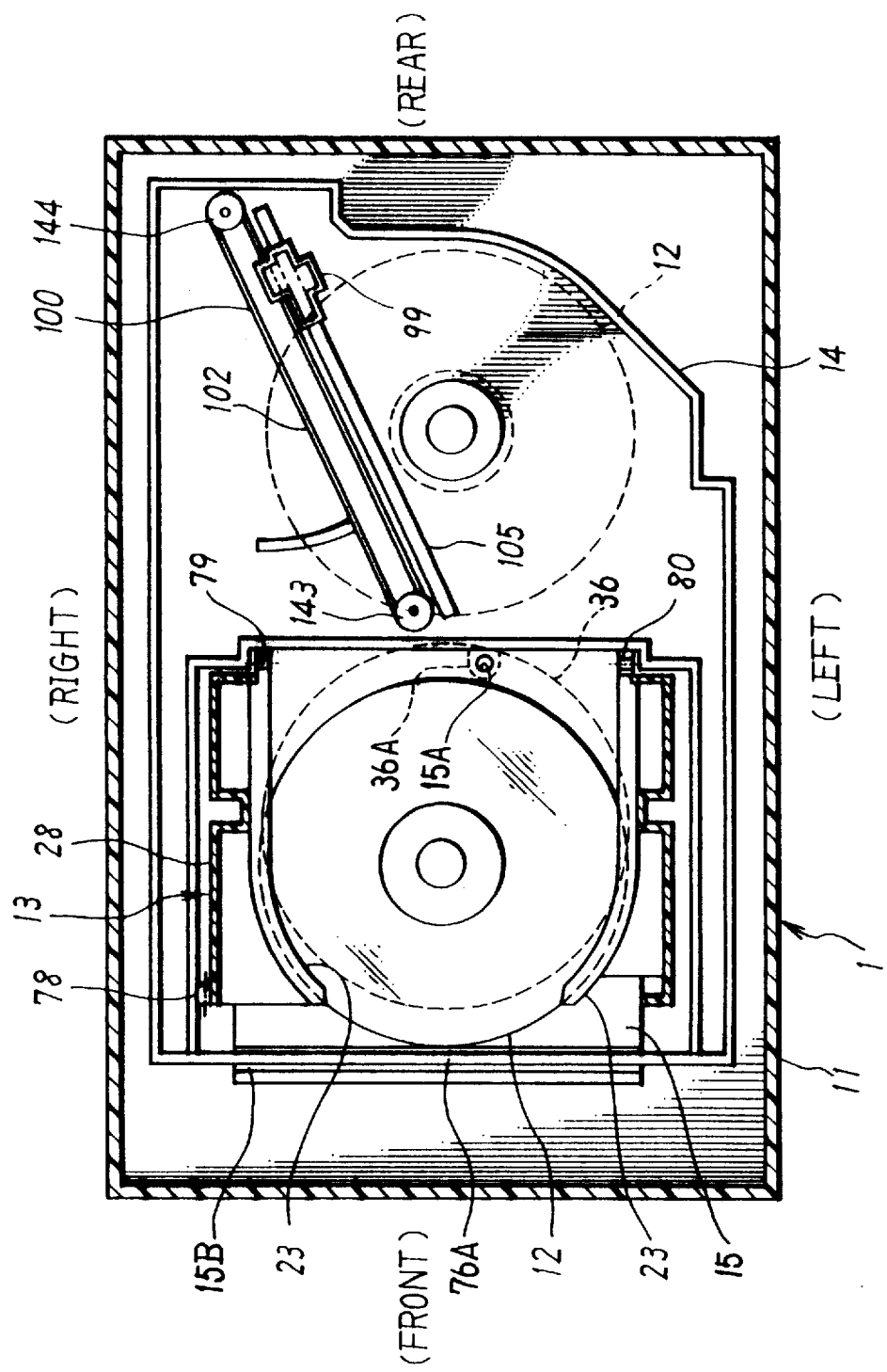
FIG. 3 is a cross-sectional view from line A—A of FIG. 1.

As shown in FIG. 1, a number of storage spaces for disc storage 22 are arranged vertically along the A axis in the stocker 13. The disc storage spaces 22 are partitioned off from each other by shelves 23 which are formed of thin plates on which the discs 12 are placed for storage. As shown in FIG. 3, each shelf 23 is divided into two portions in order to hold the two opposite sides of the disc 12, and the fronts of the two portions are made from long strip-like plates which are curved to match the circumference of the disc 12.

Figure 4:
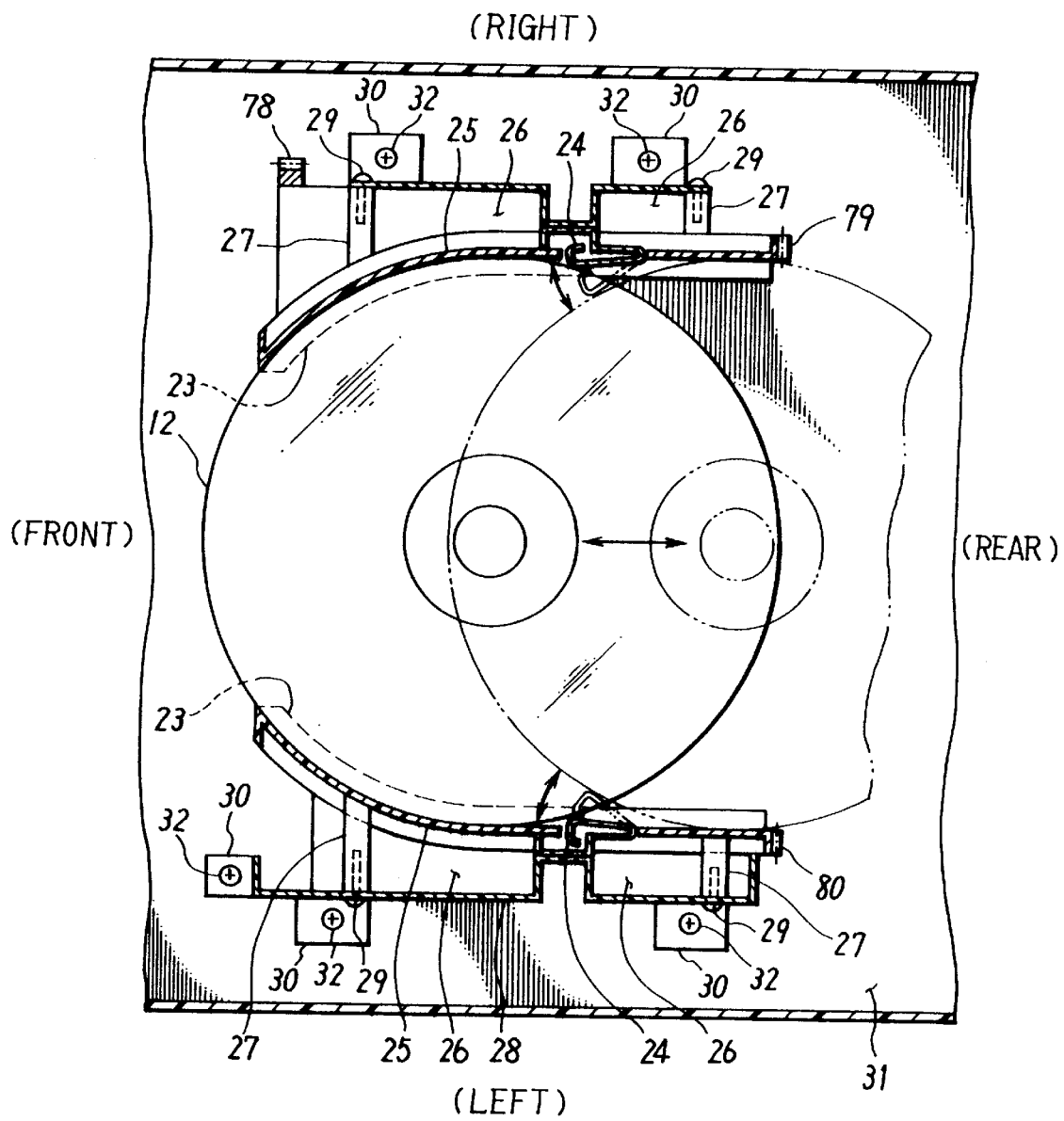
FIG. 4 is a cross-sectional view from line B—B of FIG. 1.

Referring to FIG. 4, flat springs 24 for holding the disc 12 inside the storage space 22 are attached to each shelf 23 of the stocker 13 in order to prevent the disc from accidentally falling from the shelf 23. The flat springs 24 are positioned behind the center of the stored disc 12 at an appropriate distance and hold the disc 12 inside between the two portions, the distance between which two portions is shorter than the diameter of the disc 12. Accordingly, the disc 12 is held in position by being pressed toward the front edges of the portions of the shelves 23, the gap between which portions is narrow, and thus, all of the discs 12 are arranged along the A axis. Each shelf 23 projects from the side board 25, which is reinforced by ribs projecting from the opposite side to the shelf 23. A column-shaped projection is formed on the side board 25 between the ribs 26 and is fixed to a support 28 with a screw 32. A leg 13 is formed on the lowermost edge of the support 28 and is firmly fixed to the base 31 with a screw 32. Racks 78, 79, and 80 are positioned on the outside of the stocker 13 in appropriate positions, at the front and back edges of the right side and the back edge of the left side in this embodiment, and are used when the carriage 14 moves.

A disc presence detection sensor 201 which detects the presence of the discs 12 in the shelves 23 and of the disc tray 15, is mounted as shown in FIG. 1. The disc presence sensor is comprised of a combination of a light-emitting device 201A and a light-receiving device 201B. The light-emitting device 201A is positioned on the underside of the top of the cabinet 11 at the rear of the stocker 13 or at the top of the stocker 13 itself, and the light-receiving device 201B is positioned at the bottom of the cabinet 11 near an inner side portal located at the bottom rear of the stocker 13. A light-emitting diode is suitable for the light-emitting device 201A. A photo diode or a photo transistor is suitable for the light-receiving device 201B.

As shown in FIG. 3, a hole 15A through which a light from the light-emitting device 201A is transmitted, is formed into the inner side portal of the disc tray 15. A piece of the fixed tray 36 is cut away in a position corresponding to the hole 15A, so that the light from the light-emitting device 201A is transmitted through the hole 15A and the cut out portion 36A to the light-receiving device 201B when in a detection operation.

Although, in the above description, the transmission-type optical sensor is used as the disc presence sensor 201, a reflection-type optical sensor can also be used, and a supersonic sensor can be used instead of an optical sensor.

Referring to FIG. 1, the disc tray 15 is positioned under the disc storage spaces 22 of the stocker 13. The disc tray 15 is used when a disc 12 is placed into the stocker 13 through the carriage 14, when a disc 12 is taken out of the auto disc changer through the carriage 14, in a fashion similar to the storage operation for a disc 12 in the stocker 13, and when a disc 12 is loaded into the auto disc changer 1 to be played directly. The disc tray 15 is positioned above a middle tray 33 as shown in FIG. 5, and can move only forward and backward using the guide rail 34 for the middle tray 33 and the groove-shape guide 35 for the disc tray 15.

Figure 5:
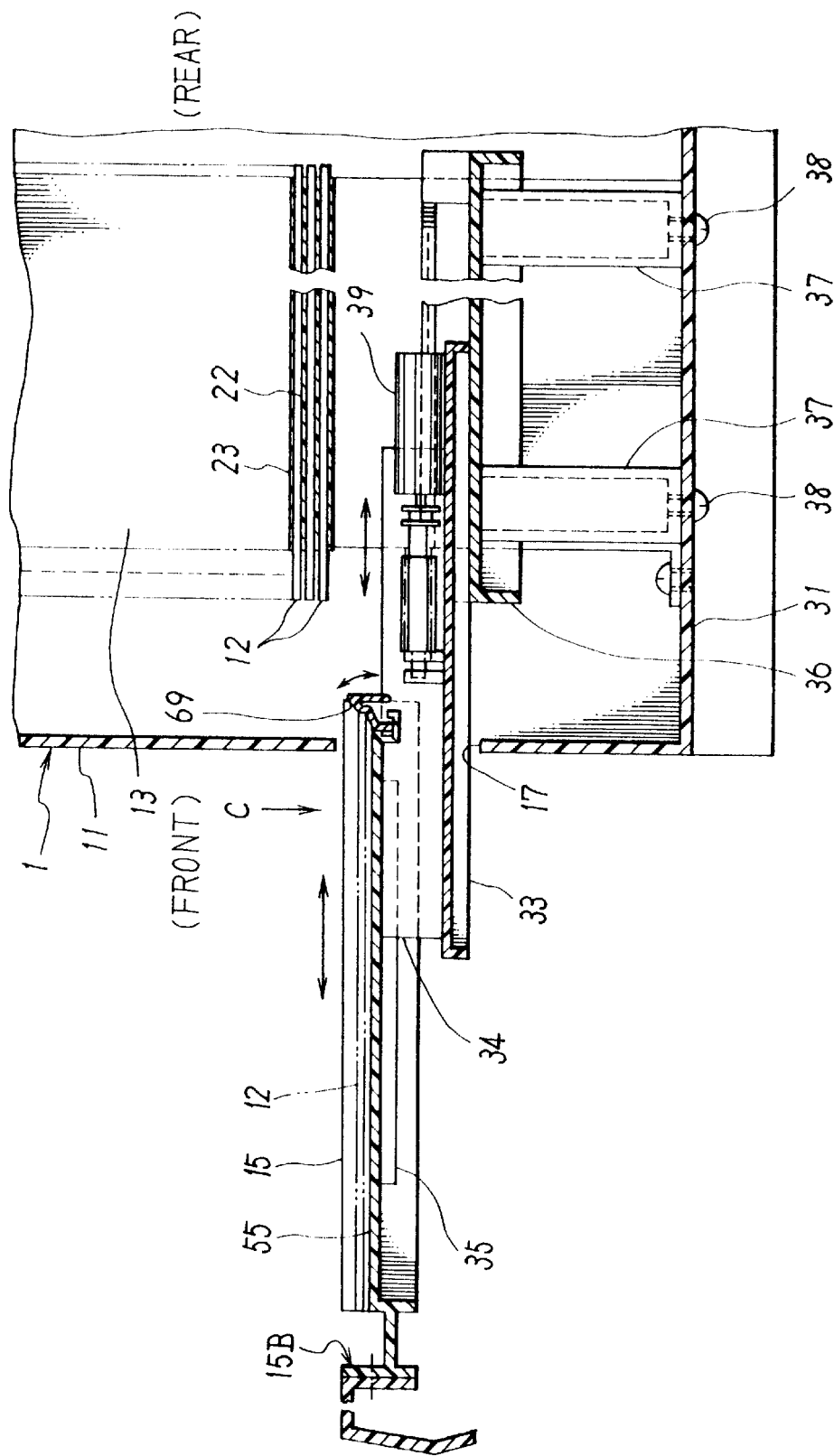
FIG. 5 is a cross-sectional side view of a disc tray 15.

As shown in FIG. 3 and FIG. 5, a groove 15B for regulating the movement of the disc tray 15 is formed at the disc storage side of the disc tray 15, and a regulating bar 76A positioned in the carriage 14 (described below) is fitted into the groove 15B.

The middle tray 33 can move forward and backward on the fixed tray 36, using a proper guide means (not shown).

The fixed tray 36 has legs 37, which are attached to the base 31 with screws 38.

Figure 6:
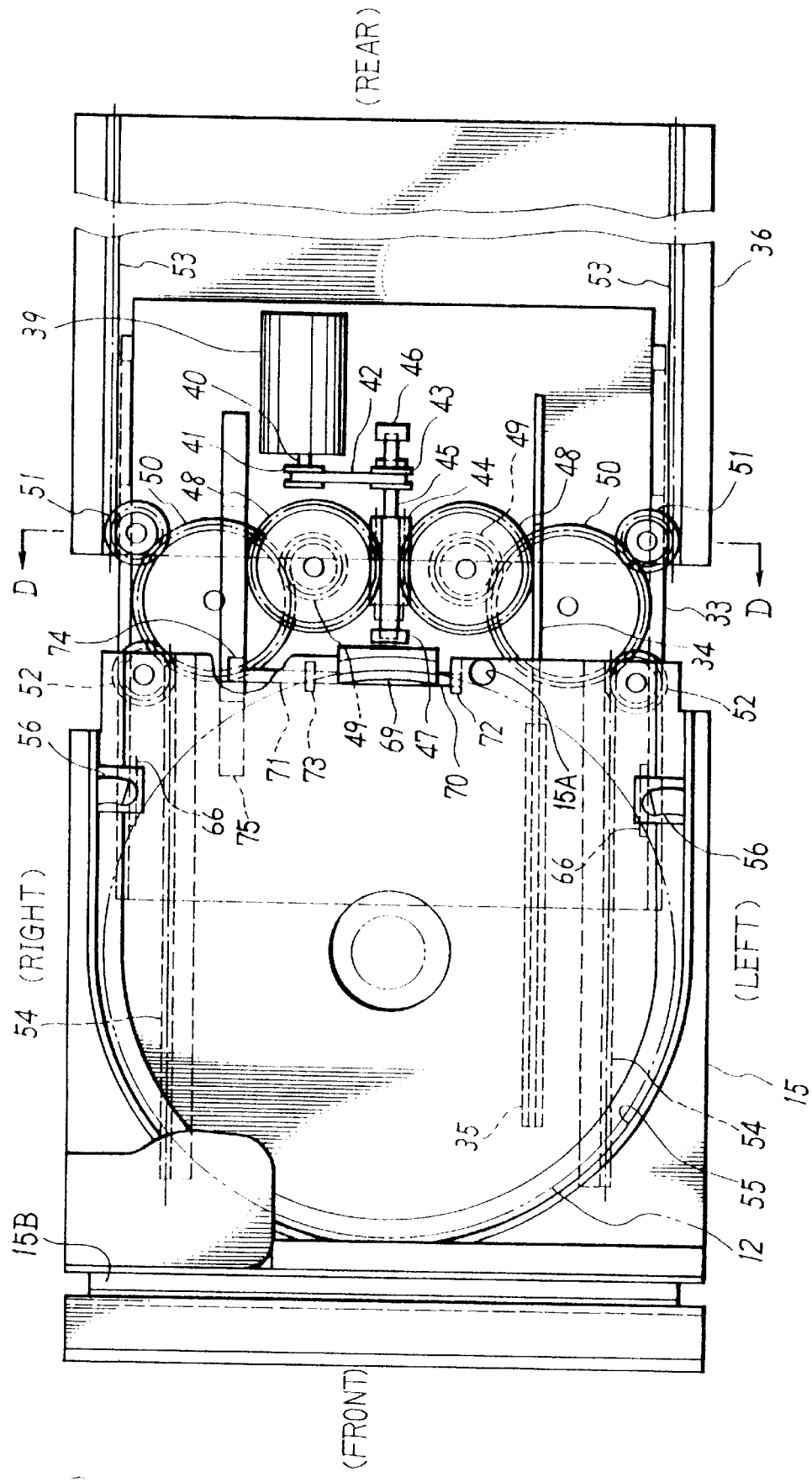
FIG. 6 is a view from arrow C of FIG. 5.
Figure 7:
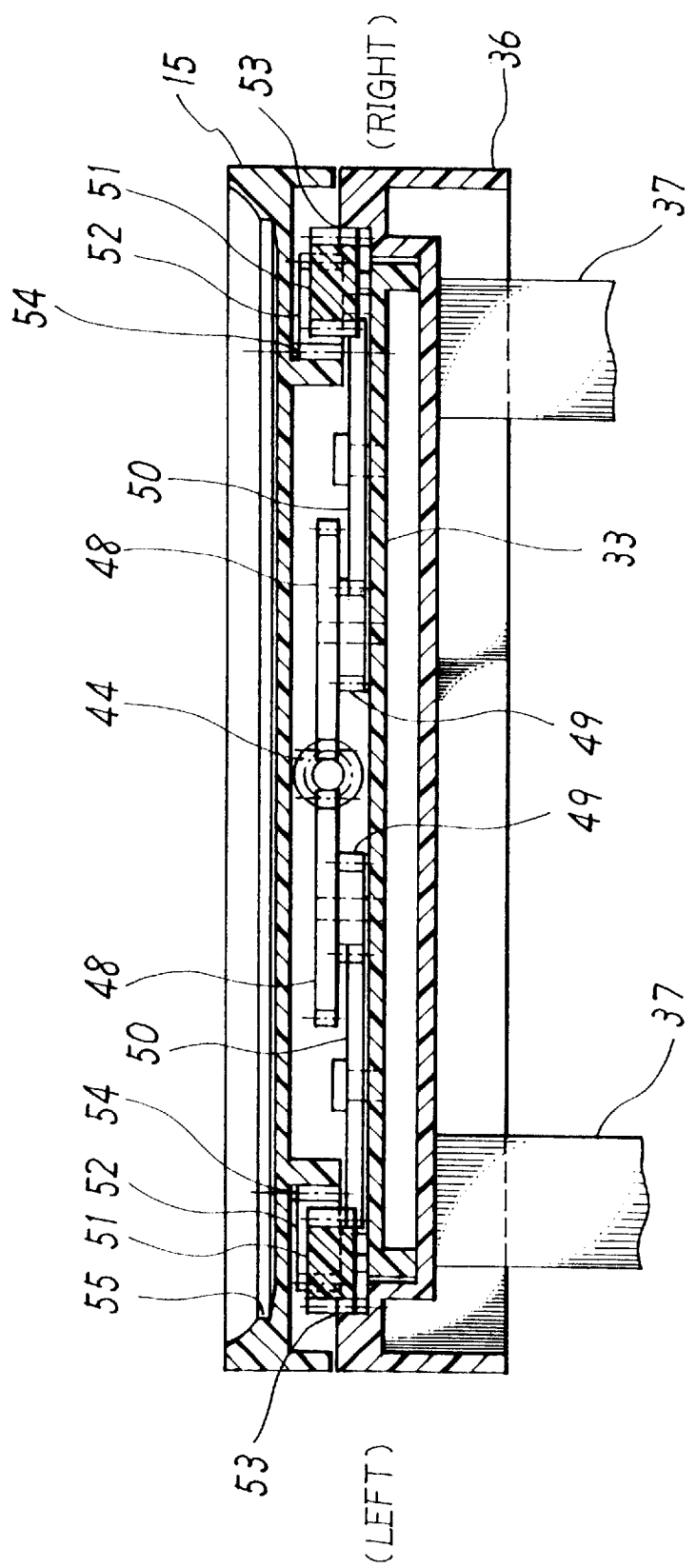
FIG. 7 is a cross-sectional view from line D—D of FIG. 6.

As shown in FIG. 6, a motor 39 is mounted on the upper side of the middle tray 33, near its rear, and the rotation of a shaft 40 on the middle tray 33 is transmitted via a pulley 41, a belt 42, and a second pulley 43 to a worm 44. A pivot 45 of the worm 44 is held by bearings 46 and 47 onto the middle tray 33. The rotation of the worm 44 is transmitted via worm wheels 48 which are positioned at the right and left sides of the worm 44 and via first gears 49 and second gears 50 which are built onto the underside of the worm wheels 48 to first pinions 51 and second pinions 52. Additionally, as shown in FIG. 7, racks 53 which extend from the front to the rear are formed on the right and left insides of the fixed tray 36 and gear with the first pinions 51. Racks 54 which extend from the front to the back are formed on the right and left sides of the disc tray 15, and gear with the second pinions 52.

When the motor 39 is rotated, the right and left worm wheels 48 are rotated in directions opposite to each other as are the right and left first pinions 51. Therefore, the middle tray 33 can move forward or backward. Simultaneously, the right and left second pinions 52 are rotated in directions opposite to each other and the disc tray 15 moves forward or backward. Since the first pinion 51 and the second pinion 52 on the same side are rotated in the same direction, the middle tray 33 and the disc tray 15 move simultaneously in the same direction. This makes it possible to lengthen the distance which the disc tray 15 can move. FIG. 5 illustrates a situation in which the disc tray 15 is opened and the area 55 where the disc 12 is placed is clearly exposed outside the cabinet 11, making it easy to place or remove a disc 12. As shown in FIG. 1, when the disc tray 15 closes, the disc 12 placed in the disc area 55 is positioned with its center on the same A axis as the discs 12 which have already been stored.

As shown in FIG. 6, disc regulators 56 for regulating the disc 12 at a predetermined position and for extracting only the lower disc 12 when two discs are accidentally placed together, are positioned on the right and left side of the disc area 55 of the disc tray 15. The disc regulators 56 are positioned near the rear at a predetermined distance from the center of the disc 12, and are formed into approximately L-shapes as shown in FIG. 8. The top of a longer side portion 57 of the disc regulator 56 is attached rotatably to a shaft 58 which projects from the underside of the disc tray 15. A coiled spring 59 is wound around the shaft 58. One end 60 of the coiled spring 59 is hooked to the disc tray 15 and the other end 61 is hooked to the longer side portion 57.

Accordingly, the short side portion 62 of the disc regulator 56 is always biased toward the inside.

A side regulator 63, a disc guide 64, and a disc-transfer prevention part 67 are integrally molded together with the short side portion 62 as shown in FIG. 9. A portion of the upper edge of the side regulator 63 and the disc guide 64 are inserted into an opening made 68 on the disc tray 15 so that they are exposed above the surface of the disc tray 15.

The side regulator 63 is formed so as to be in contact with the circumference of the disc 12, and a guide plate contact portion 63A which is in contact with a guide plate 66 is formed onto the lower side of the side regulator 63.

Figure 9A:
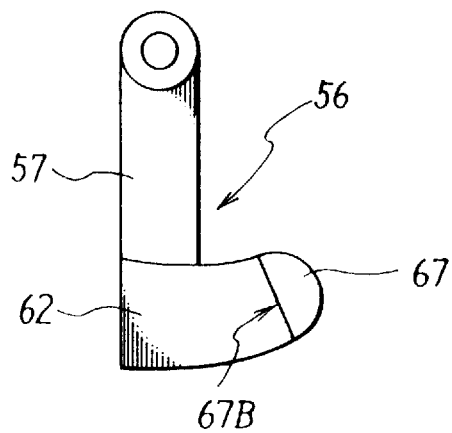
FIG. 9A, FIG. 9B, and FIG. 9C are detailed views of portions of a disc regulator according to the present invention.
Figure 9B:
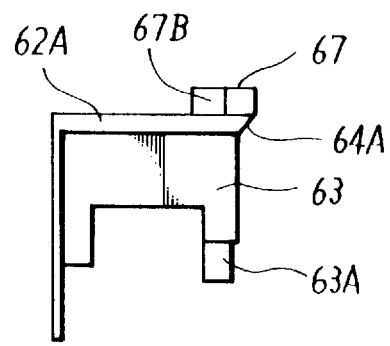
Figure 9C:
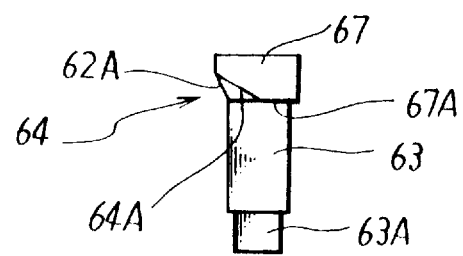

As shown in FIG. 9A, the disc-transfer prevention part 67 is formed into a semicircular projection, and is longer toward the circumference of the disc than the side regulator 63 as shown in FIG. 9B. The right side of the lower side of the projection shown in FIG. 9C is formed into a flat face 67A, and the left side is formed into a inclined face 64A. The inclined face 64A joins with a narrow inclined face 62A as shown in FIG. 9B and FIG. 9C, and they constitute the disc guide 64. As shown in FIG. 9B, because the disc-transfer prevention part 67 protrudes higher than the upper side of the short side portion 62, the projection 67B comes in contact with the side of the disc tray 15 so that the disc regulator 56 which is rotated outward is regulated. Such projection 67B acts as a stopper.

Figure 10:
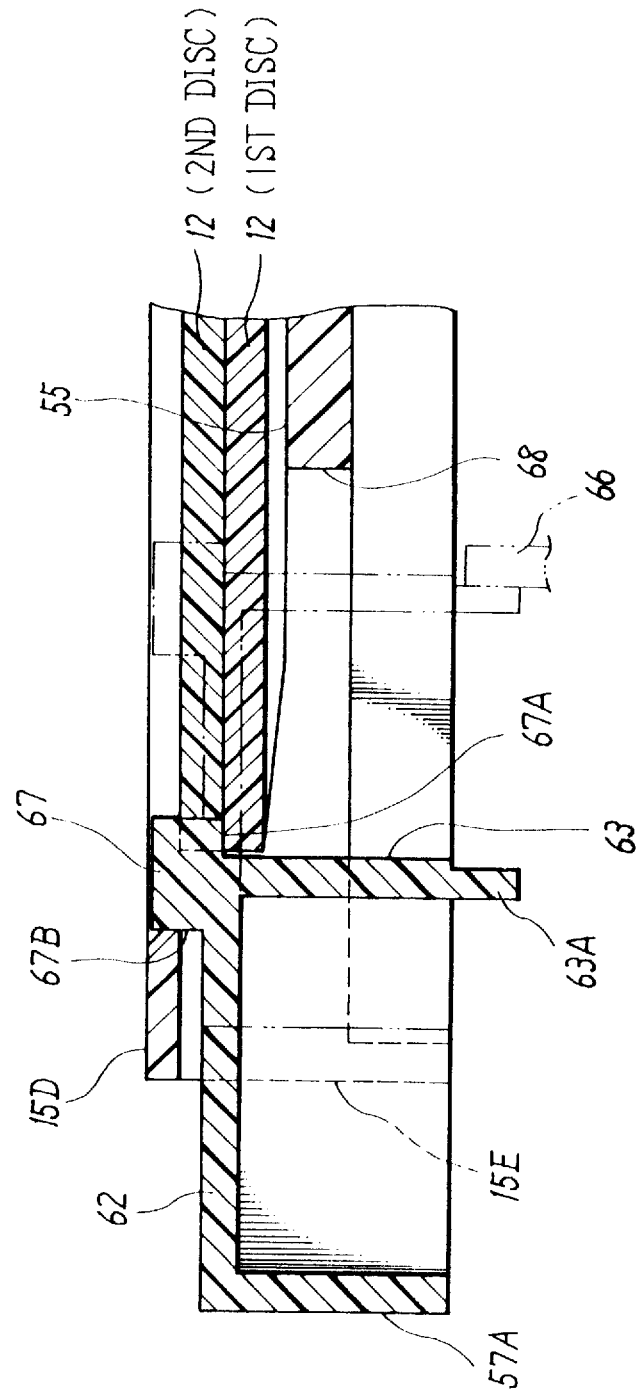
FIG. 10 is a cross-sectional view from line E—E of FIG. 8.

As described above, the disc-transfer prevention part 67 protrudes from the side regulator 63, and accordingly, when two discs 12 are stored in the disc tray 15, this prevents the discs 12 from being transferred from the disc tray 15. As shown in FIG. 10, the flat face 67A of the disc-transfer prevention part 67 is in contact with the upper side edge of the upper disc 12, the upper side of the disc 12 is held. When the disc 12 is stored from the carriage 14 into the disc tray 15, the inclined face 64A constituting the disc guide 64 comes in contact with the circumference of the disc 12 in order to guide the disc 12 into the disc tray 15.

Figure 8A:
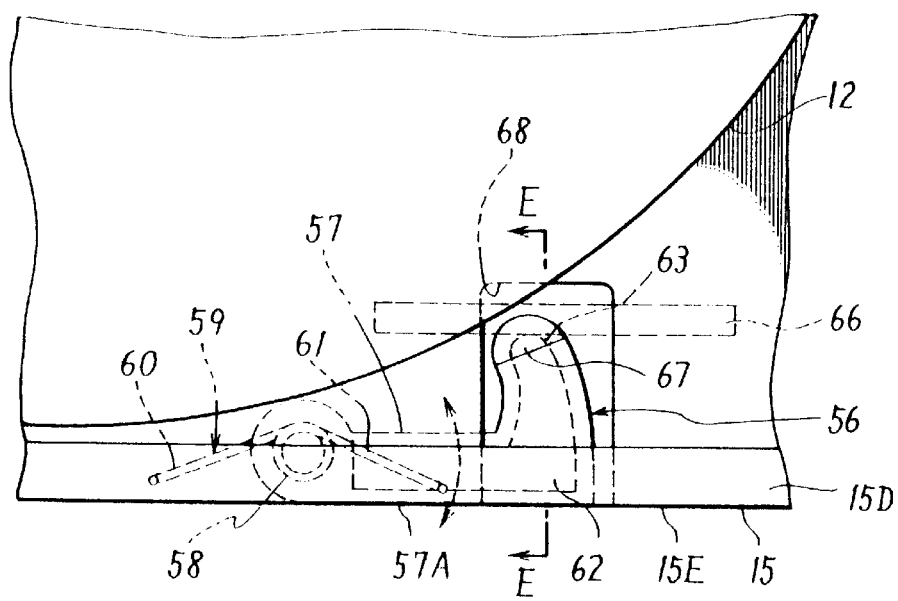
FIG. 8A and FIG. 8B are views showing a construction of a disc regulator 56 according to the present invention.

FIG. 8A and FIG. 10 show the construction of the right and left disc regulators 56. When the disc tray 15 is opened, the guide plate contact portions 63A, which are built on the underside of the side regulators 63 which are parts of the right and left regulators 56, come in contact with the guide plates 66 built on the upper sides of the middle tray 33, so that the side regulators 63 of the disc regulator 56 and the disc-transfer prevention part 67 are moved away from the disc 12. In other words, a retracting means for the disc regulators 56 used as a biasing means comprise the guide plate contact portions 63A built on the underside of the side regulators 63 and the guide plates 66.

Accordingly, the disc 12 can be easily loaded and removed. The outer side 57A of the long side portion 57 of the disc regulator 56 corresponds to the outer side 15E of the disc tray 15, improving the appearance.

Figure 8B:
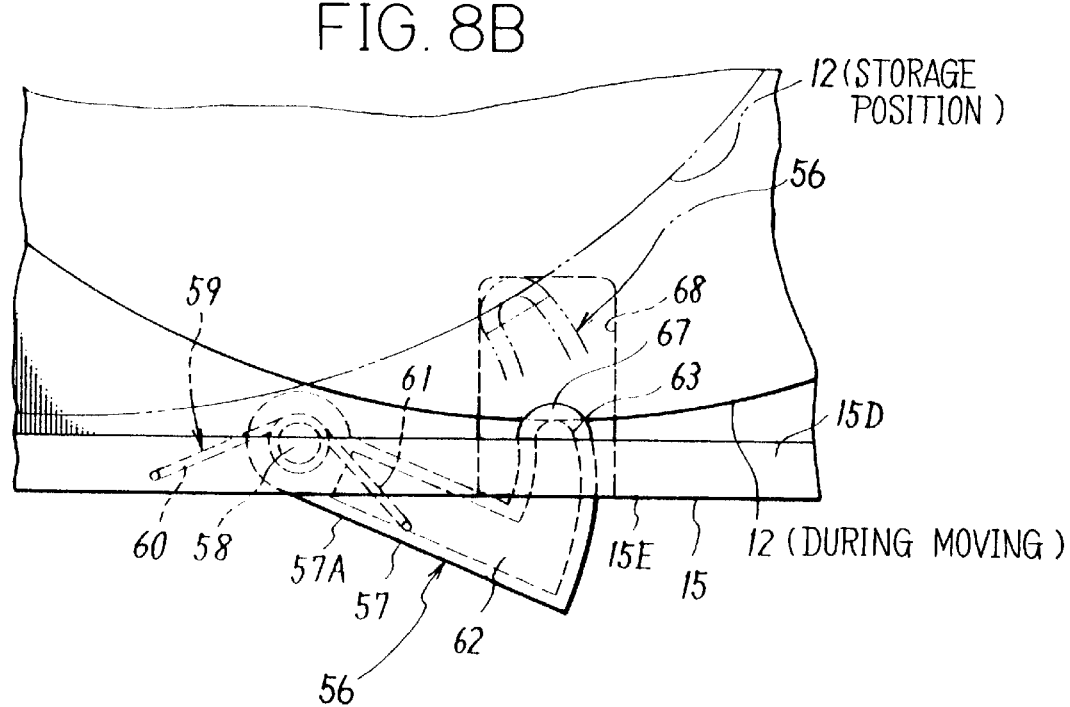

When the user places a disc 12 on the disc area 55 and presses the button, the disc tray 15 is drawn. At that time, as shown in FIG. 8B with the double dotted dash line, the side regulator 63 of the disc regulator 56 moves off the guide plate 66, and presses the circumference of the disc 12 onto the disc area 55 so that the flat face 67 of the disc-transfer prevention part 67 comes in contact with the upper edge of the disc 12. Accordingly, the side and the upper side of the disc 12 are held in position, and the disc 12 is securely drawn in without falling out of position. When a disc 12 is removed, the operation is similar to the above.

When the disc tray 15 closes and the disc 12 is transferred to the carriage 14, as shown with the solid line in FIG. 8B, the disc 12 is moved by a rotation lever 159 (described below), and when the side regulator of the disc regulator 56 comes in contact with the circumference of the disc 12, the short side portion 61 of the disc regulator 56 is pressed outward by moving the disc 12. The disc regulator 56 is rotated outward against the biasing force of the coiled spring 59, and the projection 67B of the disc-transfer prevention part 67 comes in contact with the side 15D of the disc tray 15, at which point the rotation of the disc regulator 56 is stopped (the maximum opened position as shown in FIG. 10). In this situation, the distance L1 between the side regulators 63 of the right and left disc regulators 56 is slightly greater than the diameter of the disc 12, thereby allowing the disc 12 to pass between the right and left disc regulators 56.

Figure 11:
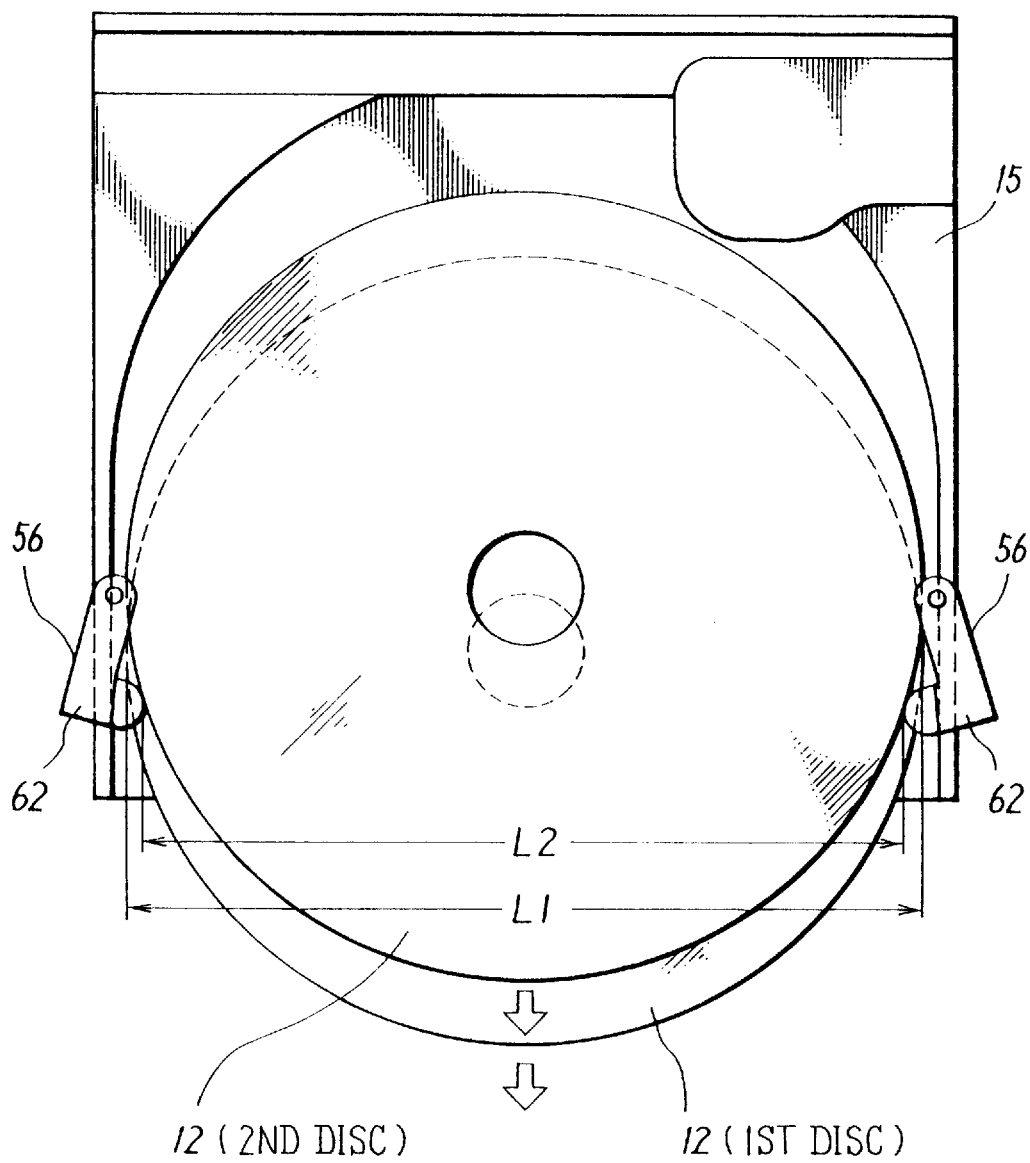
FIG. 11 is a view showing the working of a disc regulator 56 according to the present invention.

An operation in which the user places two discs 12 on the disc tray 15 by mistake, the disc tray 15 is closed, and the discs are transferred into the carriage 14, is described below with reference to FIG. 10 and FIG. 11.

In this situation, the two discs 12 stacked together are moved by the rotation lever (described below), and the short side portions 62 of the right and left disc regulators 56 are pressed outward by the discs 12. The lower disc 12 presses the side regulator 63, while the upper disc 12 presses the disc-transfer prevention part 67. As described above, when the rotation of the disc regulator 56 is stopped, the lower disc 12 can pass between the side regulators of the right and left disc regulators 56, in a fashion similar to when only one disc 12 is placed on the disc tray 15. The second disc 12 (upper disc) is moved together with the first disc 12 (lower disc) by a disc chuck 99 described below, and the disc-transfer prevention parts 67 of the right and left disc regulators 56 inhibit the second disc 12 from moving. This is because the distance L2 between the right and left disc-transfer prevention parts 67 is slightly less than the diameter of the disc 12 in the maximum opened position.

As shown in FIG. 5 and FIG. 6, a stopper 69 is attached at the rear edge of the disc tray 15 in order to prevent the disc 12 from accidentally falling. The stopper 69 is built to an appropriate length, and shafts 70 and 71 made on both of its sides are held rotatably by bearings 72 and 73. As shown in FIG. 6, a flat plate portion 74 having the same thickness as the diameter of the shaft 71 and a proper length and width, is positioned on the end of the shaft 71, with its plate face 74A is positioned so as to be in contact with a strip-shaped rotation regulator 75 which projects from the upper side of the middle tray 33. This is also shown in FIG. 12.

Figure 12A:
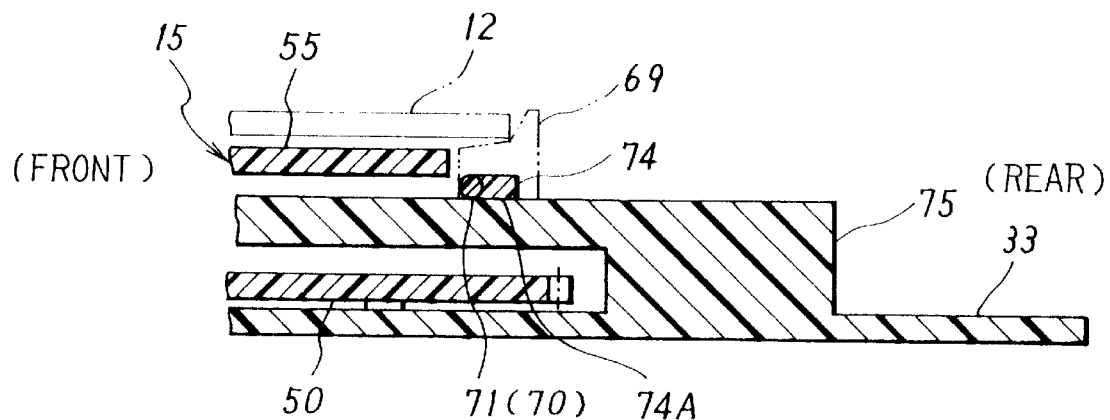
FIG. 12A and FIG. 12B are cross-sectional views of an opening and closing mechanism of a stopper 69 according to the present invention.
Figure 12B:
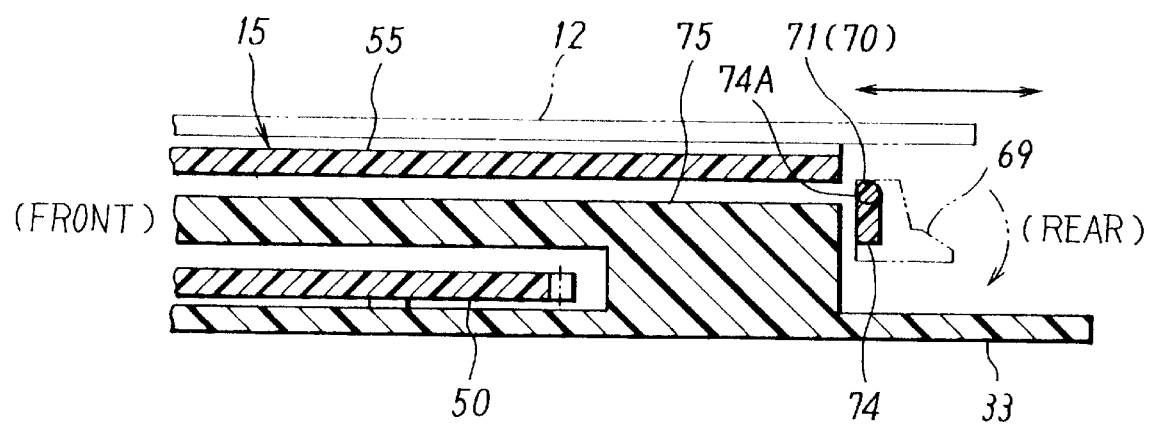

When the disc tray 15 is moving or is opened, the plate face 74A of the flat plate portion 74 is in contact with the upper side of the rotation regulator 75 as shown in FIG. 12A, and the stopper 69 is forced into a vertical position. Since the stopper 69 is not opened when the disc 12 presses the stopper 69, the disc 12 is prevented from accidentally falling. On the other hand, when the disc tray 15 is closed, the flat plate portion 74 is positioned away from the rotation regulator 75 as shown in FIG. 12B. Since the shafts 70 and 71 are positioned at the front edge of the stopper 69, the stopper 69 is rotated clockwise by its own weight with the shafts 70 and 71 forming the center. The stopper 69 is retracted from the course through which the disc 12 passes, and this makes it possible to move the disc 12. As described above, since the stopper 69 is opened and closed by the flat plate portion 74 and the rotation regulator 75, the stopper 69 is not opened when the disc 12 is placed on the opened disc tray 15 and therefore, even if the disc 12 is accidentally knocked against the stopper 69, the disc 12 does not fall off.

Figure 13:
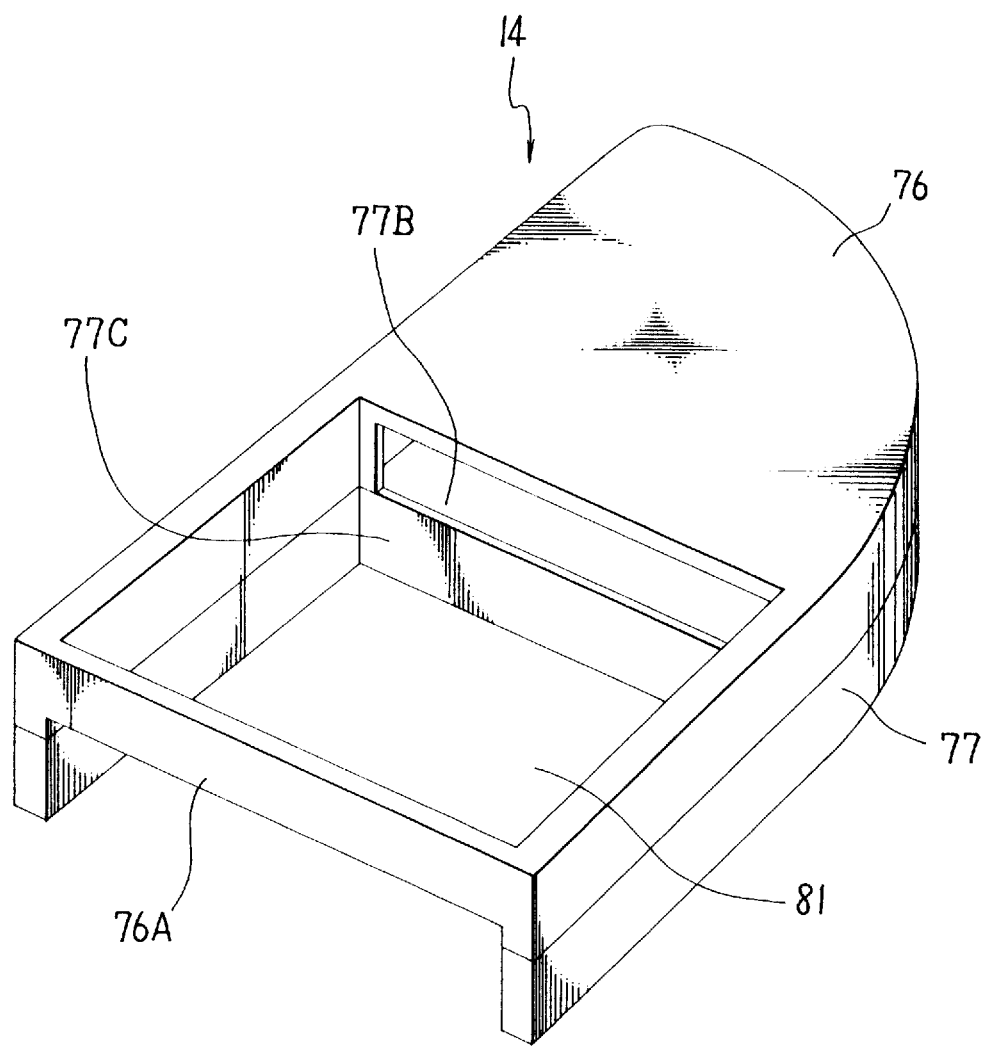
FIG. 13 is a perspective view illustrating a construction of upper and lower cases according to the present invention.

The carriage 14 shown in FIG. 1 is described below. As shown in FIG. 13, the carriage 14 comprises an upper case 76 and a lower case 77 which are attached with a screw or other means, and various other kinds of parts for loading and removing the disc 12 and for moving the carriage 14 up and down, are positioned between them. A regulation bar 76A is formed onto the front of the upper case 76. As described below, when the disc 12 is played back, the regulation bar 76A is inserted into a groove 15B of the disc tray 15, preventing the disc tray 15 from being accidentally opened. An inner side portal 77B through which the disc 12 is loaded to and removed from the disc storage positions 22 of the stocker 13 and the disc tray 15, is formed into the carriage 14. A disc stopper 77C is made on the lower side of the inner side portal 77B, and prevents the disc from accidentally falling into the unit.

The construction of the carriage 14 is described below in detail with reference to FIG. 14. The left side of the upper case 76 and the lower case 77 are formed into arc-shapes, and a rectangular stocker passing opening 81 through which the stocker 13 passes is located at the front half portions of the upper case 76 and lower case 77. Ribs 98 for reinforcement are positioned at the circumferences of the upper and lower cases 76 and 77. A stepping motor 82 is positioned at the right center of the lower case 77, and a first gear 84 is attached to its shaft 83. Rotation of the stepping motor 82 is transmitted via the first gear 84, a second gear 85, a third gear which is built onto the second gear 86, and a fourth gear 87, to a fifth gear 88. A worm 89 is built onto the lower side of the fifth gear 88, and gears with worm wheels 90 and 91 which are positioned apart from each other at a right angle.

Shafts 92 and 93 are attached to the worm wheels 90 and 91 respectively, and both ends of the shafts 92 and 93 are held rotatably by bearings 94. A pinion 95 is attached to the front end of the shaft 92 which is parallel to the right side of the carriage 14, while pinions 96 and 97 are attached to the right and left ends of the shaft 93 which extends from the right to the left at the center of the carriage 14. These three pinions 95, 96, and 97 gear respectively with racks 78, 79, and 80, which are positioned at the corners of the stocker 13, as shown in FIG. 4. Accordingly, when the stepping motor 82 is rotated, the pinions 95, 96, and 97 are rotated and the carriage 14 moves along the longer side of the stocker 13 (vertically). Accordingly, it is possible to load and remove any of the discs 12 into and from the stocker 13 and into and from the disc tray 15. It is also possible to control the carriage 14 to stop at a specific position to load or remove a disc by controlling the rotation number of the stepping motor 82.

Figure 14:
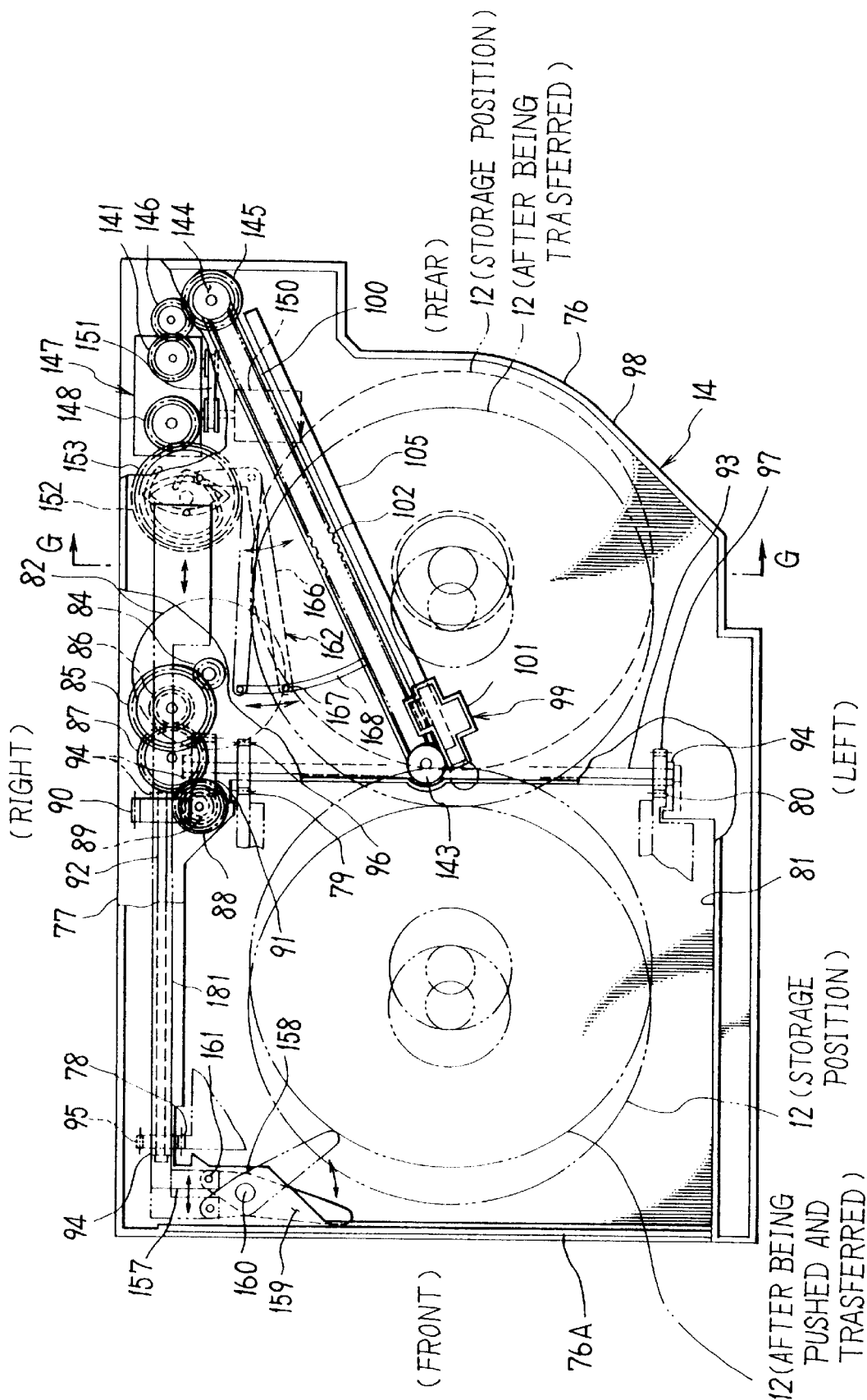
FIG. 14 is a view showing a construction of the carriage 14 according to the present invention.
Figure 15:
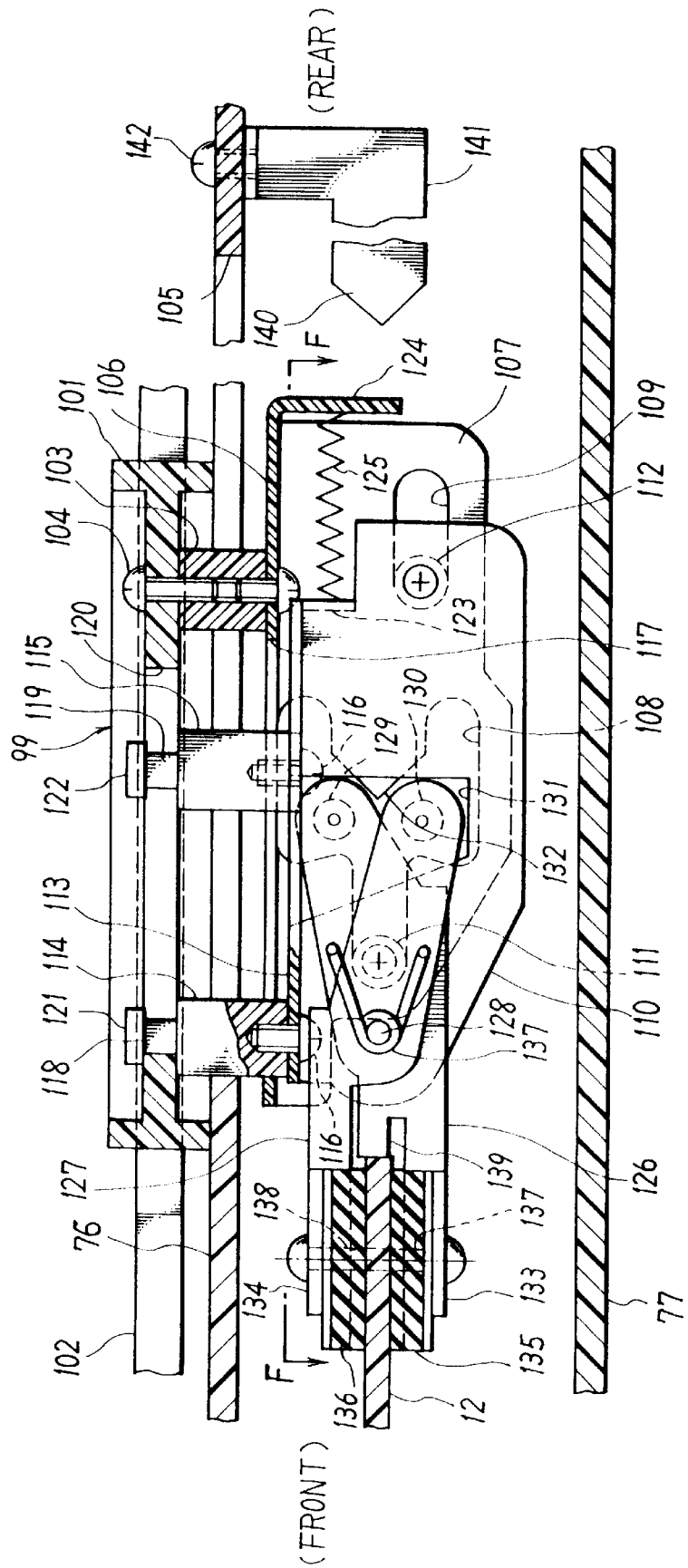
FIG. 15 is a side view of a closed disc chuck 99 according to the present invention.

As shown in FIG. 14, the carriage 14 has a disc chuck 99 with a moving mechanism 100 for moving the disc chuck 99 for transferring a disc 12 to and from the stocker 13 and the disc tray 15, and its moving mechanism 100. As also shown in FIG. 15, a moving plate 101 partially depressed in the center is positioned on the upper case 76 of the disc chuck 99 and is attached to a timing belt 102 from the moving mechanism 100. A column spacer 103 is attached to the underside of the moving plate 101 with a screw 104 and is inserted movably into a straight guide groove 105 which is formed from the center to the right rear edge of the upper case 76. A base plate 106 is fixed under the spacer 103. A side plate 107 is formed angled downward at one side of the base plate 106. A Y-shaped first guide groove 108 is made at the front portion of the base plate 106, and an oblong second guide groove 109 is made at the rear portion of the base plate 106.

A slide plate 110 is positioned slidably at the side of the side plate 107, and guide rollers 111 and 112, which are inserted slidably into each of the guide grooves 108 and 109 of the side plate 107, are attached at the front and the rear of the slide plate 110. An attachment plate 113 is positioned on the slide plate 110, and two column-shaped guides 114 and 115 are attached to the upper side of the attachment plate 113 in the front and in the rear with screws 116. The guides 114 and 115 are inserted into an oblong guide groove 117 of the base plate 106 and the guide groove 105 of the upper case 76. Guides 118 and 119 which have diameters less than those of the guides 114 and 115, are inserted into an oblong guide groove 120 of the moving plate 101. Attachments 121 and 122 which have diameters greater than that of the guide groove 120, are positioned on the top of the guides 118 and 119, and the attachment plate 113 and the slide plate 110 are prevented from falling because the attachments 121 and 122 are attached to the moving plate 101.

Since the guide rollers 111 and 112 at the front and the rear of the slide plate 110 are inserted into the first guide groove 108 and the second guide groove 109 at the front and the rear of the side plate 107, respectively, the slide plate 110 can move only backwards and forwards with respect to the side plate 107. An attachment portion 123 is positioned on the rear of the slide plate 110, and an attachment portion 124 is also positioned on the rear of the base plate 106. A compression spring is attached to these attachment portions 123 and 124, and the slide plate 110 is always biased forward with respect to the side plate 107, thereby.

Figure 16:
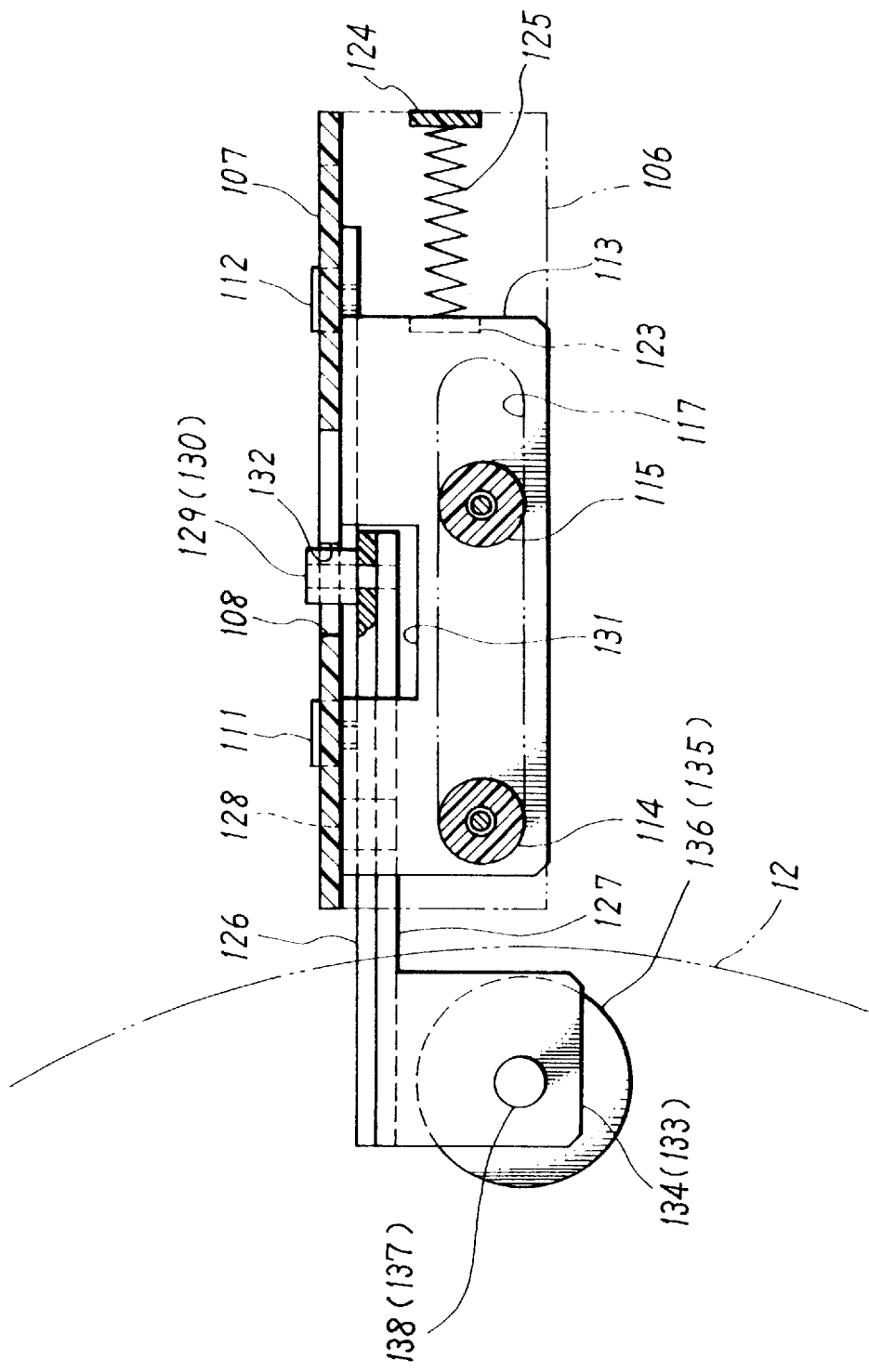
FIG. 16 is a cross-sectional view from line F—F of FIG. 15.

Two chucking levers 126 and 127 are stacked at the side of the slide plate 110, also as shown in FIG. 16, and their approximate centers are attached rotatably to a shaft 128 of the slide plate 110. As shown in FIG. 15, rollers 129 and 130 are attached to the rear edges of the chucking levers 126 and 127 respectively, and are inserted through a hole 131 in the slide plate 110 into the Y-shaped first guide groove 108 of the side plate 107. Each of rollers 129 and 130 is positioned at either side of a dagger-shape projection 132 at the rear edge of the first guide groove 108.

As shown in FIG. 16, flat plate portions 133 and 134 are made at the front edge of the chucking levers 126 and 127 respectively, and disc-shape chucking pads 135 and 136 which are formed of gum, for example, are attached rotatably with centers at the center shafts 137 and 138 to the flat plate portions 133 and 134, respectively. An appropriate space between the chucking pads 135 and 138 is retained so that the closed chucking levers 126 and 127 can securely hold the disc 12 and that the opened chucking levers 126 and 127 can completely release the disc 12.

A coil spring 137A is wound around the shaft 128, and one of its ends is hooked behind the shaft 128 at the chucking lever 126, while the other end is hooked behind the shaft 128 at the chucking lever 127. Accordingly, the chucking pads 135 and 136 are biased toward a closed position. As shown in FIG. 15, when the projection 132 of the side plate 107 is off the rollers 129 and 130 of the chucking levers 126 and 127, the chucking pads 135 and 136 are closed so as to hold the disc 12. The chucking lever 126 has a contact portion 139 for maintaining the position of the disc 12 when chucking it.

Figure 17:
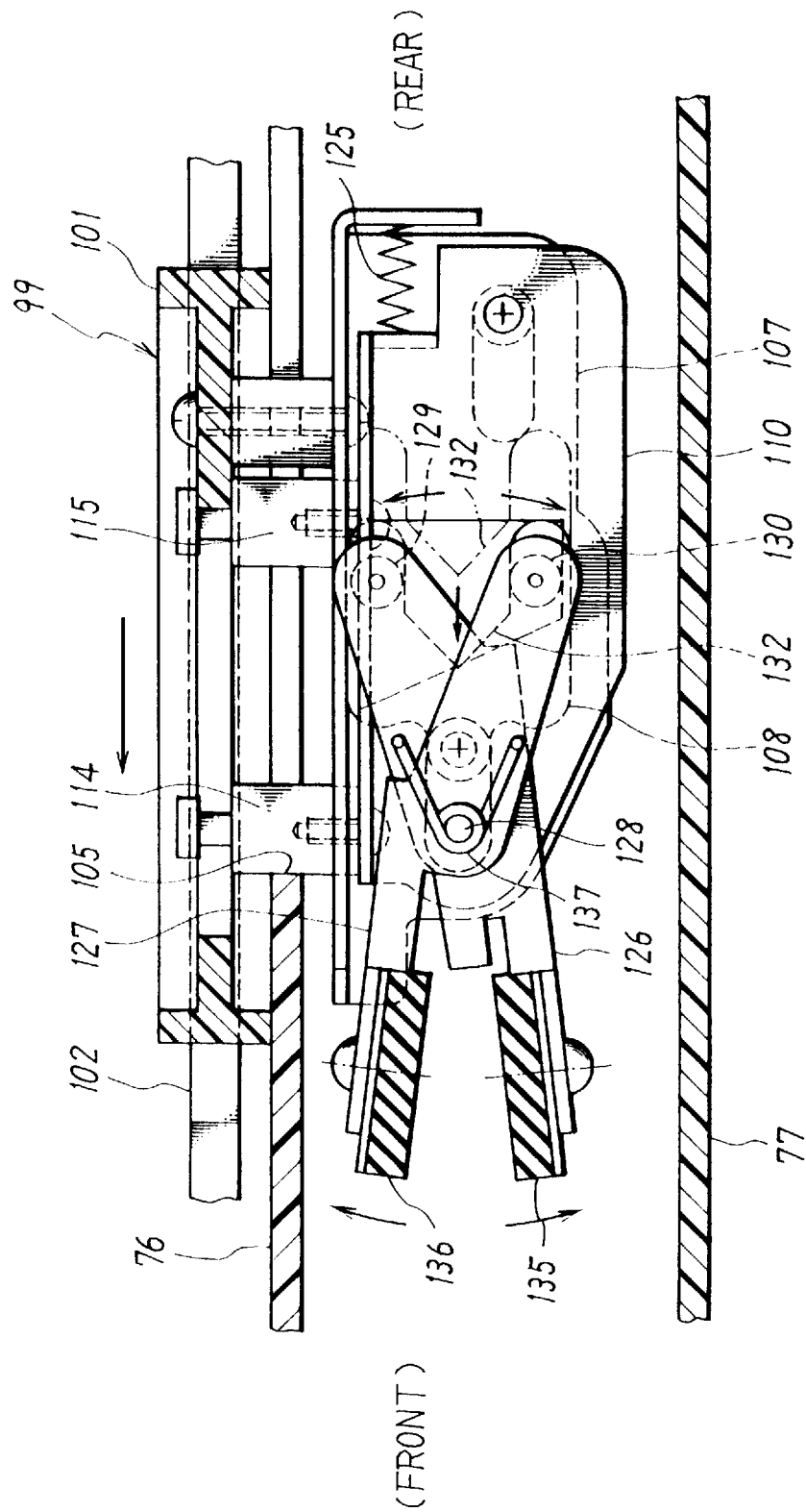
FIG. 17 is a side view of a opened disc chuck 99 according to the present invention.

Referring to FIG. 15, when the disc chuck 99 moves forward so that the front guide 114 fixed on the attachment plate 113 comes in contact with the front edge wall of the guide groove 105, the slide plate 110 stops at that position. Further, when the timing belt 102 is rotated in the same direction as before, the moving plate 101 moves as shown in FIG. 17. Simultaneously, the side plate 107 fixed on the moving plate 101 moves forward and the projection 132 of the first guide groove 108 is inserted between the rollers 129 and 130 of the chucking levers 126 and 127, thereby forcing the rollers 129 and 130 to open against the holding force of the coil spring 137A. Thus, the chucking levers 126 and 127 are rotated in opposite directions to each other with the center at the shaft 128, and the chucking pads 135 and 136 are opened so that the disc 12 is released.

Further, as shown in FIG. 15, a guide plate 141 having a dagger-shaped top 140 similar to the projection 132 of the side plate 107 is attached to the rear of the upper case 76 of the carriage 14 with a screw 142. The top 140 is set at the same height as the projection 132, and when the disc chuck 99 moves backward, the top 140 is inserted between the rollers 129 and 130 of the chucking levers 126 and 127 so as to force them to open.

The disc chuck 99 is attached to the timing belt 102 as described above. The timing belt 102 is positioned along the guide groove 105 of the upper case 76 as shown in FIG. 14, and is wound around pulleys 143 and 144 each of which is positioned at either end of the guide groove 105, so that the disc chuck 99 can move along the guide groove 105. A gear 145 is built on the rear pulley 144 and gears with a gear 146. Also, a clutch 147 is mounted on the lower case 77 and a first gear 148 and a second gear 149 are attached to the upper side of the clutch 147. The second gear 149 gears with the gear 146 described above. Rotation of a motor 150 is transmitted via a belt 151 to the clutch 147, which switches to the first gear 148 or the second gear 149. When the disc chuck 99 moves, the rotation is transmitted to the second gear 149.

Figure 18:
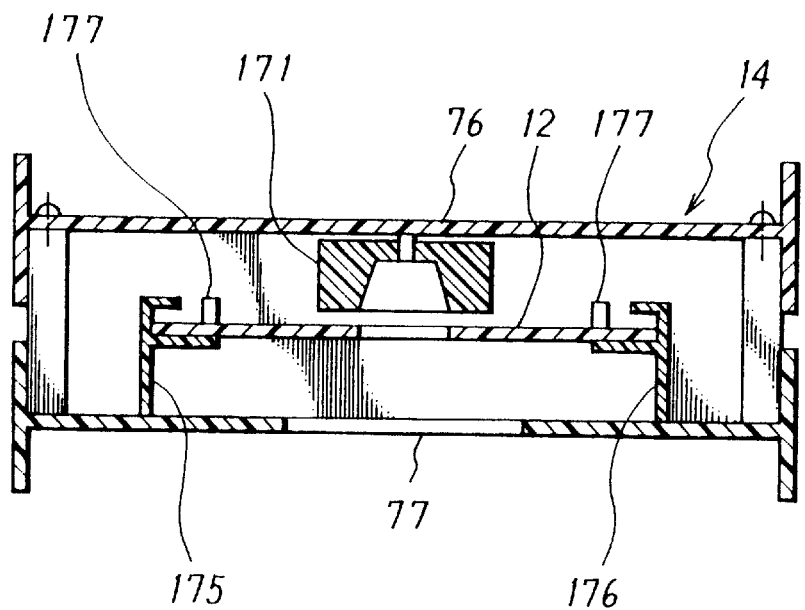
FIG. 18 is a cross-sectional view from line G—G of FIG. 14.

As described above, when the disc chuck 99 releases the disc 12 and moves backward, as shown in FIG. 18, the disc 12 moves on the disc guides 175 and 176, which are made on the lower case 77 of the carriage 14, and the chucking pads 135 and 136 of the disc chuck 99 are opened at a short distance from the storage position in order to fully release the disc 12, so that the disc 12 stops at that position. Thereafter, the disc chuck 99 moves further backward and stops at a position where the chucking pads 135 and 136 do not obstruct the playback operation of the disc 12. The disc 12 is held by a pin 167 of a L-shaped lever 162 (FIG. 14), so that the disc 12 is pushed into the storage position and is stopped by contact with a stopper 177, as described below. Further, as shown in FIG. 18, a disc damper 171 for clamping a disc 12 onto the turntable 169 of the player 16 when the disc 12 is being played, is attached rotatably to the upper case 7.

Figure 19:
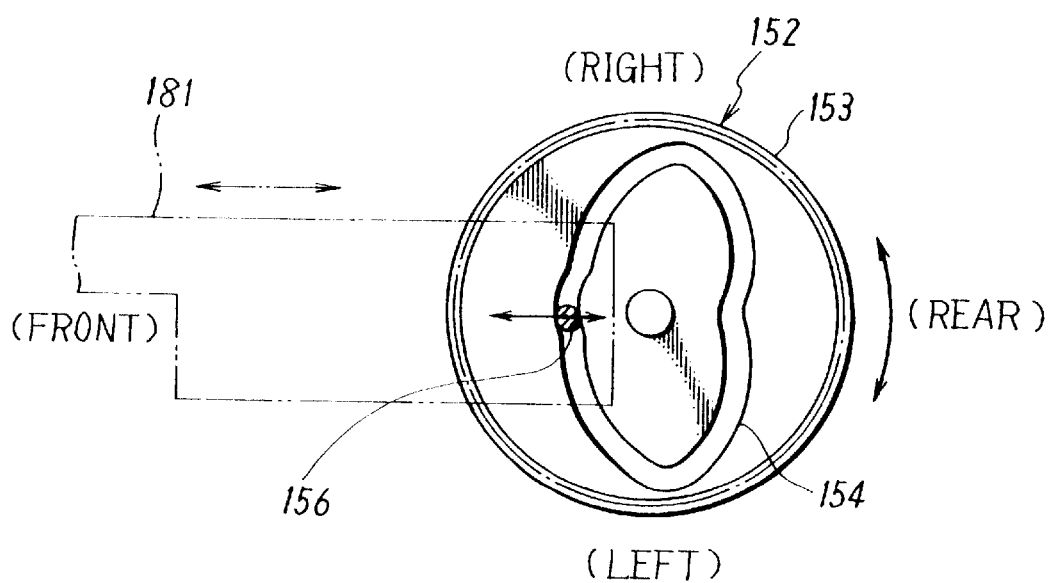
FIG. 19 is a top view of a cam groove 154 on the upper side of a cam 152 according to the present invention.
Figure 20:
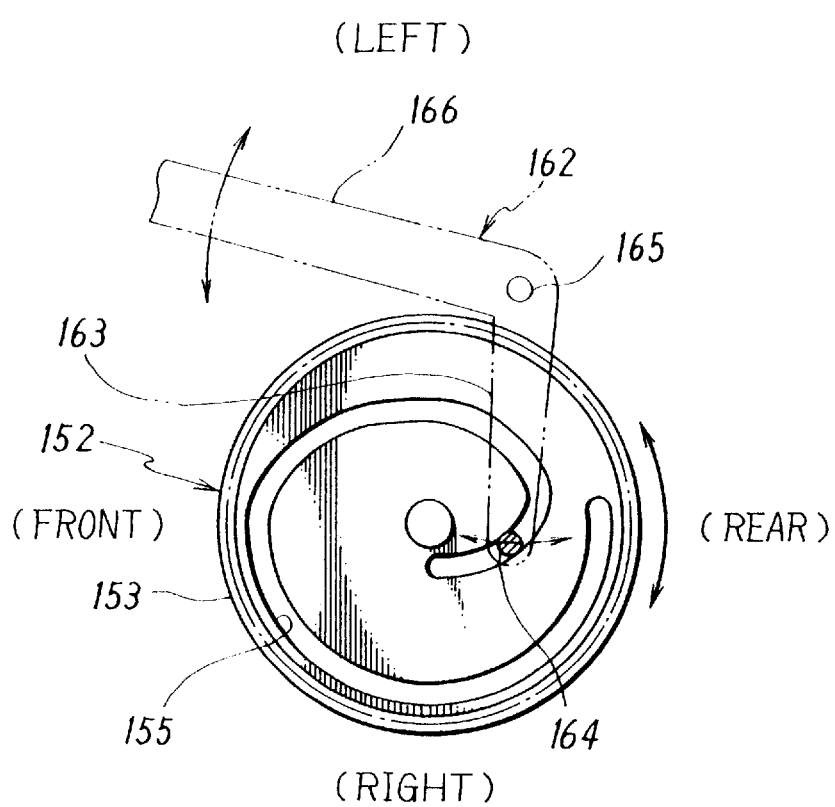
FIG. 20 is the under side view of a cam groove 155 on an underside of a cam 152 according to the present invention.

The first gear 148 of the clutch 147 gears with an outer gear 153 which is built on a cam 152. As shown in FIG. 19 and FIG. 20, cam grooves 154 and 155 which are different from each other, are made on the upper and lower sides of the cam 152. The cam groove 154 on the upper side of the cam 152 is formed into a partially crooked ellipse as shown in FIG. 19, and a cam follower 156, which is attached to the rear edge of the slide lever 181, is inserted into the cam groove 154. The slide lever 181 is slender and, as shown in FIG. 14, is positioned along the right side of the carriage 14. The slide lever 181 is attached in such a way as to slide backward and forward using an appropriate guide means (not shown). Accordingly, when the cam 152 is rotated, the cam follower 156 moves backward and forward along the cam groove 154 so that the slide lever 181 can slide backward and forward.

A hook 157 hooking toward the inside is made at the end of the slide lever 181. Also, an attachment plate 158 is positioned on the right front edge of the carriage 14, and a rotation lever 159 is attached rotatably to the underside of the attachment plate 158 with a center at a pivot 160. The hook 157 described above is attached rotatably to the right edge of the rotation lever 159 with a center at a pin 161. When the slide lever 181 slides forward, the rotation lever 159 is rotated counter-clockwise with a center at the pivot 16. The right end of the rotation lever 159 is positioned so that it can come into contact with the circumference face of the disc 12 in the stocker 13. When the rotation lever 159 is rotated counter-clockwise, the disc 12 is pushed by the end of the rotation lever 159 backward for a predetermined distance from the storage position, as shown in FIG. 14. Further, because the rotation lever 159 is thicker than the disc 12, the disc 12 is securely pushed. As described above, when two discs 12 are placed on the disc tray 15, the two discs 12 are pushed toward the carriage 14 but only the lower disc 12 is moved to the carriage 14.

The disc 12 is released from the chucking pads 135 and 136 of the disc chuck 99 to a position from which the disc 12 is then pushed. In other words, the disc 12 is released to a certain position when the disc 12 is removed from the stocker 13 or the disc tray 15, or when it is being transferred back to the stocker 13 or the disc tray 15. Thereafter, the disc 12 is stored at the storage position shown in FIG. 4 and FIG. 14, by the holding force of the disc regulator 56 or the flat spring 24.

Referring to FIG. 20, the cam groove 155 on the underside of the cam 152 is formed into a spiral shape, and the cam follower 164, which is attached to the end of the short rod portion 163 of the L-shaped lever 162, is inserted into the cam groove 155. The L-shaped lever 162 is attached rotatably to the lower case 77 by a pivot 165, and as shown in FIG. 14, a pin 167 is attached to an end of the long rod portion 166 of the L-shaped lever 162. The top of the pin 167 is inserted into the arc-shaped guide groove 168 of the upper case 76. The pin 167 is used in order to push the disc 12 transferred back to the carriage 14 by the disc chuck 99, from the position where the transfer was completed to the actual storage position. In other words, when the cam 152 is rotated counter-clockwise, as seen from the lower side, the cam follower 164 moves to the front due to the cam groove 155. Accordingly, the long rod portion 166 of the L-shaped lever is rotated clockwise, and the pin 167 moves in order to push the disc 12 backward from the transferring completed position.

Thus, after the disc 12 is stored into the carriage 14, the carriage 14 moves down to the player 16 when in a playback mode, as shown by a double dotted line in FIG. 1. The disc 12 which is stored in the carriage 14 at a specific position, is placed on the turntable 169 of the player 16. At that time, there is a predetermined distance between an optical pickup 170 and the face of the disc 12. The optical pickup 170 can move along the radius of the disc 12. A passing groove (not shown) for the optical pickup 170 is made on the lower case 77 of the carriage 14. The turntable 169 is positioned under the disc area 55 of the disc tray 15, and the disc 12 stored in the disc tray 15 is positioned lower than the other disc 12 set on the turntable 169.

Accordingly, for example, when the disc 12 which is stored in the disc tray 15 is drawn out by the carriage 14 and the carriage 14 moves down, the disc 12 can be placed onto the turntable 169. In this situation, when the carriage 14 moves down further for a predetermined distance, the disc damper 171 which is attached rotatably to the carriage 14, comes in contact with the disc 12 and pushes the disc 12 onto the turntable 169. Accordingly, the disc 12 can be securely clamped to the player 16.

When the operation is set to the playback mode or to the disc storage mode, the disc 12 may accidentally fall off the disc tray 15 into the bottom of the unit due to a shock to the unit at such time. In the embodiment described below, the disc 12 is effectively prevented from falling by a means built into the carriage 14.

Figure 22:
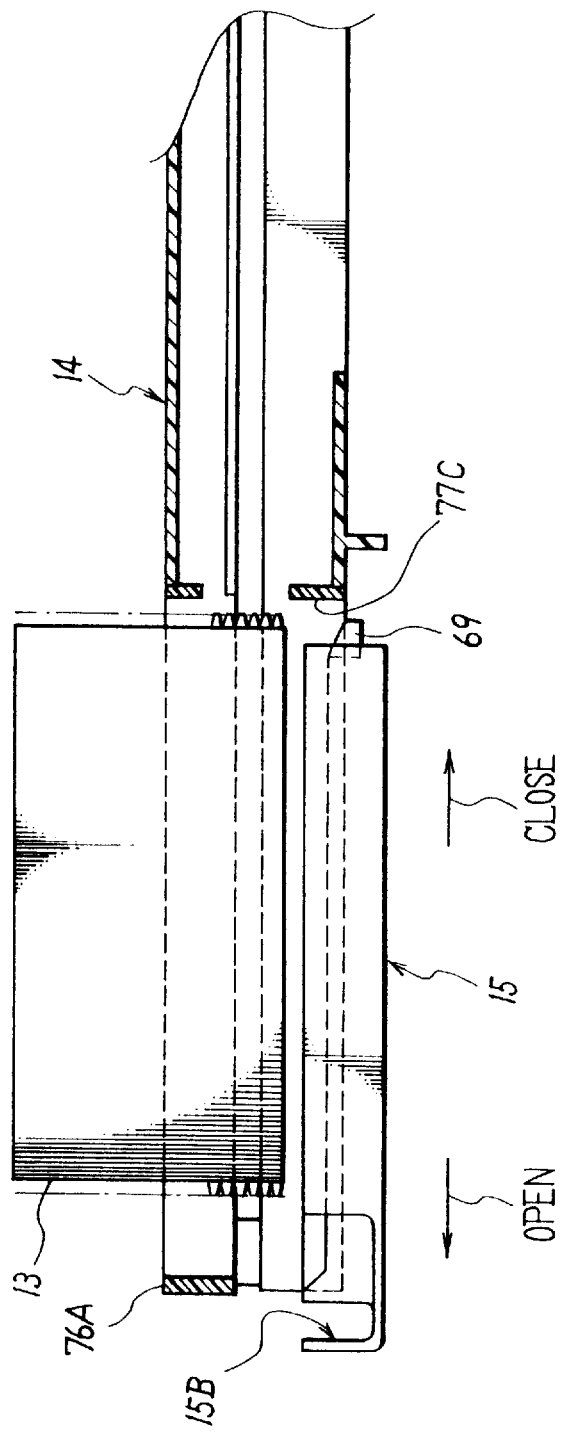
FIG. 22 is a partial side view showing the position of the carriage when the disc tray is being opened and closed according to the present invention.

When the disc tray 15 is being opened, the carriage 14 moves up and stops at the position shown in FIG. 22, and the disc stopper 77C attached to the carriage 14 abuts the disc tray 15. Accordingly, in the case of a conventional auto disc changer, when the disc tray 15 was opened, it might have been possible for the disc 12 to move, falling just under the carriage 14, but in the present invention the disc 12 comes in contact with the disc stopper 77C so that the disc 12 is prevented from accidentally falling off.

Figure 23:
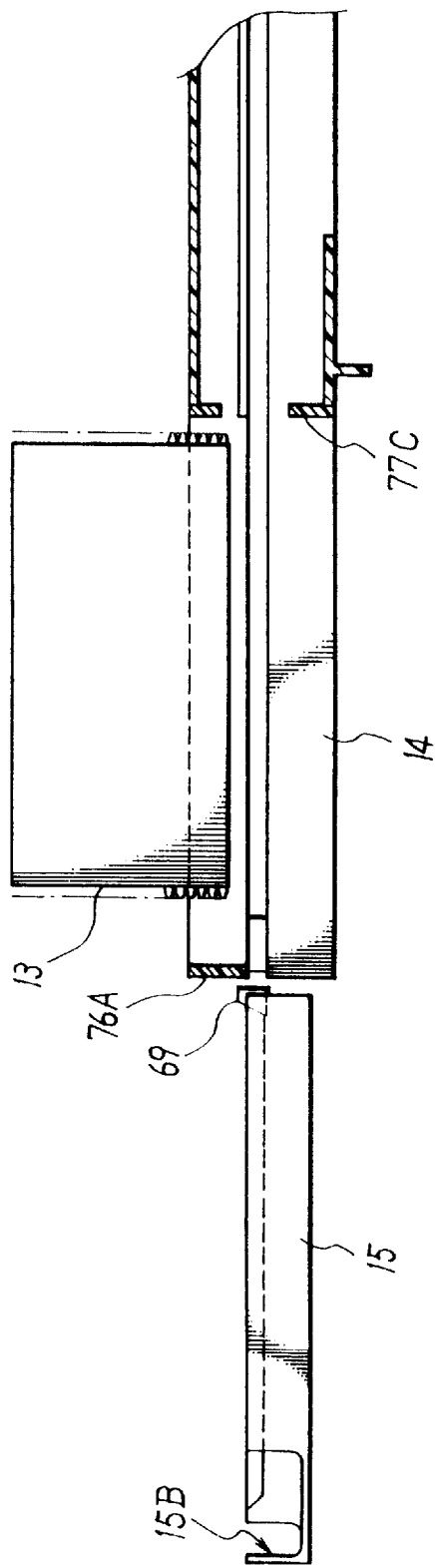
FIG. 23 is a partial side view showing the position of the carriage after the disc tray is opened according to the present invention.

After the disc tray 15 is completely opened, the carriage 14 moves down and stops at the position shown in FIG. 23, and the regulation bar 76A of the carriage 14 is positioned near the inner side portal of the disc tray 15. In the case of a conventional auto disc changer, when another disc 12 was placed on the disc tray 15, it might have been possible for the disc 12 to move, falling from the portal into the bottom of the unit over the stopper 69, but in the present invention because the carriage 14 and the disc tray 15 are positioned as shown in FIG. 23, the disc 12 is prevented from falling into the bottom of the unit and from being damaged.

Figure 24:
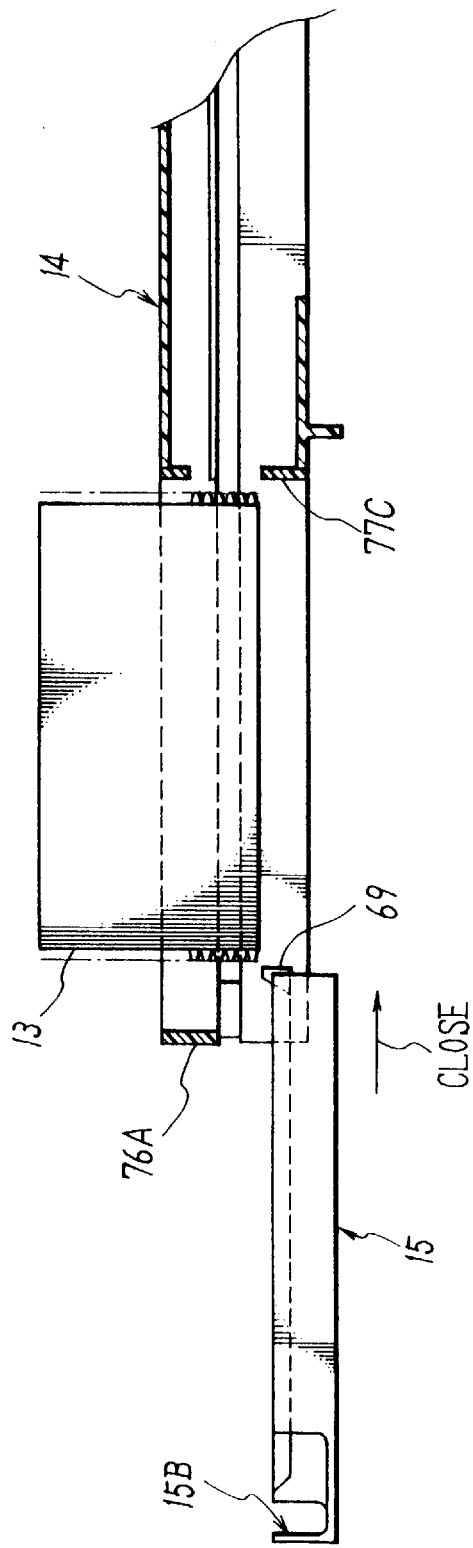
FIG. 24 is a partial side view showing the position of the carriage when a disc tray is being closed according to the present invention.

When the disc tray 15 begins closing, the carriage 14 moves up and stops at the position shown in FIG. 24. As the disc tray 15 continues to close, the carriage 14 moves to the position as shown in FIG. 22. The disc stopper 77C attached to the carriage 14 abuts the disc tray 15 on which the disc 12 is placed. If a conventional auto disc changer were accidentally bumped at this point, it might have been possible for the disc 12 to accidentally fall from the disc tray 15, but in the present invention the disc 12 is prevented from falling by the stopper 77C.

Figure 25:
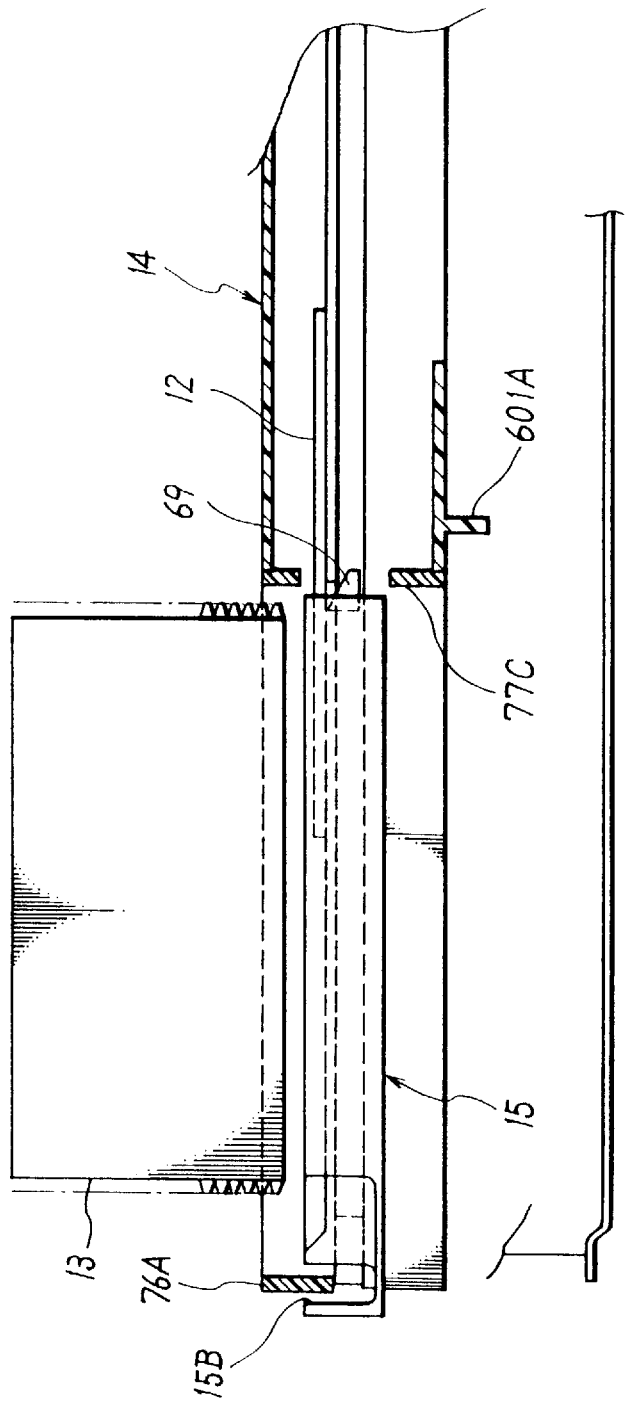
FIG. 25 is a partial side view showing the position of the carriage when a disc is being removed according to the present invention.
Figure 26:
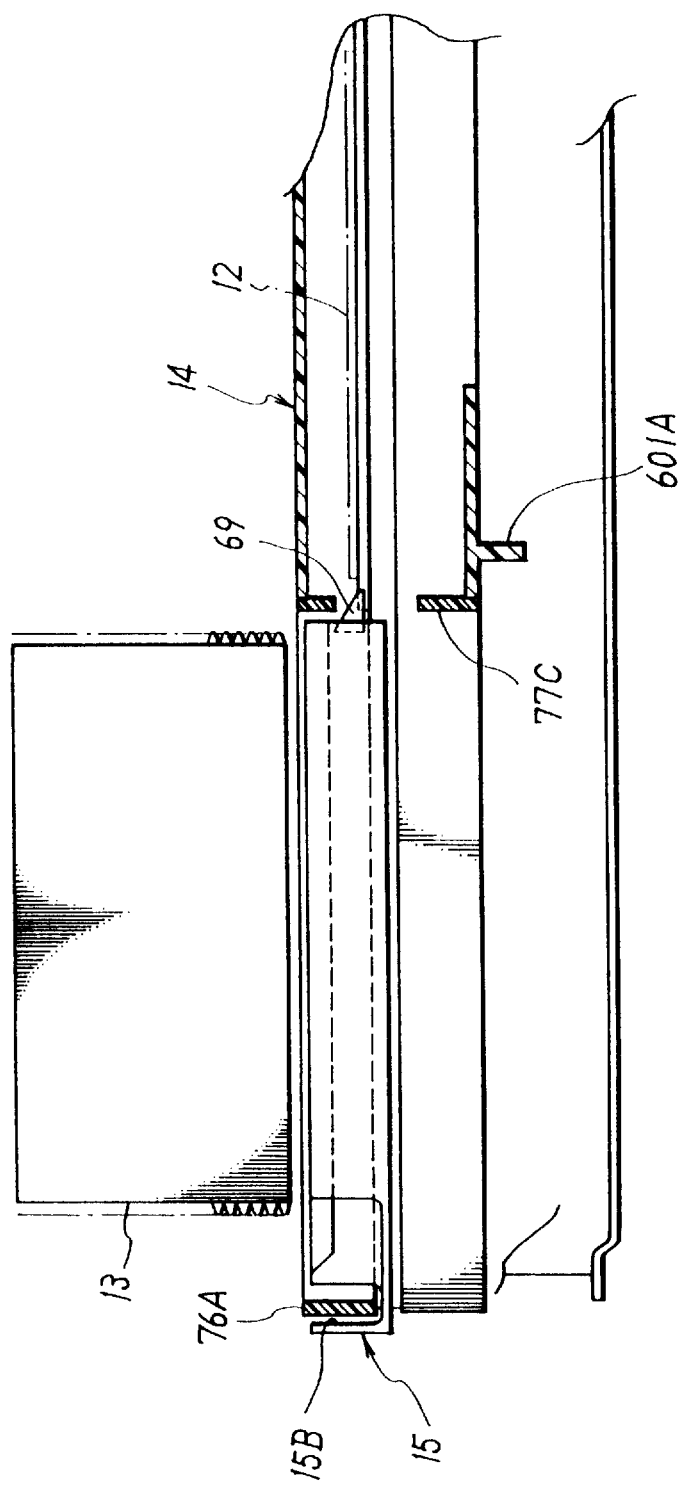
FIG. 26 is a partial side view showing the position of the carriage when a disc is being played back according to the present invention.

When the disc 12 on the disc tray 15 is removed from the carriage 14, the disc tray 15 and the carriage 14 are positioned as shown in FIG. 25, and when the disc 12 is played back, they are positioned as shown in FIG. 26. In these situations, the regulation bar 76A of the carriage 14 is inserted into the groove 15B on the disc tray 15. As described above, because the disc tray 15 is regulated so as not to move outward, the disc tray 15 is prevented from being drawn out due to a malfunction.

Figure 27:
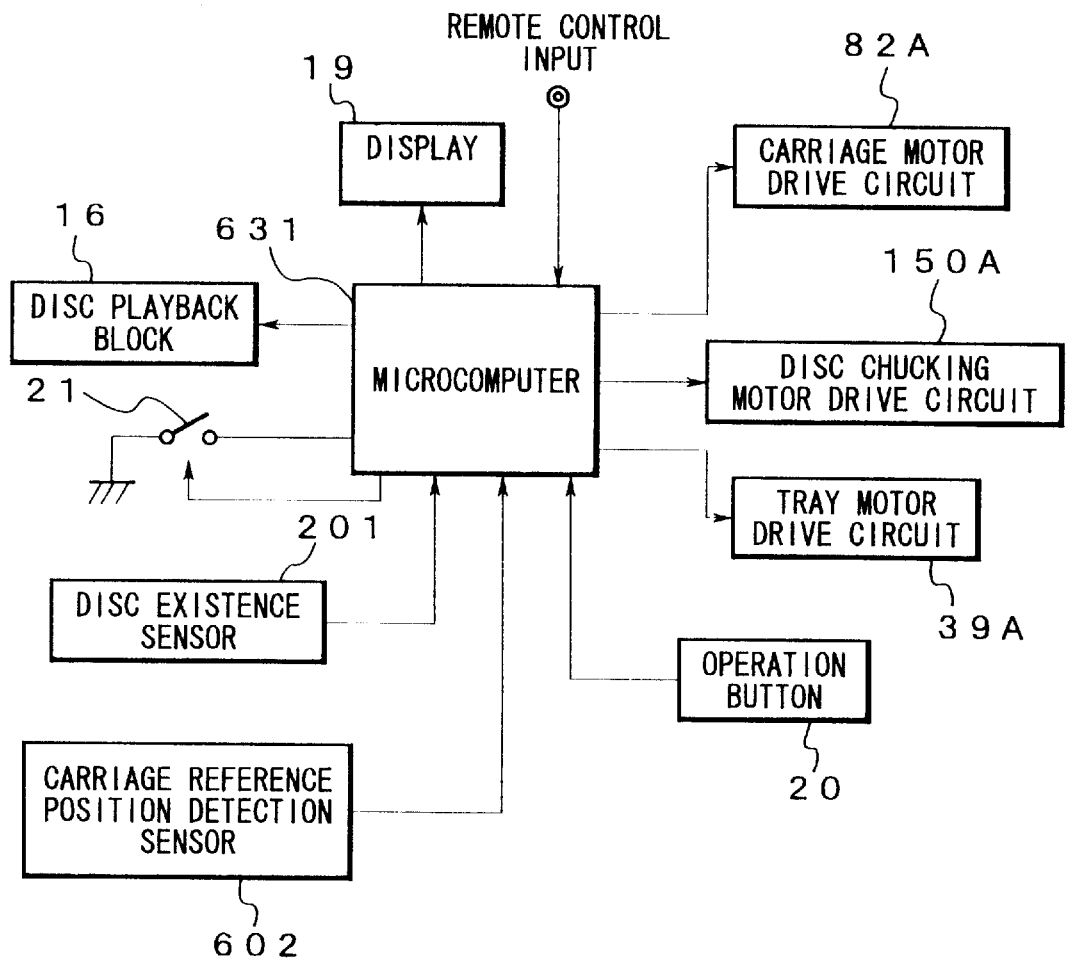
FIG. 27 is a block diagram showing an example of a control system in one embodiment according to the present invention.

An example of a control block 182 from FIG. 1 is shown in FIG. 27. A carriage motor drive circuit 82A, a disc chucking motor drive circuit 150A, and a disc tray motor drive circuit 39A are controlled by commands from a microcomputer 631.

Figure 34:
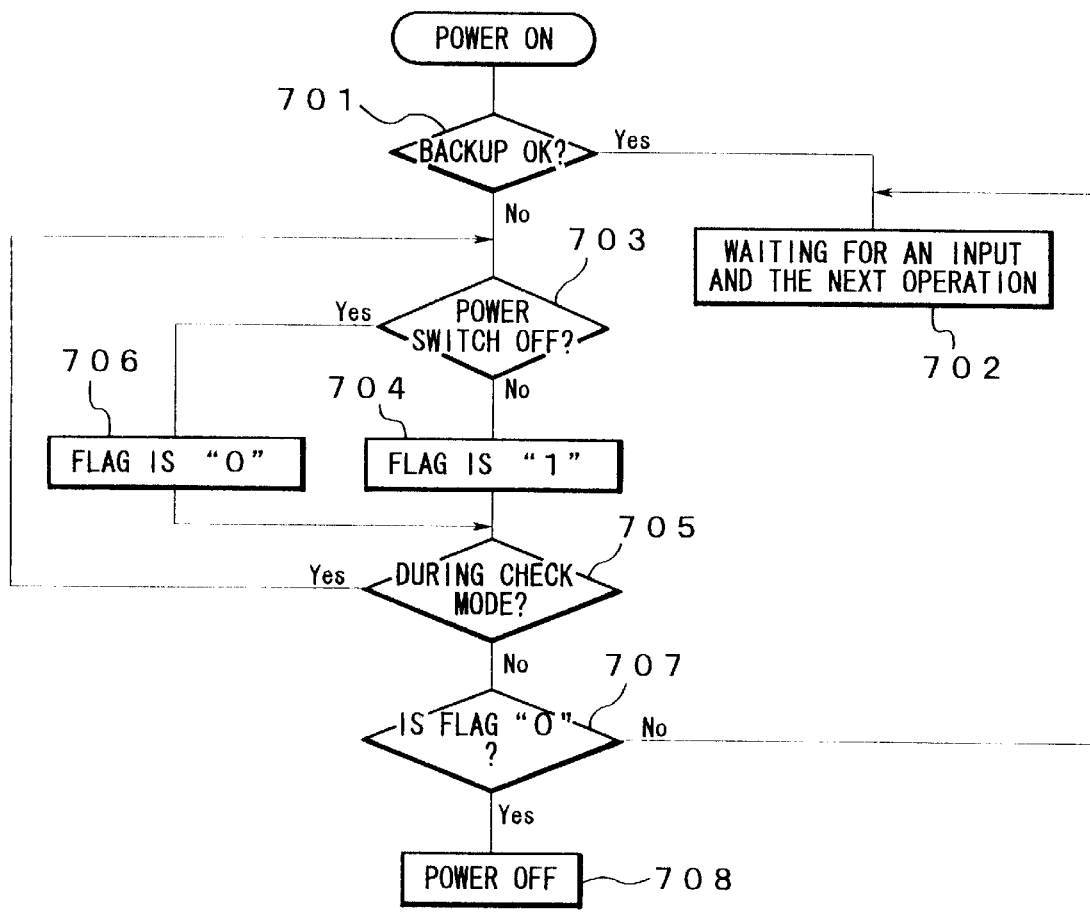
FIG. 34 is a flow chart showing an example of the check mode according to the present invention.

A disc player 16 and a display block 19 are controlled by the microcomputer 631. Reference numeral 21 denotes a power supply switch for the unit, the on-off operation of which is also controlled by signals from the microcomputer 631 (FIG. 34).

Figure 21:
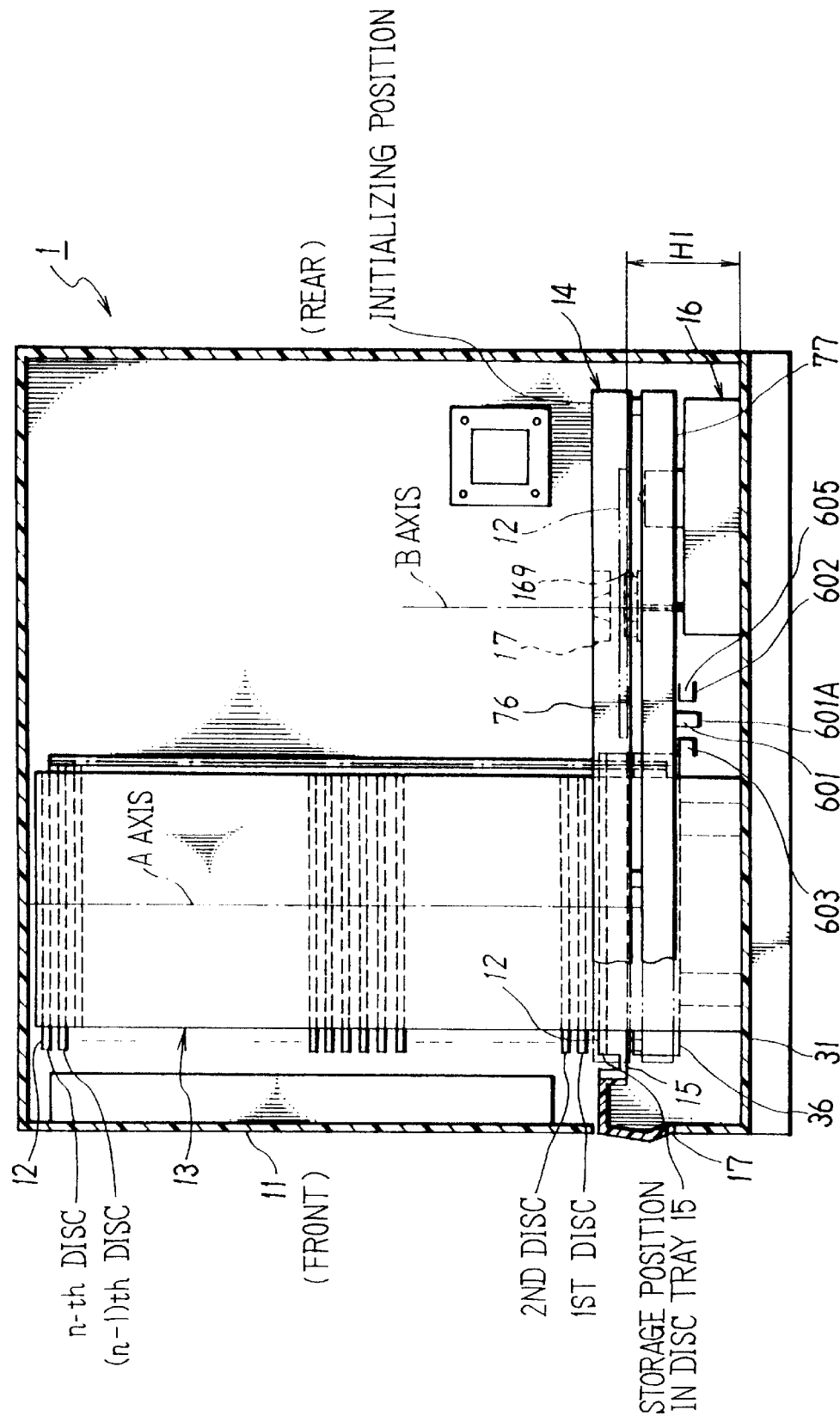
FIG. 21 is a side view showing a standby position for the carriage 14 according to the present invention.

With the auto disc changer 1, as indicated in FIG. 21 with the solid line, a reference position for the carriage 14 is determined so that a disc 12 stored in the carriage 14 is set at the same height H1 as the disc 12 stored in the disc tray 15.

A standby position is set at the position where the carriage 14 moves down to the disc playback position. When the normal operation mode is completed, the carriage 14 moves back to the standby position, at which point each operation mode is considered completed.

It is also feasible to set the standby position at a position where a disc 12 stored in the carriage 14 is at the same height H1 as the disc 12 stored in the disc tray 15.

But the carriage 14 is comparatively heavy, and if the standby position is set to a halfway position through which the carriage 14 passes, the carriage 14 and the stocker 13 may be wobbly and the gear of the stocker 13 which meshes with the carriage 14 may become loose due to vibrations. In this situation, the carriage 14 may not face accurately a specific disc storage position. In this embodiment, in order to prevent the carriage 14 and the stocker 13 from being damaged due to the jolts to the unit, the carriage 14 is set to stand-by at the disc playback position.

The standby position is the lowest position in the range over which the carriage 14 moves, and stress received by the stocker 13 is minimized.

The pulse number from the stepping motor 82 is not used for detecting the reference position of the carriage 14. The reference position is directly detected by a sensor using a photo-coupler. In the embodiment, as shown in FIG. 21, the reference position for the carriage 14 is detected by a photo sensor 602 which detects a detection portion 601 built on the lower side of the carriage 14.

Figure 29:
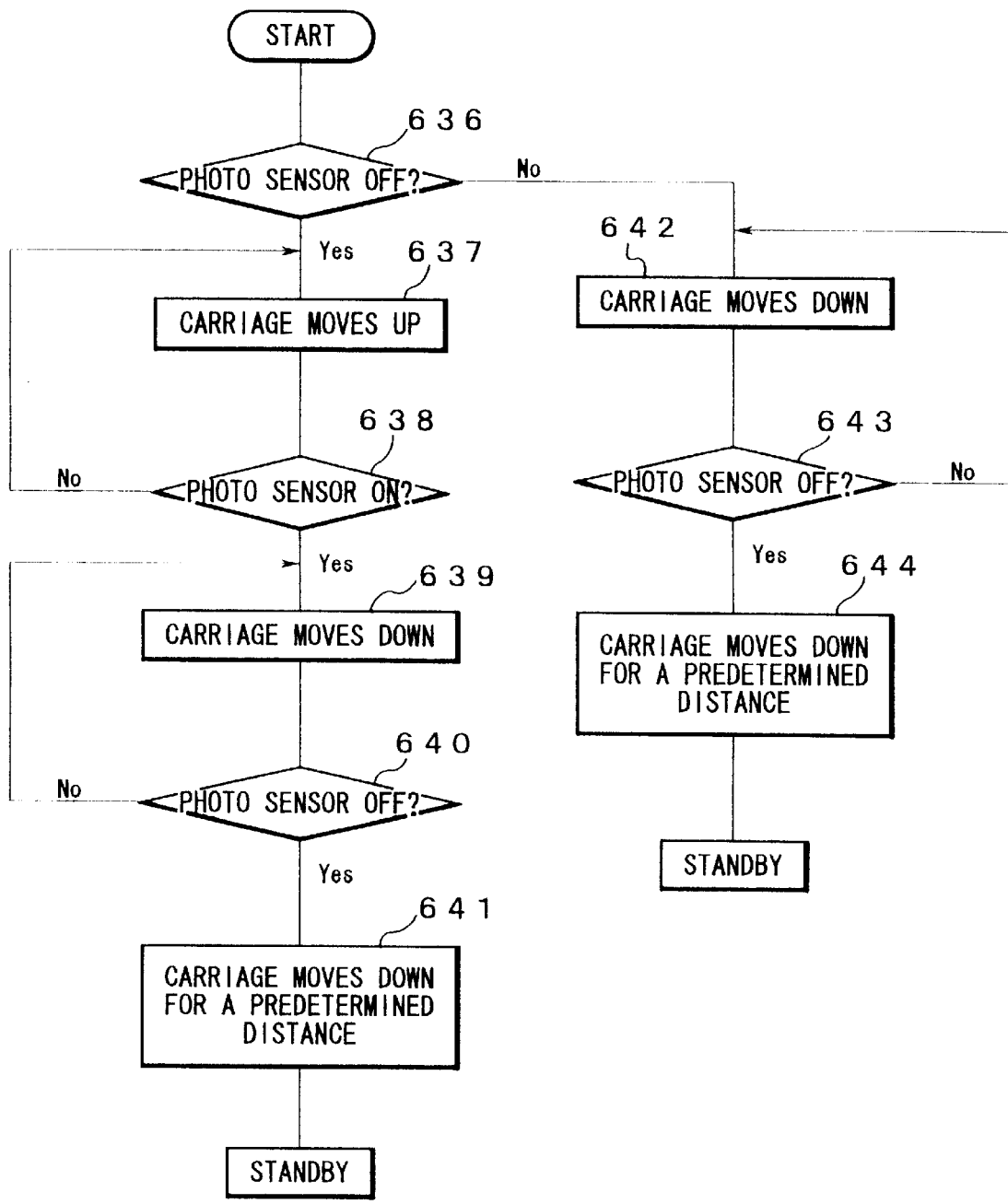
FIG. 29 is a flow chart showing a reference position setting operation according to the present invention.

A concrete example of the operation in which the reference position is detected by the photo sensor 602 and the carriage 14 moves to the disc playback position as the standby position, is described below with reference to FIG. 29.

Preferably, the carriage 14 always stops at the standby position. Since it may stop at the halfway point of the stocker, a flow chart showing the process for detecting the reference position in FIG. 29 is designed, assuming such halfway situation.

A determination is made whether the photo sensor 602 is turned on or off (in step 636), and when it turned off, the carriage 14 which stops at the reference position or below the reference position, moves up (in step 637). While it is moving up, it is determined that the sensor 602 is turned on, and the carriage 14 moves down. The position where the sensor 602 is again turned off, is determined to be the reference position H1 (in steps 638 to 640). At this point, the microcomputer counter, for example, is reset. When the carriage 14 moves further down for a predetermined number of positions, it is positioned at the standby position which is the same as the disc playback position (in step 641).

On the other hand, when the sensor 602 is turned on from the beginning (in step 636), the carriage 14 moves down, and the position where the sensor 602 is turned off is determined to be the reference position (in steps 642 and 643). The carriage 14 further moves down for a predetermined number of positions to the standby position, at which point the process for detecting the reference position is completed (in step 644).

FIG. 30 shows the range over which and manner in which the carriage 14 moves for each operation mode. For example, in a disc storage mode in which the disc 12 is stored through the disc tray 15 to the stocker 13, the carriage 14 moves from the standby position C through position B, which is the reference position, to range A, which represents the range of disc storage positions, and the disc tray 15 is opened. After a disc 12 is placed on the disc tray 15 and an enter button is pushed, the carriage 14 returns to the reference position (position B). In this position, the disc 12 is drawn from the disc tray 15 and is stored in the carriage 14. The carriage 14 moves to the appropriate position in range A, and the disc 12 is taken from the carriage 14 and stored in the predetermined disc storage position in the stocker 13. When the next disc 12 is to be stored, the carriage 14 must move back through range A and position B. When the storage operation is completed, the carriage 14 again moves through range A and position B, to position C and remains on standby. In a disc removal mode in which a disc 12 stored in the stocker 13 is removed, the same operation is performed since the disc tray 15 is opened at the beginning of the operation. When the disc tray 15 is opened, the carriage is positioned in range A. A detailed description is given below.

When a disc 12 in the stocker 13 is to be played back, the carriage 14 moves up from position C, of the standby position, through position B to range A, and the disc 12 is removed from the stocker 13. The carriage 14 then moves down to position C, passing through position B. At that point, the disc 12 is placed on the turntable 169 and the carriage 14 moves down, to a point at which the disc 12 is clamped by the disc damper 171 of the carriage 14. In this point, the player 16 plays the disc 12.

When the playback is completed, the carriage 14 moves back to range A, passing through position B. After the disc 12 is stored in its original position in the stocker 13, the carriage 14 returns to the standby position in position C.

When an external disc 12 is to be played back, the carriage 14 moves from position C through position B to range A, when the disc tray 15 is opened and the disc is placed on the disc tray 15 in a fashion similar to the disc storage mode. The carriage returns to position B and draws out the disc 12 which is stored in the disc tray 15, and thereafter moves down to position C, where the disc 12 is clamped and the playback operation is performed in a fashion similar to the above. When the playback is completed, the carriage 14 returns to position B, where the disc 12 is transferred to the disc tray 15 and the carriage 14 returns to position C. When the disc tray 15 is opened and the disc 12 is removed from the disc tray 15, the carriage 14 moves to range A as described above.

As described above, it is understood that the carriage 14 passes through the reference position B during each of the modes. Because the auto disc changer 1 controls the movement of the carriage 14 by managing the number of pulses supplied to the stepping motor 82, the number of supplied pulses is cleared at the reference position each time so that the reference position of the carriage 14 can be confirmed with each mode. Accordingly, even if the auto disc changer 1 is used continuously for a long time or if noise causes a malfunction in the counting of the pulses, the position of the carriage 14 remains accurate because an accumulation of errors does not occur.

The operation order for each mode of the disc auto changer 1 is described below.

Figure 28:
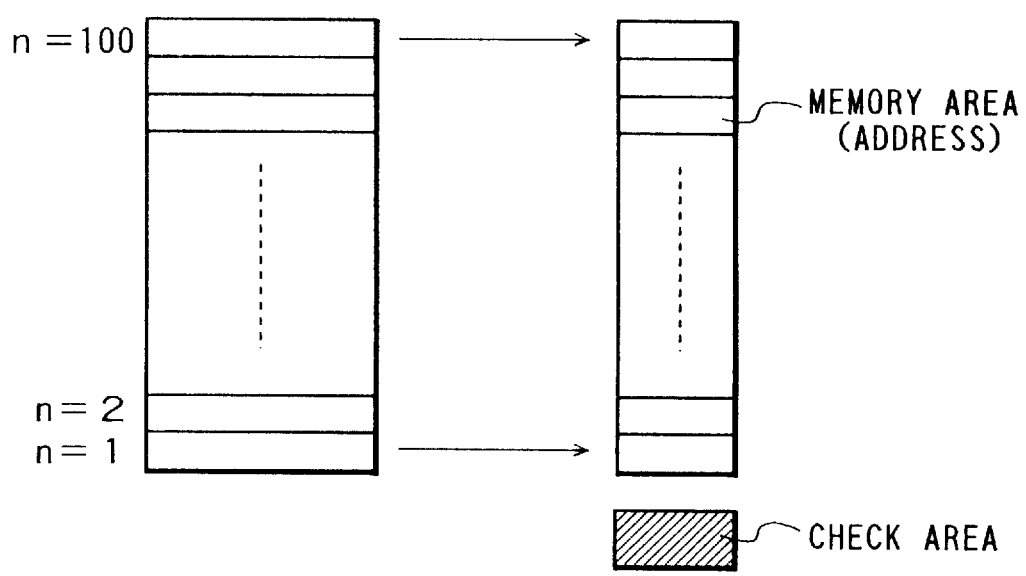
FIG. 28 is a diagram showing relationship between the stocker 13 and memory areas according to the present invention.

FIG. 28 shows the relationship between the number of the disc storage position 22 in the stocker 13 and the memory area in a memory (not shown) in the microcomputer 631. Disc storage position numbers are mapped so that the number of the levels of a disc storage position 22 corresponds to a memory address. For example, when a disc is stored in a particular position, a "1" is mapped in the memory for such position, and when no disc is stored there, a "0" is mapped for such position in the memory.

A check area is set in the memory, and the check area is retrieved in order to determine whether the mapping state is normal or abnormal. The mapping data is always backed up as long as the first power supply is turned on. When the first power supply is turned off and the unit is not used for a period of time, the backup battery may be used up and the data may be lost. Further, the data may be altered due to intense noise. This is the abnormal state. In the normal state, the mapping data which is backed up is handled as normal data, and in the abnormal state, the mapping process is performed again in the check mode.

Figure 31:
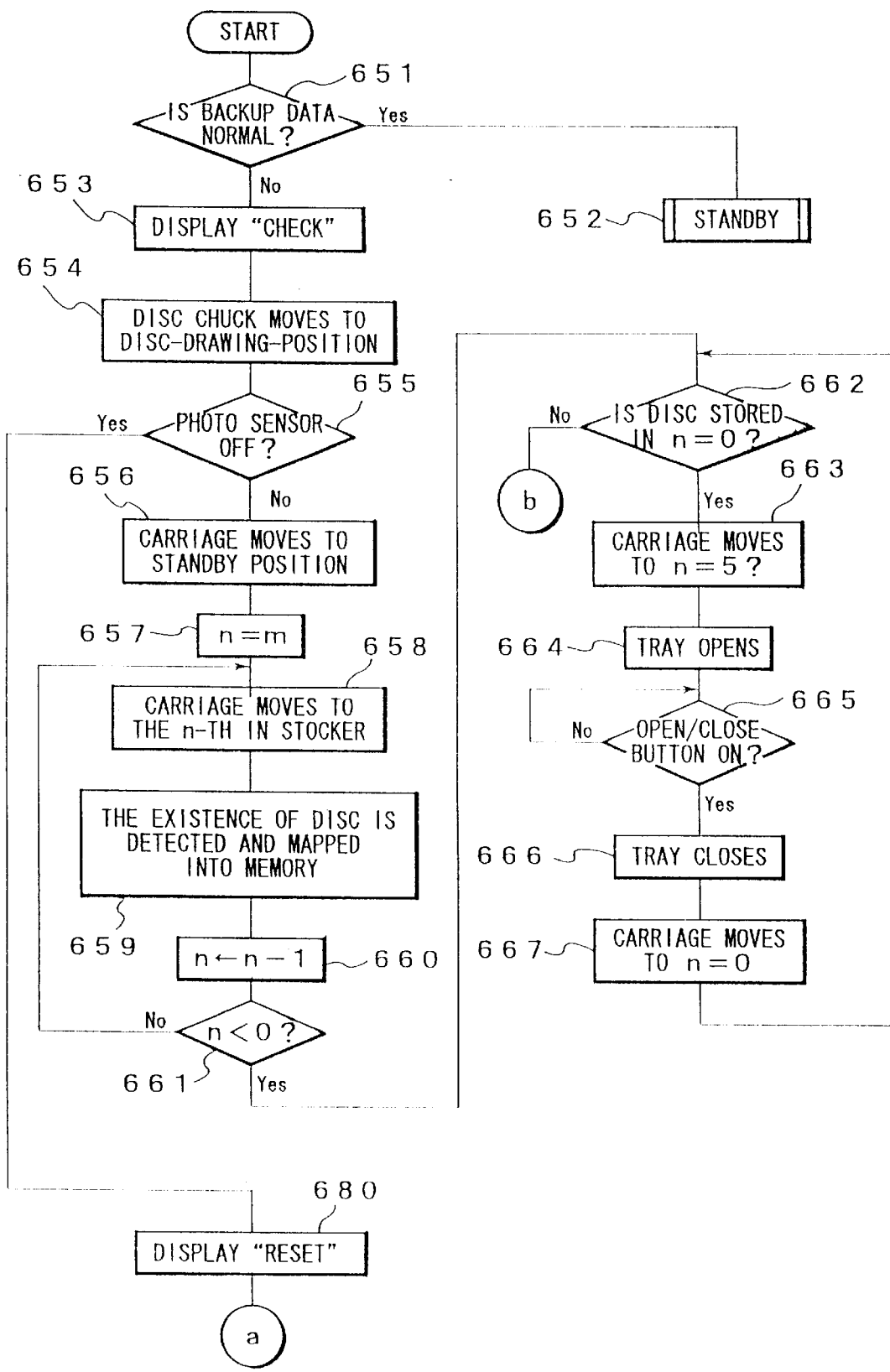
FIG. 31 is a flow chart showing an example of a portion of a check mode according to the present invention.
Figure 32:
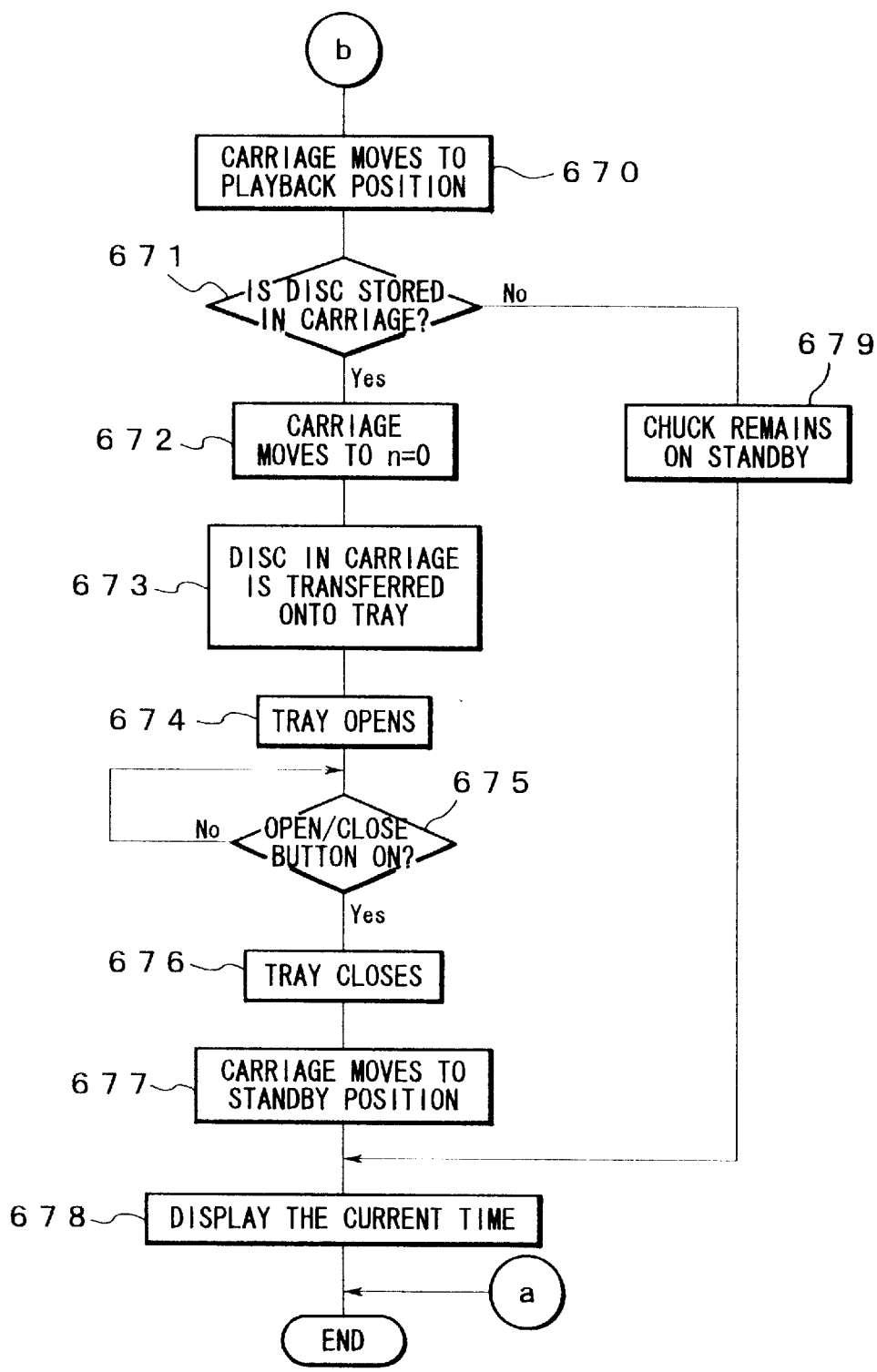
FIG. 32 is a flow chart showing an example of a portion of a check mode according to the present invention.

FIG. 31 and FIG. 32 shows an example of the check mode process when the power is turned on. The check mode is performed prior to the other operation modes when the mapping process has not yet been performed or when the backup mapping data is abnormal.

When the first power supply is turned on and thereafter the secondary power supply to the unit is turned on, it is determined, based on the data in the check area, whether or not the backup mapping data is normal in order to determine whether or not the check mode must be performed, and when the data are determined to be normal (in step 651), the unit remains on standby and can be set to a specified operation mode according to the input of the user (in step 652).

When the backup mapping data is determined to be abnormal, (or when the mapping has not yet been performed), the unit is set to the check mode, the display 19 indicates "CHECK" (in step 653), and the disc chuck 99 moves to the position where the disc is drawn in (the backward position, in step 654).

This operation is performed in order to prevent the disc and the carriage from being damaged due to a collision between the disc and the stocker or the disc tray, when the disc remains on the halfway into the carriage. Accordingly, the disc is drawn into the carriage on the assumption that the disc chuck holds the disc.

In order to determine the presence of a disc in the stocker 13, the ON-OFF state of the disc presence sensor 201 is determined. When the disc presence sensor 201 is turned off, in other words, when a disc 12 which is stored in the stocker 13 is pushed out for some reason, or when the disc 12 is not appropriately stored in the carriage 14 (in step 655), the word "RESET" is displayed in order to indicate that the user must inspect and repair the unit (in step 680).

This is necessary because when a disc 23 is not appropriately placed on the disc tray 13 or when a part of the disc 12 is pushed outside the stocker 13, the disc 12 and the stocker 13 may be damaged if the carriage 14 moves.

The carriage 14 moves through all the levels of the stocker 13 in order to determine whether a disc 12 is stored in each of the disc storage positions 22 of the stocker 13.

When the disc presence sensor 201 is turned on in step 655, it means a disc 12 is appropriately stored in the disc tray 15, in the stocker 13, or in the carriage 14. The carriage 14 moves to the standby position (in step 656). This is because the carriage 14 may stop at a position other than the standby position.

When the carriage 14 is set to the standby position, the microcomputer counter number n (in step 657) is set equal to the total number of the storage levels of the stocker 13 $m$. In this embodiment, m=100, in other words, the auto disc changer can store 100 discs in the unit.

Figure 33A:
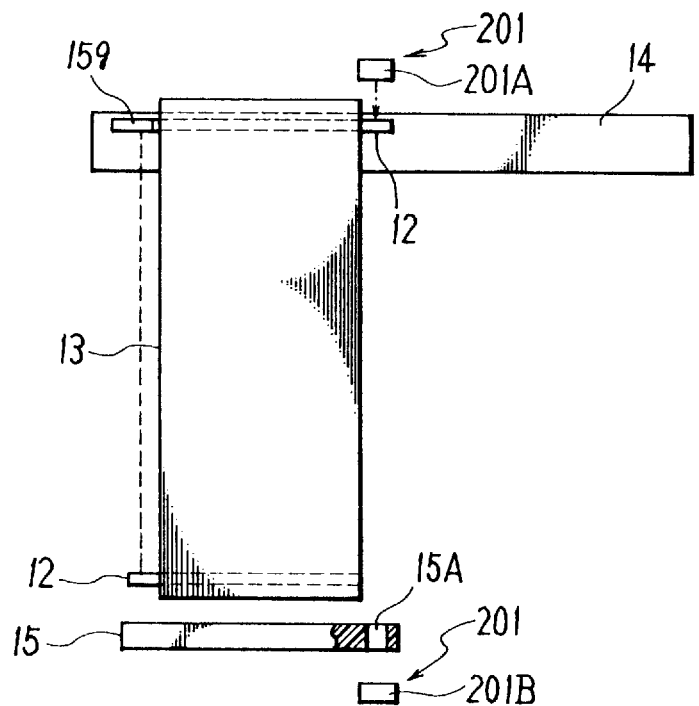
FIG. 33A and FIG. 33B are side views demonstrating detection of the presence of the disc 12 according to the present invention.
Figure 33B:
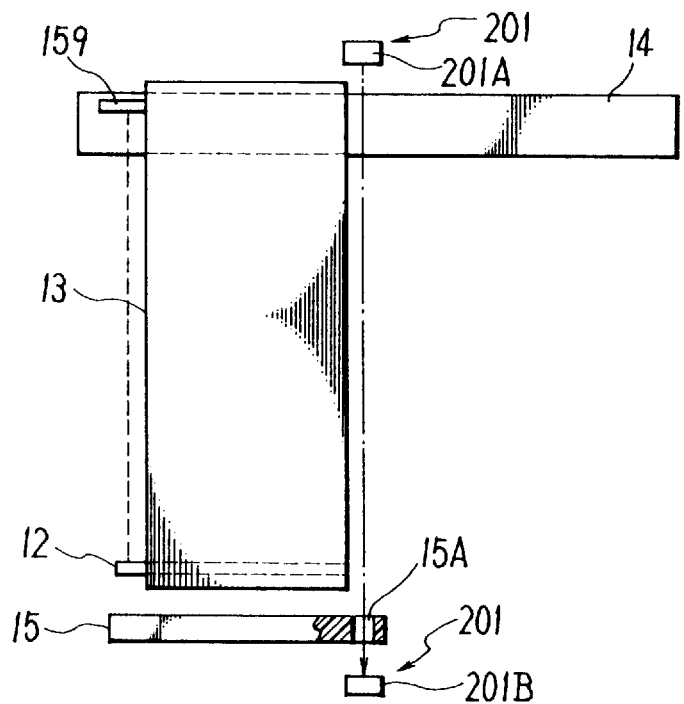

After the counter is set, as shown in FIG. 33, the carriage 14 moves to the highest disc storage position, where the presence of a disc 12 in the n-th level, (here n=m=100), of the stocker 13 is detected, and the memory is mapped to show the presence or absence of a disc 12 (in steps 658 and 659).

The detection of the presence of the disc 12 is performed, based on the ON-OFF information of the disc presence sensor 201 when the disc 12 is pushed outside the disc storage position 22 by the rotation lever 159.

In other words, when a disc 12 is stored in the disc storage position 22, as shown in FIG. 33A, the rotation lever 159 comes in contact with the circumference of the disc 12 so that the disc 12 is pushed out for a predetermined distance. The light from the light-emitting device 201A is obstructed by a disc 12, and is not transmitted to the light-receiving device 201B. When no disc is stored in the disc storage position 22, no disc is moved by the rotation lever 159, and the light from the light-emitting device 201A is transmitted to the light-receiving device 201B, without being obstructed by the disc 12. As described above, the presence of a disc 12 in the disc storage position 22 is detected, based on the presence of the output signal from the light-receiving device 201B. Such detection requires only one disc presence sensor 201 regardless of the number of the discs, decreasing the number of parts and making lowering the cost of the unit.

When the mapping process for the n-th level is completed, the mapping process is performed for the n−1 level (step 660), and the flow returns to step 658 to repeat the same operation. The operation is repeated until the bottom level is reached, at which point the mapping for disc presence is completed.

When n=0, the mapping process is completed, and a determination is made as to whether or not a disc 12 is placed on the disc tray 15. The carriage further moves down to the lowest level (n=0) (where the carriage 14 is set to the same position as the disc tray 15, in step 661), and a determination is made (in step 662). This detection is performed in a similar fashion to that described above.

When it is determined that a disc 12 is present in the disc tray, the carriage moves up to, for example, the fifth level (n=5), and the disc tray 15, until then locked by the carriage 14, is now released (in step 663), and the disc tray 15 is opened (in step 664) so that the user can remove the disc 12 placed on the disc tray 15.

When the open/close button is pressed, the disc tray 15 is closed and the carriage 14 moves down to the lowest level (n=0) (in steps 665 to 667). At that position, a determination is again made as to whether or not a disc 12 is stored in the disc tray 15. When it is determined that there is no disc 12 (in step 662), the process for detecting the presence of a disc 12 in the carriage 14 is then performed.

In order to perform the detection, the carriage 14 moves down to the standby position, which is the disc playback position (in step 670), where the presence of a disc 12 is detected through an optical pickup (in step 671). The detection is performed based on a determination as to whether or not TOC (table of contents) information is detected.

The presence of a disc 12 can be also detected, when the carriage 14 moves to the lowest level (n=0), the disc chuck moves forward in order to carry the disc into the disc tray 15, and the ON-OFF state of the disc presence sensor 201 is then determined.

When a disc 12 is stored in the carriage 14, the carriage 14 moves down to the lowest level (n=0), the disc 12 is transferred to the disc tray 15, and the disc tray 15 is opened in order to allow the user to remove the disc 12 thereon (in steps 672, 673, and 674). This operation is performed in order to allow the user to designate the next operation, because otherwise the memory would not store the position at which the disc 12 in the carriage 14 was stored in the stocker 13 and whether or not the disc 12 was returned to the tray.

When the open/close button is operated, the disc tray 15 is closed and the carriage 14 moves down to the standby position (in steps 675, 676, and 677). The current time is displayed in the display (in step 678), and this indicates the user that the check mode has been completed. In step 671, when a disc 12 is not stored in the carriage 14, the carriage 14 moves to the standby position, at which point the check mode is completed (in steps 679 and 678).

When the mapping data is not recorded in the memory or when the abnormal mapping data is determined to be stored, the check mode shown in FIG. 31 and FIG. 32 is performed in order to accomplish the mapping process.

When the power is turned off during the check mode, it is also possible that the mapping process is repeated the next time the power is turned on. This embodiment shown in FIG. 34 is programmed so that the check mode is continued without break, and thereafter, the power is turned off.

With reference to FIG. 34, when the backup mapping data is normal, the other operation modes can be set (in step 701 and 702). When the mapping data is not normal, the check mode shown in FIG. 31 and FIG. 32 is started.

In order to perform the check mode, it is determined whether or not the power is turned off (in step 703). When the power is turned on, a power observation flag is set to "1" (the power-on mode), and the check mode is continued (in steps 703, 704, and 705). The power is maintained during the check mode, and when the power is turned off, the power observation flag is changed to "0" (the power-off mode) (in steps 703 and 706).

The check mode is continued when the power observation flag is changed, and the value of the power observation flag is determined when the check mode is completed (in steps 705 and 707). When the power observation flag is "1", which indicates that the power is turned on, the next operation mode can then be performed (in step 702). When the power observation flag is "0", the power is turned off (in step 708).

As described above, the power supply is continued during the check mode even when the power button is turned off by the user, and the check mode is continued in order to complete the mapping process. Accordingly, even when the user turns off the power button during the check mode, once the power is turned on again, any of the operations is immediately performed since the check mode had been earlier completed. The check mode takes time because the presence of all the discs in the shelves must be determined. But the user may turn off the power supply button 21 right after the check mode has begun, and need not wait until the completion of the check mode.

Figure 35:
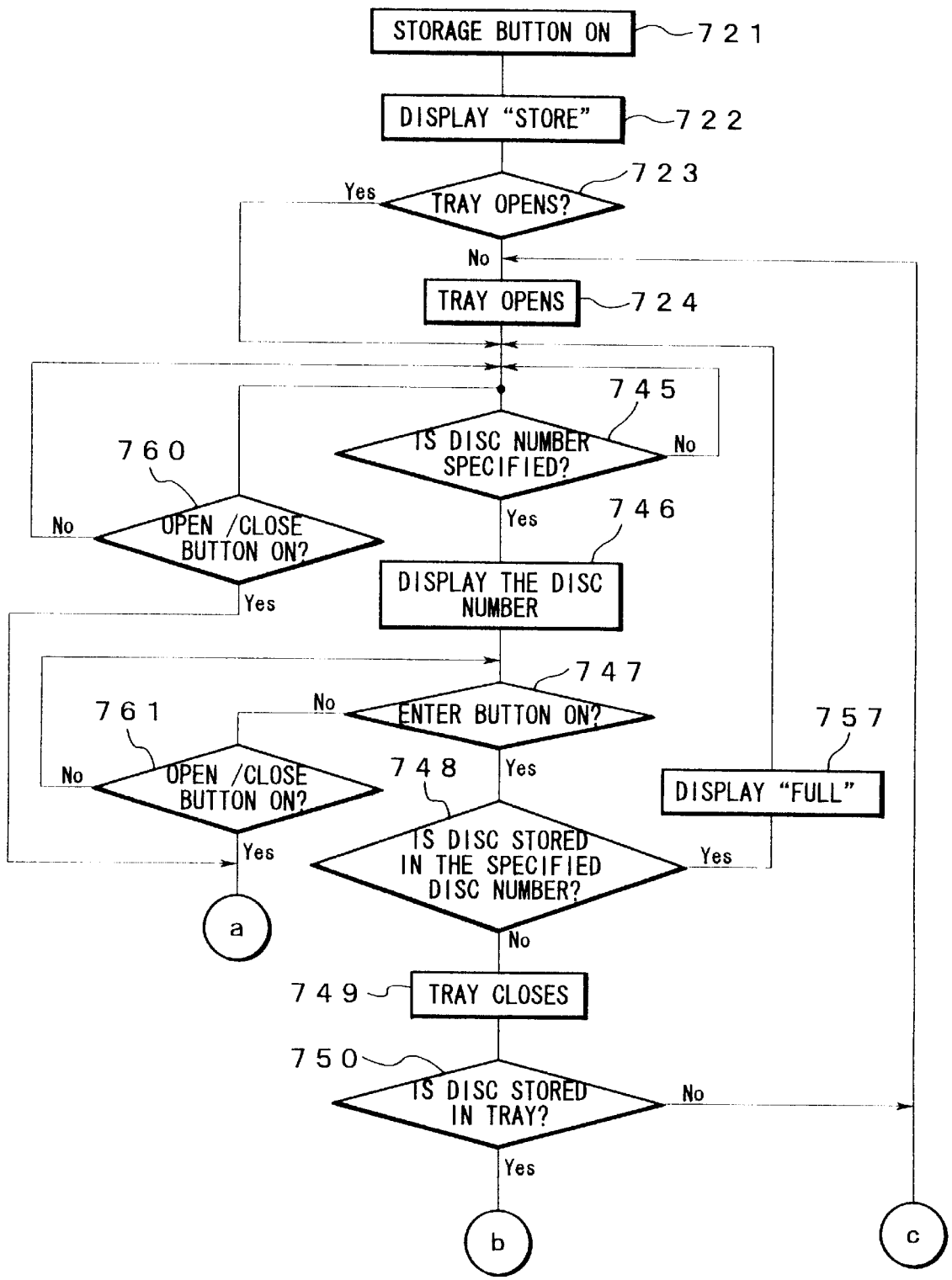
FIG. 35 is a flow chart showing a portion of the disc storage mode according to the present invention.
Figure 36:
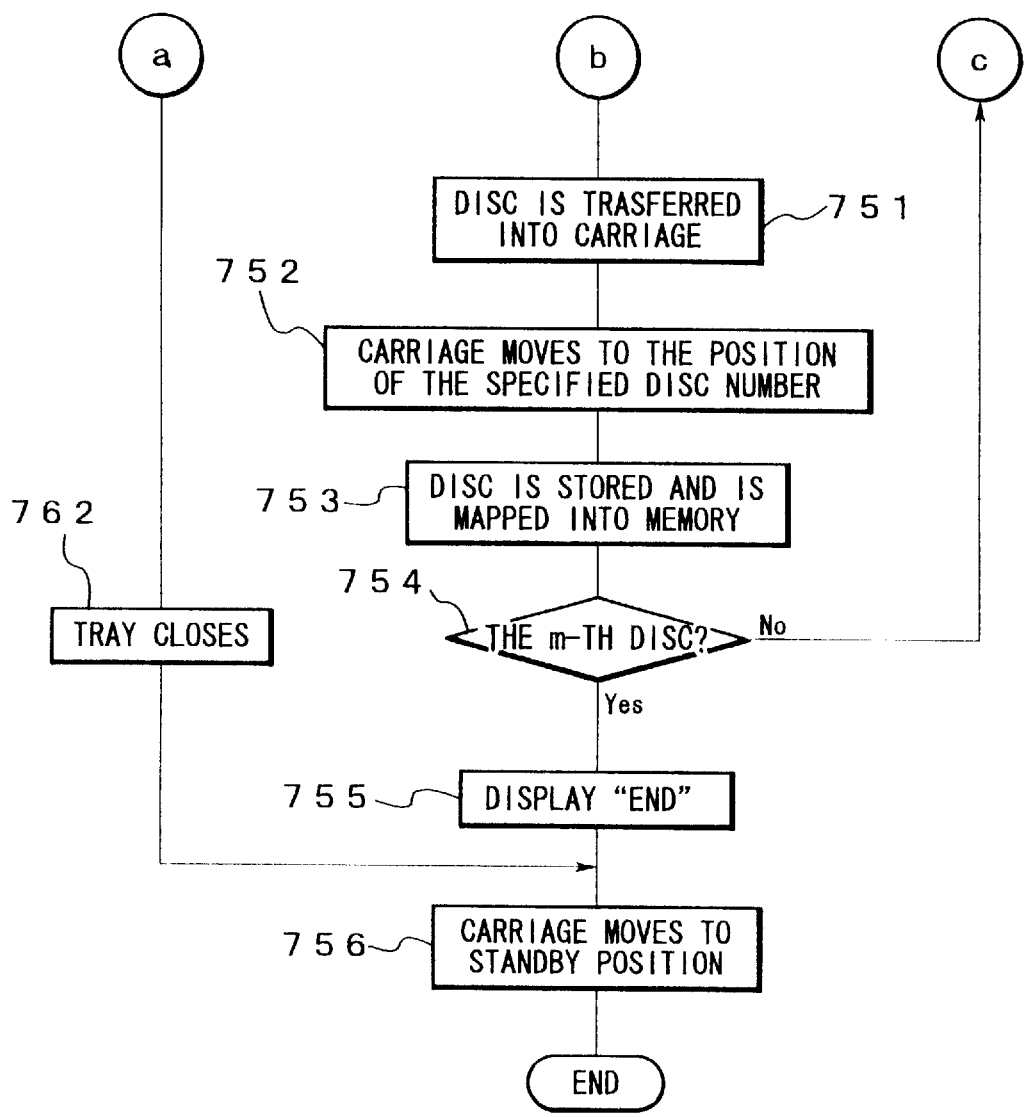
FIG. 36 is a flow chart showing a portion of the disc storage mode according to the present invention.

FIG. 35 shows a disc storage mode in which the disc 12 is stored into the stocker 13.

As shown in FIG. 35, when the a storage button is pushed, the display 19 indicates "STORE" and the disc tray 15 is automatically opened (in steps 721, 722, 723, and 724). This is because a disc 12 may be left on the disc tray 15, and it is necessary to have the user remove such disc 12.

Figure 37A:
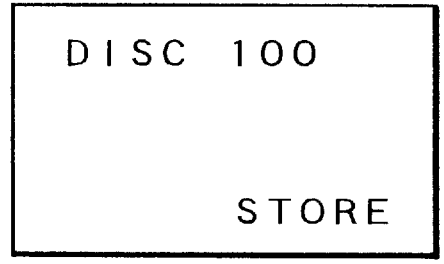
FIG. 37 is an example of a display according to the present invention.

Then, the operation button is placed on standby. In the standby state, the disc storage position 22 in which a disc 12 will be stored (referred to as a disc storage position number) is specified (in step 745). The display 19 indicates the specific disc storage position number (in step 746). For example, when disc storage position number "100" is specified, the display indicates the disc storage position number with the character "STORE" as shown in FIG. 37A.

When the enter button is pressed after the specification of the disc storage position number, a determination is made with reference to the mapping data as to whether or not a disc 12 has been already stored in the specified number position(in steps 747 and 748).

When no disc 12 is stored in the disc tray 15, the disc tray 15 is automatically closed and a determination is made whether or not a disc 12 is placed on the disc tray 15 (in steps 749 and 750). This is because when no disc 12 is placed there, the disc tray 15 is again opened in order to allow the user to place a disc 12 there (in step 724).

When a disc 12 is placed on the disc tray 15, the disc 12 is drawn into the carriage 14, the carriage 14 moves to the position corresponding to the specified disc storage position number, and the disc 12 is stored in that position (in steps 751, 752, and 753). Simultaneously with such disc storage operation, the mapping data is updated (in step 753).

Such disc storage process is repeated as needed according to the number of discs to be stored. When no discs 12 are stored in the stocker 13, the process can be repeated based on the number of discs 12 which the user has. Accordingly, the disc storage operation is performed at most 100 times (in step 754). When discs 12 are stored in all of the disc storage positions, the word "END" is displayed in place of the word "FULL" in order to indicate that the storage process is completed (in step 755). The carriage 14 moves to the standby position, at which point the disc storage mode is completed (in step 756).

Figure 37B:
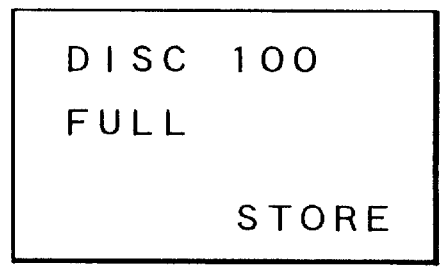

In step 748, when a disc 12 has already been stored in the specific disc storage position number position, the word "FULL" is displayed (FIG. 37B), in order to inform the user that a disc 12 is already stored there (in step 757).

This prevents a mistake in which the user specifies the same disc storage position number twice, omitting unnecessary movement of the mechanical parts.

In the early step of the disc storage mode in which the disc storage position number is specified, when a button other than the enter button, for example, the open/close button, is pressed (in steps 760 and 761), the disc storage mode is terminated and the disc tray 15 is closed (in step 762). The carriage 14 returns to the standby position (in step 756). In this situation, when the enter button is pressed, the playback mode is performed.

Figure 38:
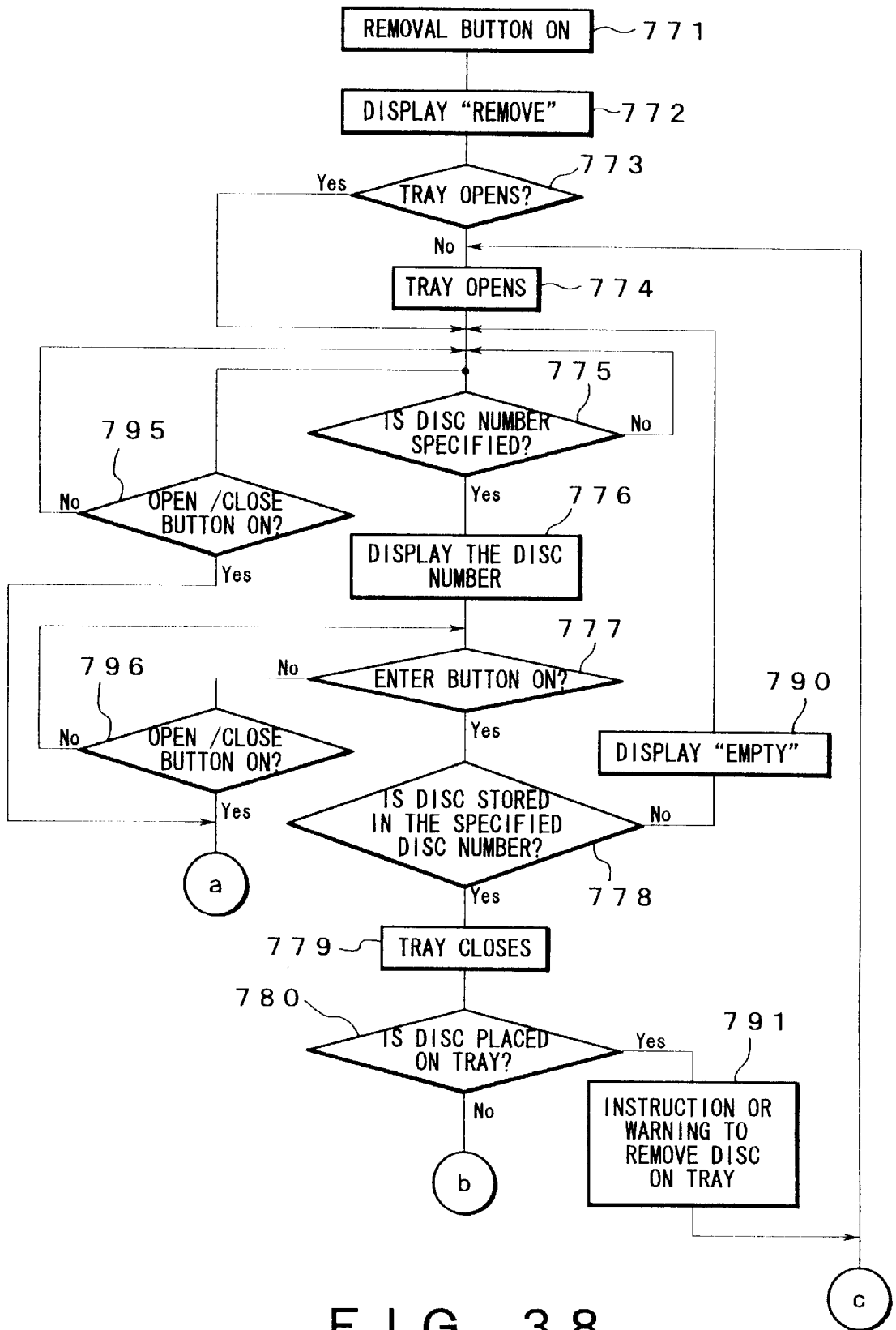
FIG. 38 is a flow chart showing a portion of the disc removal mode according to the present invention.
Figure 39:
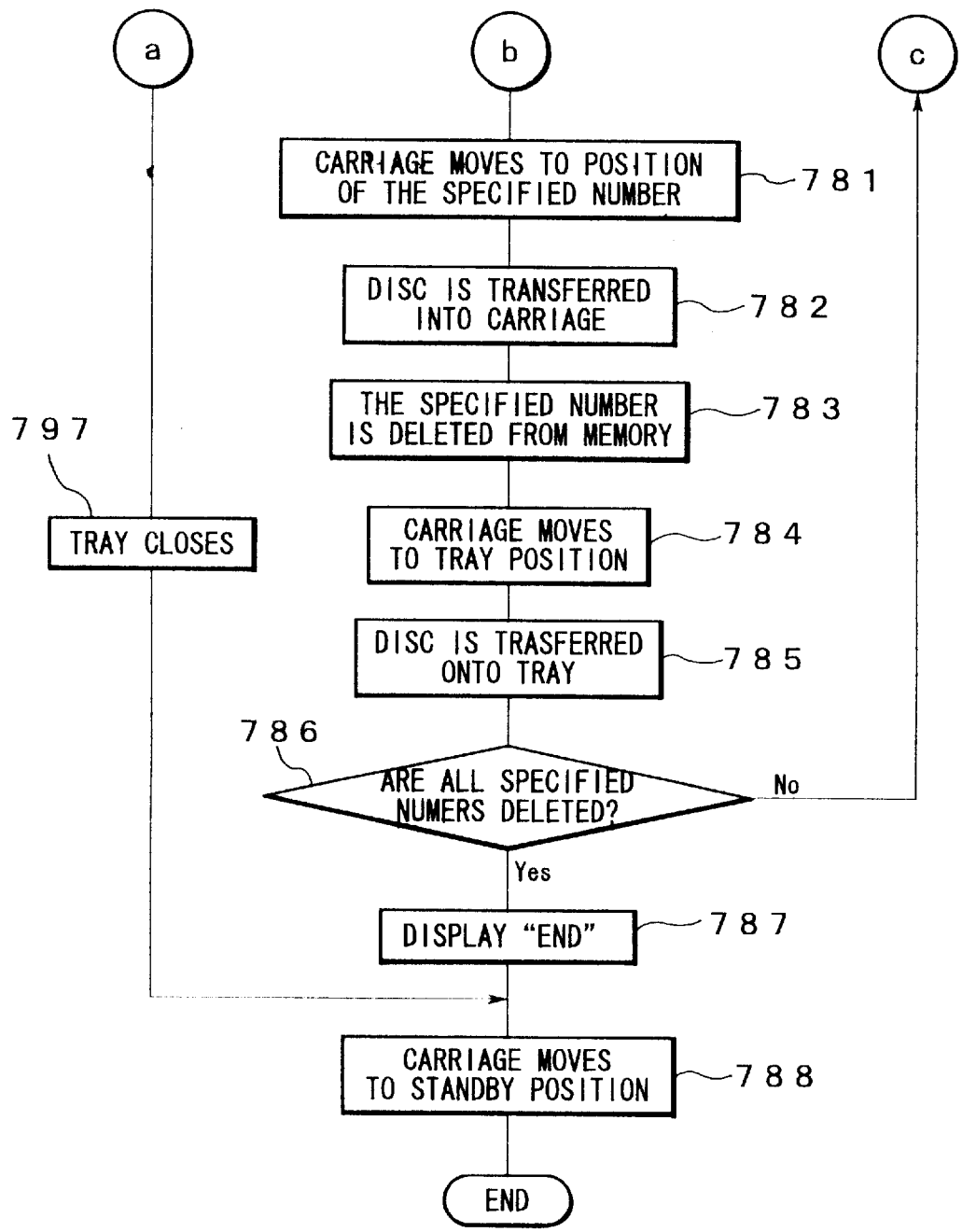
FIG. 39 is a flow chart showing a portion of the disc removal mode according to the present invention.

FIG. 38 and FIG. 39 show a concrete example of a disc removal mode. When a removal button is pressed, "REMOVE" is displayed and the disc tray 15 is automatically opened (in steps 771, 772, 773, and 774), in a similar fashion to the disc storage mode described above. This process is performed in order to allow the user to remove the disc 12 which is left on the disc tray 15.

Figure 37C:
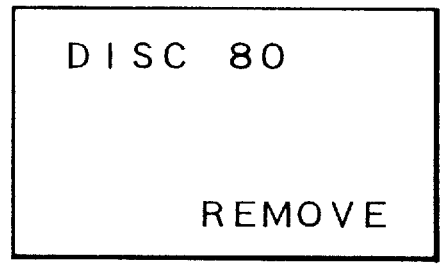

When a disc storage position number is specified, that disc storage position number is displayed (in steps 775 and 776). The manner of the display is similar to that described above, and FIG. 37C shows the example of the disc storage position number 80 being specified. When the enter button is pressed after the disc storage position number is specified, a determination is made with reference to the mapping data as to whether or not a disc 12 has been stored in the position of the specific disc storage position number (in steps 777 and 778).

Figure 37D:
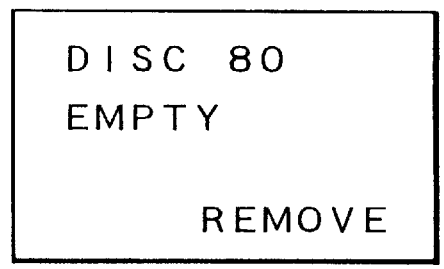

When a disc 12 is not stored in the position of the specified disc storage position number, the word "EMPTY" is displayed (as shown in FIG. 37D), in order to have the user specify a new disc storage position number (in steps 790 and 775). When a disc 12 is stored there, the disc tray 15 is closed and a determination is made as to whether or not a disc 12 is placed on the disc tray 15 (in steps 779 and 780).

Because a disc 12 on the disc tray 15 obstructs the removal operation, the disc tray 15 is opened in order to allow the user to remove the disc 12 on the disc tray 15 (in step 791). It is also possible to simultaneously provide a warning to the user. When no disc 12 is placed on the closed disc tray 15, the carriage 14 moves to the specific disc storage position and the disc 12 is drawn from the disc storage position onto the carriage 14 (in steps 781 and 782). The mapping data corresponding to the specified disc storage position number is updated, (deleted in this example) (in step 781). Step 783 may also be performed after step 785.

After the disc 12 is drawn onto the carriage 14, the carriage 14 moves to the position of the disc tray 15, where the disc 12 is removed (in steps 784 and 785).

When the process of removing the disc 12 is performed for all of the specified disc storage position numbers, in other words, when the deleting process is completed for all of the storage positions, the word "END" is displayed and the carriage 14 returns to the standby position (in steps 786, 787, and 788).

When the open/close button is pushed before the disc storage position number is specified, or when the open/close button is pushed instead of the enter button in the disc removal mode (in steps 795 and 796), the disc removal mode is terminated, the disc tray 15 is closed, and the carriage 14 returns to the standby position (in steps 797 and 788).

As described above, the disc removal mode shown in FIG. 38 and FIG. 39 can be performed in order to remove all of the discs 12 in the stocker 13, or in order to remove a specific disc 12 from the disc storage position 22 of the stocker 13.

Figure 40:
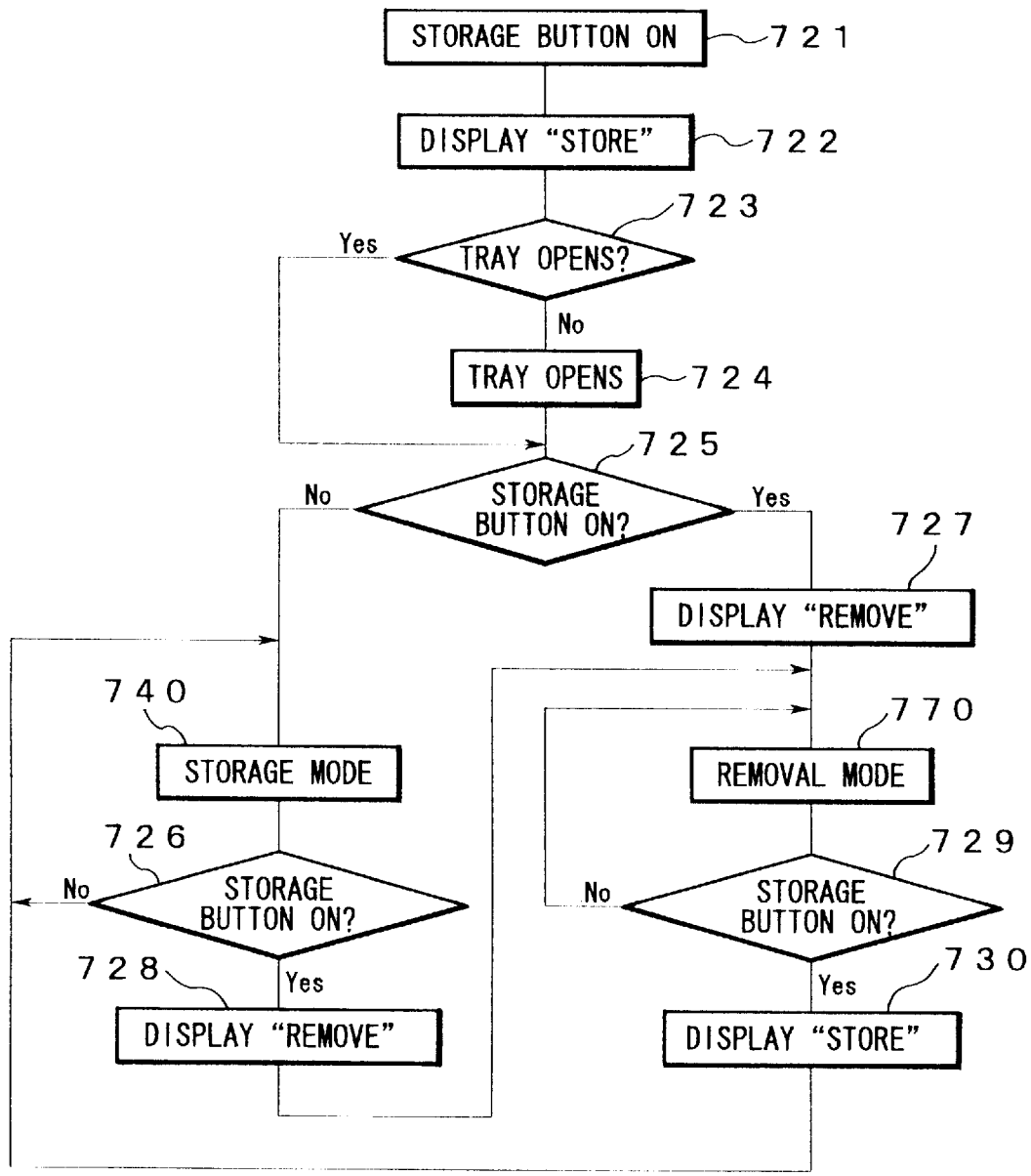
FIG. 40 is a flow chart showing an example of the storage and removal modes when the storage button is used in common according to the present invention.

Although FIG. 35, FIG. 36, FIG. 38, and FIG. 39 provide examples in which the storage and the removal buttons are provided in order to allow the user to select the mode, it is possible that the storage button can also serve as the removal button. FIG. 40 shows an example.

In FIG. 40, when the storage button is pushed, the display displays "STORE" and the disc tray 15 is automatically opened in a similar fashion to that described above (in steps 721, 722, 723, and 724).

The operation button remains on standby. In the standby state, when, for example, the button for the storage process, the disc number button or the enter button is pressed, the disc storage mode is performed (in steps 725 and 740). But when the storage button is pushed again during the standby state or during the storage process (in steps 725 and 726), the disc removal mode is performed (in step 770) and "REMOVE" is displayed (in step 728).

When the storage button is pushed again in the disc removal mode, the disc storage mode is again started (in steps 729 and 740). At this time, the display is changed (in step 740).

As described above, when the storage button is pushed again during a specified mode, the other modes can also be alternatively selected. Accordingly, when the user makes a mistake with the operation button, the next mode can be started only if the user pushes the storage button.

Figure 41:
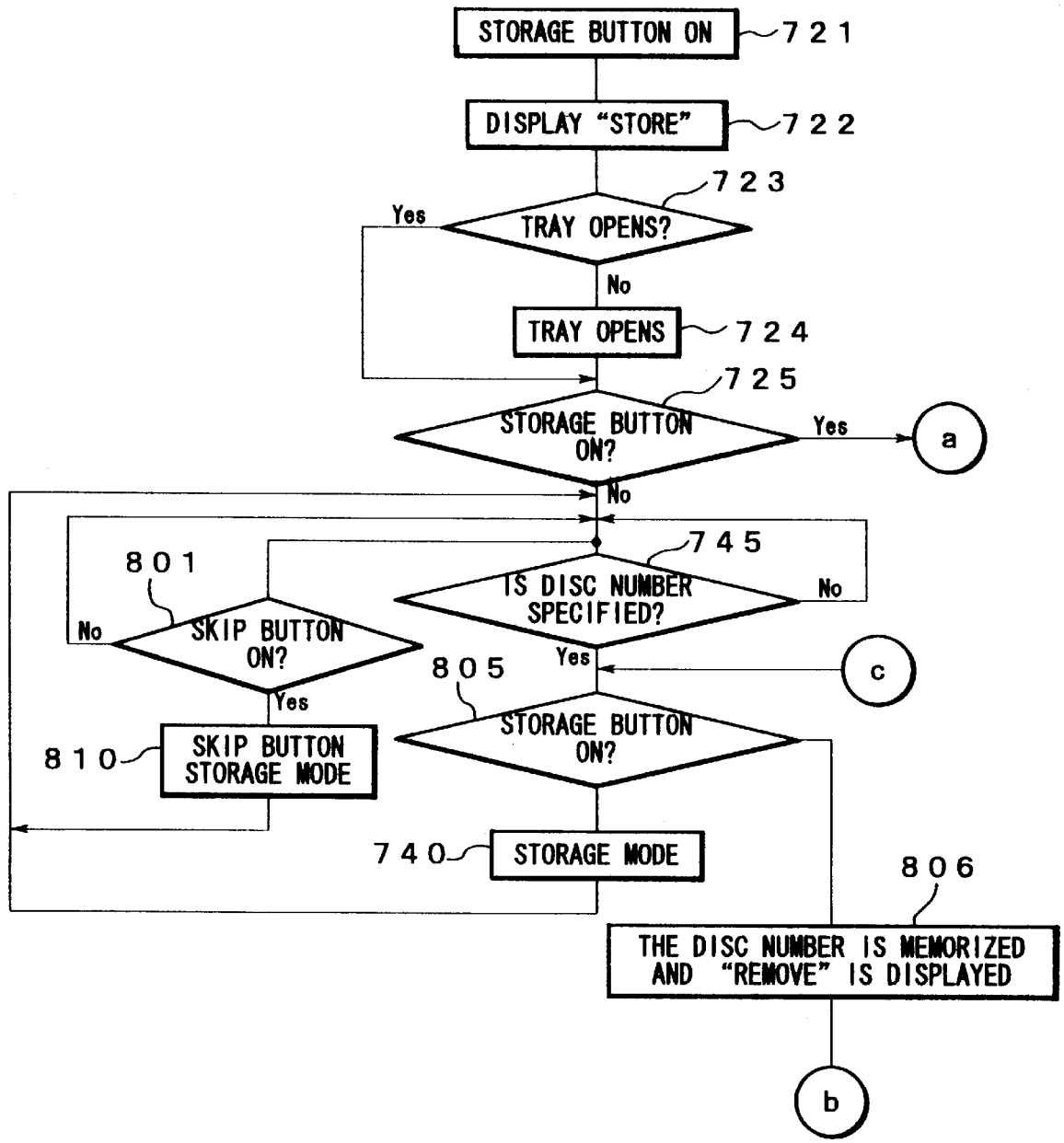
FIG. 41 is a flow chart showing a portion of the skip mode according to the present invention.

When the disc 12 is stored into or is removed from the stocker 13 which stores a number of discs 12, it is preferable for a skip process to be performed, which determines the storage status in the stocker 13, and shortening the process time. FIG. 41 and FIG. 42 show an example of the operation order for the skip process.

The storage button also serves as the removal button in the examples in FIG. 41 and FIG. 42, and the process is performed in a fashion similar to that in the construction with two buttons.

When the storage button is pushed, the word "STORE" is displayed and the disc tray 15 is opened as described above (in steps 721, 722, 723, and 724).

In this situation, when the disc storage position number is specified, the disc storage mode is started (in steps 745 and 740), and when the storage button is pushed again, the disc removal mode is started, as described above (in steps 805, 806, and 770). When the skip button is pushed before the disc storage position number is specified, the disc storage mode is operated by the skip button (in steps 801 and 810).

The skip button storage mode is a process in which only the numbers representing the empty disc storage position are displayed, one by one, and a disc 12 can be stored in any such empty disc storage position, as described below with reference to FIG. 43.

In step 725, when the switch button is pushed, the word "REMOVE" is displayed and when the disc storage position number is specified, the disc removal mode is performed (in steps 727, 807, and 770) for a disc located in such position. When the storage button is pushed again during the disc removal mode, the disc storage mode is started as described above (in steps 808, 809, and 704).

In the figure, in addition to these modes, when the skip key is pushed before a disc storage position number is specified, the skip button removal mode is begun (in steps 802 and 830).

The skip button removal mode is a process in which only the number representing the disc storage positions in which the discs 12 are located are displayed, one by one, and a disc 12 can be removed from such a position, as described below with reference to FIG. 44.

FIG. 43 shows the skip button storage process. When the skip button is pushed, a search is performed for the empty disc positions (in step 811), and if there are no such empty disc storage positions, the word "FULL" is displayed in order to inform the user that a new disc 12 cannot be stored.

When there is one or more empty disc storage positions, the display indicates the number of the empty disc storage position located highest or lowest in the stocker 13 (in step 813). If the user wants to store a disc 12 in such position, he pushes the enter button (in step 814). After the disc 12 is placed on the disc tray 15 and the open/close button is pushed, the disc tray 15 is closed and the carriage 14 moves so that the disc 12 is stored into the empty disc storage position indicated by the display (in steps 815 and 816).

If only the skip button is operated again to repeat this operation, the disc storage mode 810 is performed.

When the skip button is pushed instead of the enter button, the empty disc storage position number is updated, indicated in the upper position of the display, and the next empty disc storage position number, either the next highest or next lowest empty disc storage position, is indicated on the display (in steps 817 and 818).

For example, when the disc storage positions represented by numbers 60, 70, 80, 90, and 100 are empty, "60" is displayed as the first empty disc storage position number, and each time the skip button is pressed, the empty disc storage position number is updated to "70", then "80", and "90". When "80" is displayed as the empty disc storage position number and the enter button is pressed, a new disc 12 is stored in the position of the disc storage position number "80".

Only the empty disc storage position numbers are displayed, and the disc storage position numbers representing positions in which discs 12 are already stored are not displayed. According to the displayed empty disc storage position number, it is possible to quickly confirm the position at which a disc can be stored, and when the empty disc storage position number is specified, the disc can be securely stored into that disc storage position. The storage operation for the discs is smoothly and quickly performed.

FIG. 44 shows a concrete example of the skip button removal mode 830. When the skip button is pressed, the stored disc storage position numbers are checked (in step 831), and when all of the disc storage positions are empty, the word "EMPTY" is displayed (in step 832) in order to inform the user that there are no discs 12 in the stocker 13.

When more than one disc 12 is stored, the display indicates the smallest or greatest empty disc storage position number (in step 833). In this situation, when the enter button is pressed, the tray is closed, and the disc 12 is drawn from the disc storage position represented by the displayed number and is transferred to the disc tray 15 (in steps 834, 835, and 836).

When the skip button is pushed when a disc storage position number is being displayed, the stored disc storage position number is updated (in steps 837 and 838). For example, when discs 12 are already stored in the disc storage positions represented by numbers 60, 70, 80, 90, and 100, "60" is displayed as the stored disc storage position number, and each time the skip button is pressed, the stored disc storage position number is updated to "70", "80", and "90". When "80" is displayed as the stored disc storage position number and the enter button is pressed, the disc 12 is drawn out from such position and is removed through the disc tray 15.

Only the stored disc storage position numbers are displayed, and the empty disc storage position numbers are skipped and are not displayed. According to the displayed stored disc storage position number, it is possible to quickly confirm the positions from which the discs will be removed, and when a stored disc storage position number is specified, the disc can be securely removed from that disc storage position. The operation for removing the disc is smoothly and quickly performed. When there is no empty disc storage position, or when all of the disc storage positions are empty, the display indicates that situation so that the user can easily confirm the fact.

By using the skip button, it is unnecessary for the user to confirm all of the empty or stored disc storage position numbers in order to operate the storage process or the removal process for a disc 12. This makes the operations easy and prevents the user from specifying a wrong disc storage position number by mistake.

The disc tray 15 and its moving mechanism can be positioned above the stocker 13, and in such case, the initializing position and the standby position for the carriage 14 may be set in accordance with the disc tray 15, in a fashion similar to the above description.

Although in the embodiment described above the disc tray 15 is drawn forward, in other words, to the front side, the disc tray 15 can be constructed so as to be drawn out in any direction in which it does not collide with the carriage 14; in other words, in the left and right directions. The direction in which the disc tray 15 is drawn out can be designed according to the design of the auto disc changer 1 itself.

Further, although in the embodiment the discs 12 are stored vertically, the present invention is applicable to an auto disc changer in which the discs are arranged horizontally. Although in the embodiment the mapping is performed when the unit is turned on, the mapping may be also performed during a reset operation in which a malfunction of the control block 182 occurs due to a bug is stopped and the microcomputer 631 is initialized.

As described above, the unit can perform the check mode, in which the presence of discs in the disc storage positions is checked when the power is turned on, and in which the data representing the presence of the discs are recorded into the memory.

According to the present invention, when the stocker is able to store a number of the discs in the disc storage positions, information is provided about which disc storage positions the discs can be stored into. Because the information can be used as reference data when a disc is stored or a disc is removed, the disc can be securely and quickly stored and removed.

According to the present invention, when the unit power is turned off during the check mode, the check mode is continued, and the unit power is not fully turned off until the check mode is completed.

Once the check mode is started, it is unnecessary to start the check mode again except some cases. When the power is next turned on, a normal operation mode can be quickly performed. Because the user need not wait for the completion of the check mode, a sense of incongruity and user irritation is reduced.

Further, according to the present invention, when the user begins to store a disc into a disc storage position, the display can indicate that a disc is already stored in the specified disc storage position. When the user begins to remove a disc, the display can indicates that a specified disc storage position is empty.

Because the user is informed that a specified disc storage position is filled with a disc or is empty, the user can avoid a wrong specification. When a wrong specification is made, the disc storage or removal operation is not performed, eliminating unnecessary operation of the mechanism.

In the disc removal mode, because the disc tray is first opened, the user can avoid a mistaken operation in connection with the removal of a disc for the reason described above.

When the storage button serves also as the removal button, the number of the button can be decreased. Because the unit can be switched to either the disc storage mode or to the disc removal mode by operation of only the storage button, the user may conveniently and directly select either of the two modes when a mistake has been made.

The present invention is suitable for an auto disc changer which can store a number of discs in the unit.

It will be obvious to those having skill in the art that many changes may be made in the above-described details of the preferred embodiment of the present invention. The scope of the present invention, therefore, should be determined according to the following claims.

What is claimed is:

1. An auto disc changer having disc removal and loading means for removing discs from and loading said discs into said auto disc changer, disc storage means for storing a plurality of discs, disc carriage means for transferring said discs to and from specified disc storage positions in said disc storage means, disc playback means, and control means for controlling loading, removal, and transfer of said discs, wherein presence of said discs stored in each of said disc storage positions in said disc storage means is detected, and wherein power is determined to be in an ON or OFF state during an operation of a check mode in which data representing said presence of said discs are inputted into a memory, and when said power is in said OFF state, a power observation flag is set in an inverted position, and when said check mode is completed, said power is finally controlled to be ON or OFF based on a determination of said position of said power observation flag.

2. An auto disc changer having a power supply switch for controlling supply of operating power such that the auto disc changer will not operate if the power supply switch is in an off state, a user-operated switch element for controlling the state of the power supply switch, a disc storage means for storing a plurality of discs in specific disc storage positions, a disc removal and loading means for removing discs from and loading discs into the auto disc changer, a disc carriage means for transferring discs to and from the disc storage means, and a control means for controlling loading, removal and transfer of discs, said control means including a memory means and the memory means including a memory area for storing mapping data representing, for each of the specific disc storage positions, whether a disc is present in the disc storage position and a check memory area for storing back up mapping data, a power supply for supplying power to the check memory area for maintaining the contents of the check memory area independently of the power supply switch element, the control means being programmed to operate in accordance with a check mode, a disc removal mode and a disc storage mode, and wherein:

(a) in the check mode, the control means tests the back up mapping data to determine whether it is normal, and if the back up mapping data is not normal
 (i) determines, for each of the specific disc storage positions, whether a disc is present in the disc storage position,
 (ii) records the mapping data determined in step (i) in the memory area of the memory means, and
 (iii) backs up the mapping data into the check area of the memory means, (b) in the disc removal mode, the control means
 (i) receives inputted data specifying a disc storage position from which a disc is to be removed,
 (ii) determines from the mapping data whether the specified disc storage position contains a disc and, if so, continues with the disc removal, and
 (iii) updates the mapping data according to the removal operation, and (c) in the disc storage mode, the control means
 (i) receives inputted data specifying a disc storage position into which a disc is to be stored,
 (ii) determines from the mapping data whether the specified disc storage position contains a disc and, if not, continues with the disc storage, and
 (iii) updates the mapping data according to the storage operation.

3. An auto disc changer according to claim 2, including a display means responsive to message commands provided by the control means for displaying messages to a user, and wherein, in the disc storage mode, in the event that the specified disc storage position already contains a disc, the control means provides a message command to the display means to display a message to that effect.

4. An auto disc changer according to claim 2, including a display means responsive to message commands provided by the control means for displaying messages to a user, and wherein, in the event that the control means determines in step (ii) of the disc storage mode that the specified disc storage position already contains a disc, the control means provides a message command to the display means to display a message to that effect.

5. An auto disc changer according to claim 2, including a display means responsive to message commands provided by the control means for displaying messages to a user, and wherein, in the disc removal mode, in the event that the specified disc storage position does not contain a disc, the control means provides a message command to the display means to display a message to that effect.

6. An auto disc changer according to claim 2, including a display means responsive to message commands provided by the control means for displaying messages to a user, and wherein, in the event that the control means determines in step (ii) of the disc removal mode that the specified disc storage position does not contain a disc, the control means provides a message command to the display means to display a message to that effect.

7. An auto disc changer according to claim 2, wherein the disc removal and loading means has an open position and a closed position and the disc removal mode and the disc storage mode each include a preliminary step in which the disc removal and loading means is placed in its open position.

8. An auto disc changer according to claim 2, including a user interface having a skip button for invoking a skip routine during the disc storage mode and a display means responsive to message commands provided by the control means for displaying messages to the user, and wherein in response to operation of the skip button, the control means provides a message command to the display means to display a message indicating a disc storage position that is vacant.

9. An auto disc changer according to claim 8, wherein the user interface includes an enter button, and wherein in response to operation of the enter button after display of a message indicating a disc storage position that is vacant and placing a disc in the disc removal and loading means, the control means stores the disc placed in the disc removal and loading means in the storage position indicated by the displayed message.

10. An auto disc changer according to claim 2, including a user interface having a disc storage button for invoking the disc storage mode, a skip button for invoking a skip routine prior to step (i) of the disc storage mode and a display means responsive to message commands provided by the control means for displaying messages to the user, and wherein in response to operation of the storage button followed by operation of the skip button, the control means provides a message command to the display means to display a message indicating a disc storage position that is vacant.

11. An auto disc changer according to claim 10, wherein the user interface includes an enter button, and wherein in response to operation of the enter button after display of a message indicating a disc storage position that is vacant and placing a disc in the disc removal and loading means, the control means stores the disc placed in the disc removal and loading means in the storage position indicated by the displayed message.

12. An auto disc changer according to claim to claim 2, including a user interface having a skip button and a display means responsive to message commands provided by the control means for displaying messages to the user, and wherein the disc storage mode includes the step of calling a skip routine in response to operation of the skip button, the skip routine including the steps of (a) determining from the mapping data which of the disc storage positions is vacant,
(b) providing a message command to the display means indicating a storage position that is vacant, and
(c) storing a disc in the storage position that is vacant.

13. An auto disc changer according to claim 2, including a user interface having a skip button for invoking a skip routine during the disc removal mode and a display means responsive to message commands provided by the control means for displaying messages to the user, and wherein in response to operation of the skip button, the control means provides a message command to the display means to display a message indicating a disc storage position that is occupied.

14. An auto disc changer according to claim 13, wherein the user interface includes an enter button, and wherein in response to operation of the enter button after display of a message indicating a disc storage position that is occupied, the control means removes the disc from the storage position indicated by the displayed message and places it in the disc removal and loading means.

15. An auto disc changer according to claim 2, including a user interface having a disc removal button for invoking the disc removal mode, a skip button for invoking a skip routine prior to step (i) of the disc removal mode and a display means responsive to message commands provided by the control means for displaying messages to the user, and wherein in response to operation of the disc removal button followed by operation of the skip button, the control means provides a message command to the display means to display a message indicating a disc storage position that is occupied.

16. An auto disc changer according to claim 15, wherein the user interface includes an enter button, and wherein in response to operation of the enter button after display of a message indicating a disc storage position that is occupied, the control means removes the disc from the storage position indicated by the displayed message and places it in the disc removal and loading means.

17. An auto disc changer according to claim 2, including a user interface having a skip button and a display means responsive to message commands provided by the control means for displaying messages to the user, and wherein the disc removal mode includes the step of calling a skip routine in response to operation of the skip button, the skip routine including the steps of (a) determining from the mapping data which of the disc storage positions is occupied,
(b) providing a message command to the display means indicating a storage position that is occupied, and
(c) removing the disc from the storage position that is occupied.

18. An auto disc changer according to claim 2, comprising a power supply means for supplying operating power to the disc removal and loading means, the disc carriage means and the control means, and wherein the control means operates in accordance with the check mode whenever the power supply means is switched from an OFF condition to an ON condition.

19. An auto disc changer according to claim 2, wherein the memory area for storing mapping data is volatile memory and the check memory area is non-volatile memory.

20. An auto disc changer according to claim 19, wherein the power supply for supplying power to the check memory area includes a battery.

21. An auto disc changer according to claim 19, including a first power supply for supplying alternating current and a secondary power supply for supplying direct current, and wherein the power supply switch controls the secondary power supply and the power supply for supplying power to the check memory area includes a back up battery.

22. An auto disc changer having a disc storage means for storing a plurality of discs in specific disc storage positions, a disc removal and loading means for removing discs from and loading discs into the auto disc changer, a disc carriage means for transferring discs to and from the disc storage means, a control means for controlling loading, removal and transfer of discs, a power supply means for supplying operating power to the disc removal and loading means, the disc carriage means and the control means, and a user interface for supplying user commands to the control means, wherein the user interface includes a user-operated switch element for initiating switch off of the power supply means and a power observation flag is set to a first logic state when the switch element is operated and is otherwise in a second logic state, and wherein the control means is programmed to execute a verification operation in response to operation of the switch element, and the verification operation comprises the following steps:
   determining whether back up mapping data stored by a memory means indicates a normal operating condition of the auto disc changer and, if not,
   examining each of the storage positions to determine whether a disc is stored at that position and recording the resulting data in the memory means, and
   testing the power observation flag and, if the power observation flag is in the first logic state, switching off the power supply means.

23. An auto disc changer according to claim 22, wherein the control means is programmed to execute the verification operation when the power supply means is switched on.

24. An auto disc changer according to claim 22, wherein the memory means includes a memory area for storing mapping data and a check memory area for storing said back up mapping data, and the memory area for storing mapping data is volatile memory and the check memory area is non-volatile memory.

* * * * *